(12) United States Patent
Ruzycky

(10) Patent No.: US 11,737,489 B2
(45) Date of Patent: Aug. 29, 2023

(54) CIGARETTE ROLLER

(71) Applicant: KOOPEH DESIGNS INC., Etobicoke (CA)

(72) Inventor: Ewhan Ruzycky, Etobicoke (CA)

(73) Assignee: KOOPEH DESIGNS INC.

( * ) Notice: Subject to any disclaimer, the term of this patent is extended or adjusted under 35 U.S.C. 154(b) by 16 days.

(21) Appl. No.: 17/058,857

(22) PCT Filed: May 31, 2019

(86) PCT No.: PCT/CA2019/050755
§ 371 (c)(1),
(2) Date: Nov. 25, 2020

(87) PCT Pub. No.: WO2019/227229
PCT Pub. Date: Dec. 5, 2019

(65) Prior Publication Data
US 2021/0219598 A1 Jul. 22, 2021

Related U.S. Application Data

(60) Provisional application No. 62/678,817, filed on May 31, 2018.

(51) Int. Cl.
*A24C 5/44* (2006.01)
*A24B 7/04* (2006.01)
(Continued)

(52) U.S. Cl.
CPC .................. *A24C 5/44* (2013.01); *A24B 7/04* (2013.01); *A24C 5/396* (2013.01); *A24C 5/398* (2013.01); *A24C 5/54* (2013.01)

(58) Field of Classification Search
CPC .................................. A24C 5/44; A24C 5/398
See application file for complete search history.

(56) References Cited

U.S. PATENT DOCUMENTS 1,379,865 A * 5/1921 Albert ...................... A24C 5/44
131/56
4,534,367 A 8/1985 Newsome
(Continued)

FOREIGN PATENT DOCUMENTS

GB 1273686 A * 5/1972
WO 2016125162 A1 8/2016
WO 2019092477 A1 5/2019

OTHER PUBLICATIONS

International Searching Authority, International Search Report and Written Opinion for corresponding International Application No. PCT/CA2019/050755, dated Aug. 8, 2019, 10 pages.

*Primary Examiner* — Eric Yaary
(74) *Attorney, Agent, or Firm* — David R. Heckadon; Gordon Rees Scully Mansukhani LLP

(57) ABSTRACT

The present invention relates to a device and method for rolling a paper tube around ground material to form a cigarette. In an embodiment of the present invention, the device comprises an openable chamber configured to receive ground material, the chamber having a first end and a second end; a rolling assembly disposed within the chamber, the rolling assembly receiving paper and forming a paper tube around the ground material, the rolling assembly having a first end and a second; and a first gear assembly at the first chamber end and communicatively connected the first end of the rolling assembly, and a second gear assembly at the second chamber end and communicatively connected to the second end of the rolling assembly, the first and second gear activating the rolling assembly when rotated to roll the paper around the ground material forming a cigarette.

19 Claims, 50 Drawing Sheets

(51) Int. Cl.
*A24C 5/39* (2006.01)
*A24C 5/54* (2006.01)

(56) References Cited

U.S. PATENT DOCUMENTS

| | | | |
|---|---|---|---|
| 4,572,216 A | | 2/1986 | Josuttis et al. |
| 5,390,684 A | * | 2/1995 | Rizzoli .................. A24C 5/471 |
| | | | 131/58 |
| 9,427,020 B2 | | 8/2016 | Ruzycky |
| 2016/0029691 A1 | * | 2/2016 | Ruzycky ............... B02C 18/144 |
| | | | 241/24.1 |
| 2018/0344086 A1 | * | 12/2018 | McDonough Migale ................... |
| | | | A47J 42/24 |

* cited by examiner

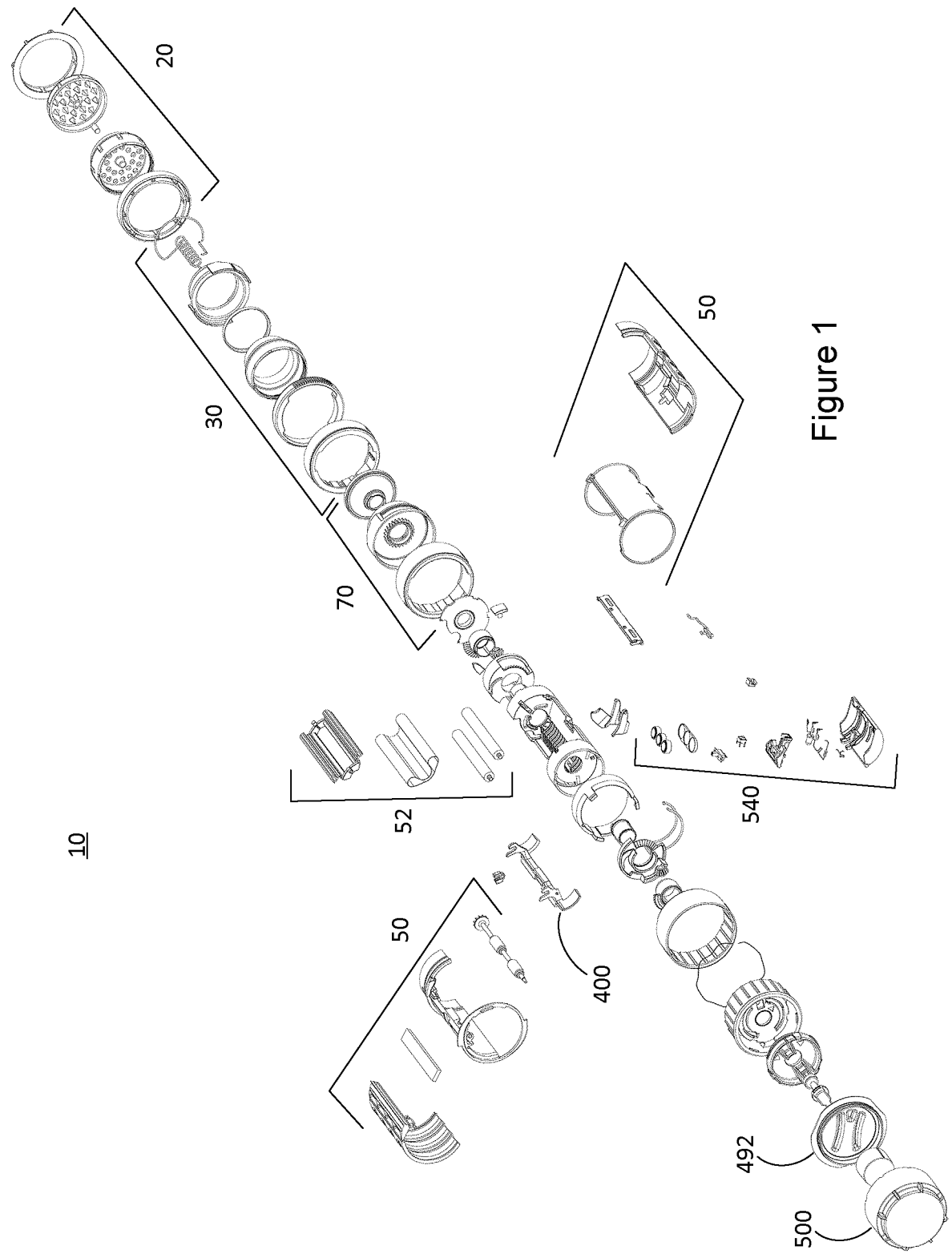

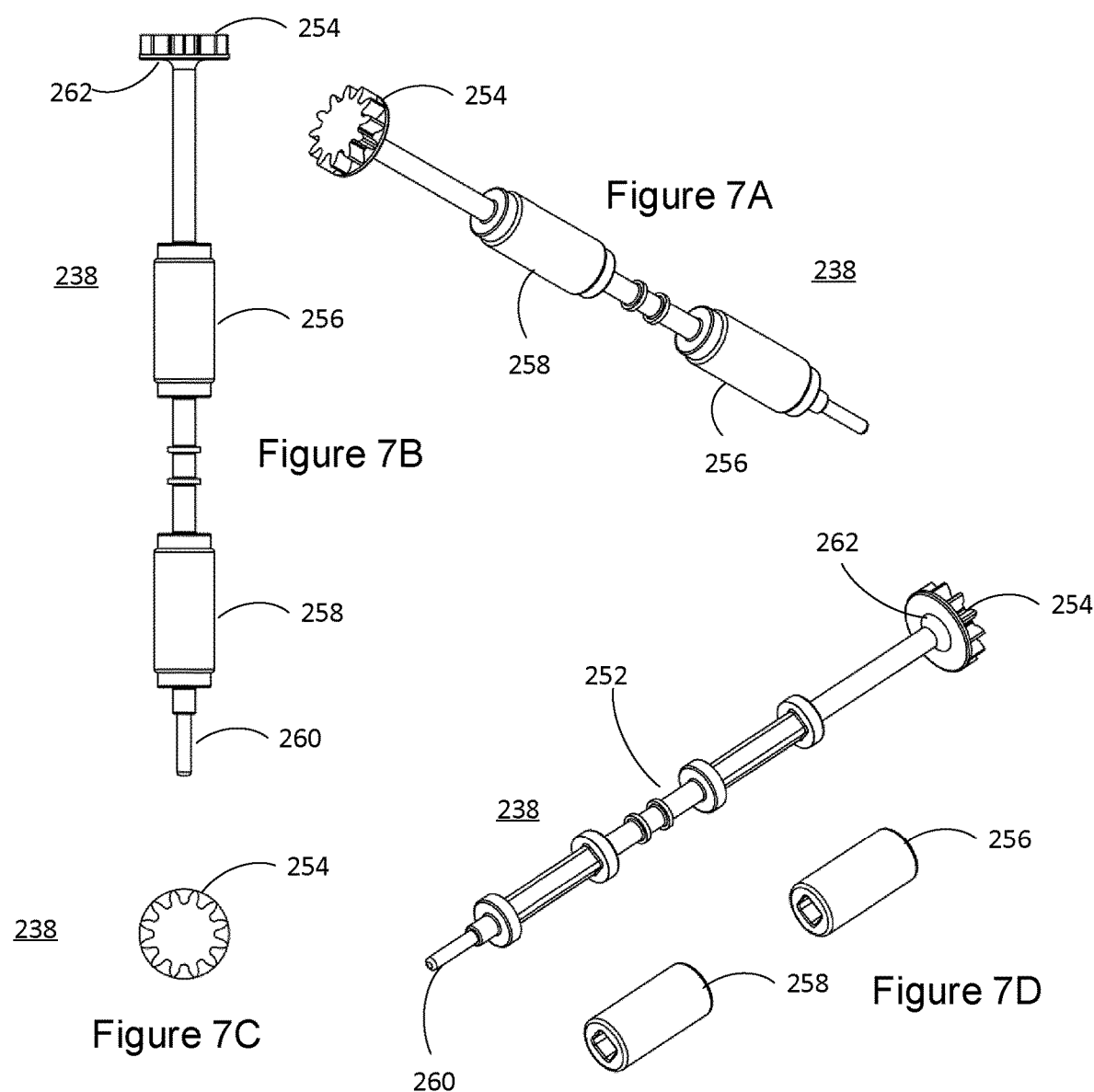

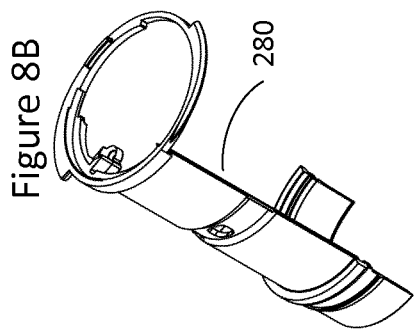
Figure 8B
280
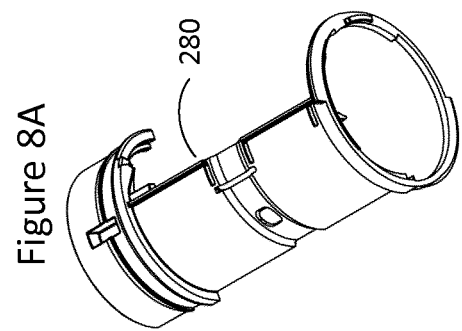
Figure 8A
280
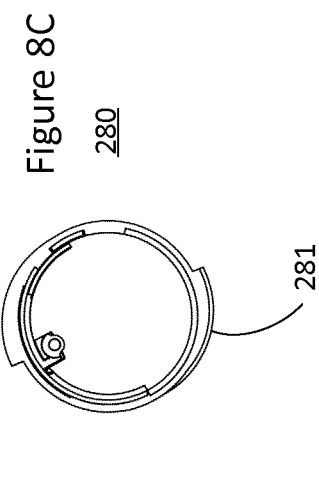
Figure 8C
280
281
281
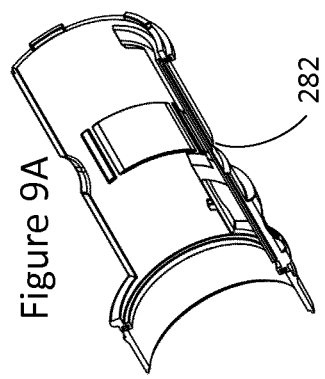
Figure 9A
282
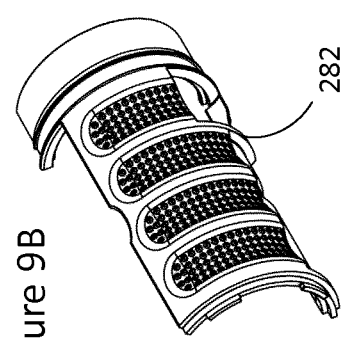
Figure 9B
282
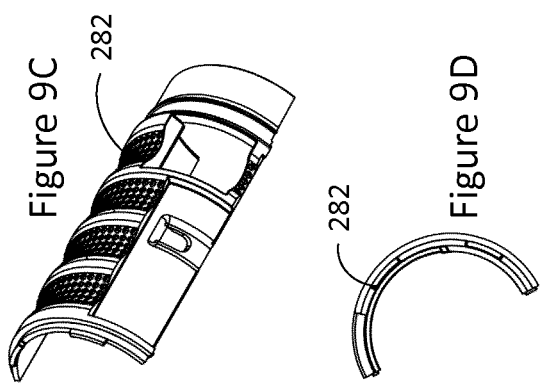
Figure 9C
282
Figure 9D
282

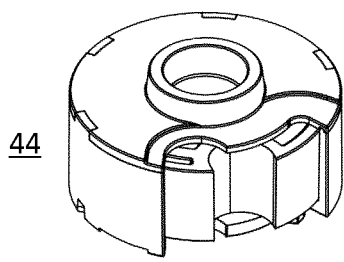
Figure 12A
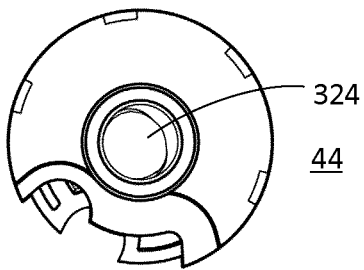
Figure 12C
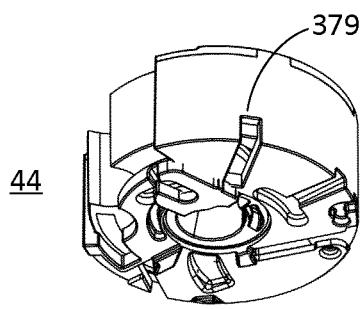
Figure 12B
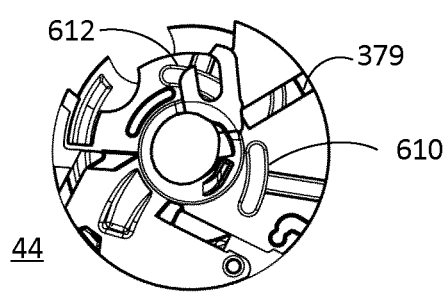
Figure 12D
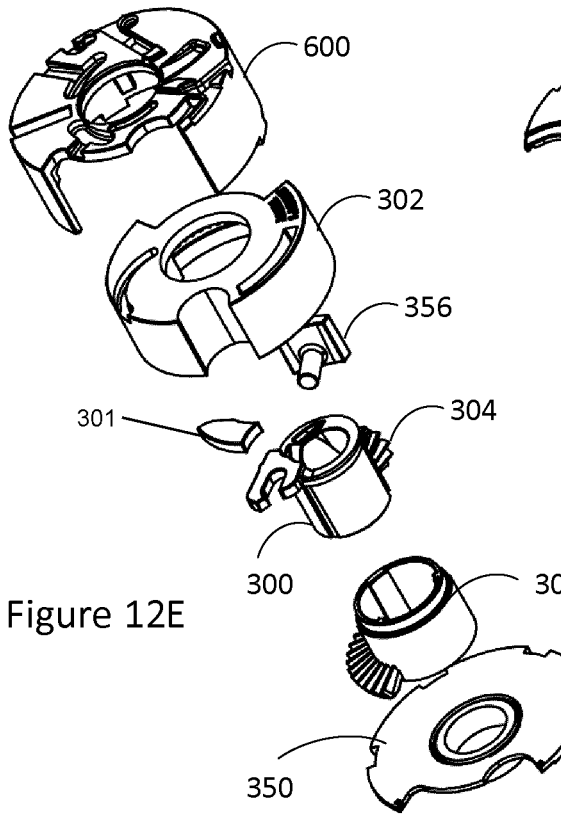
Figure 12E
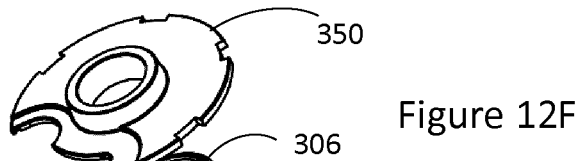
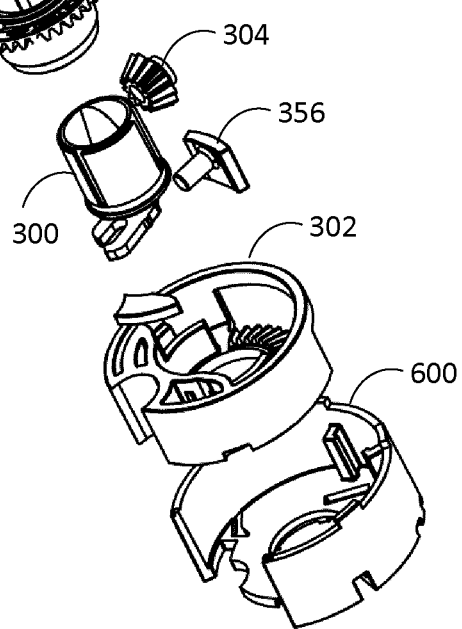
Figure 12F

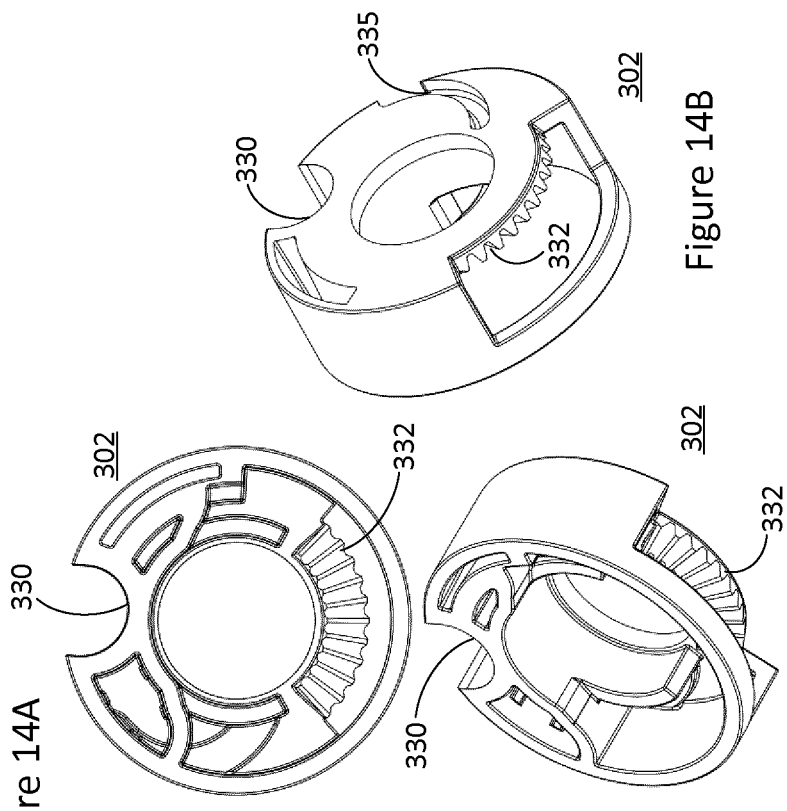
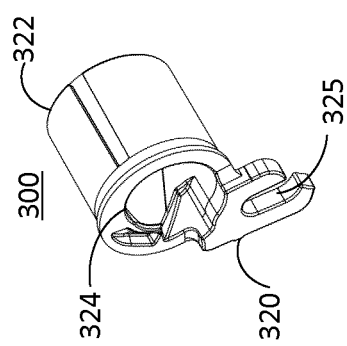
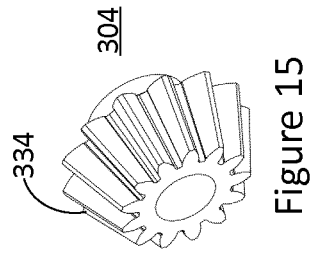

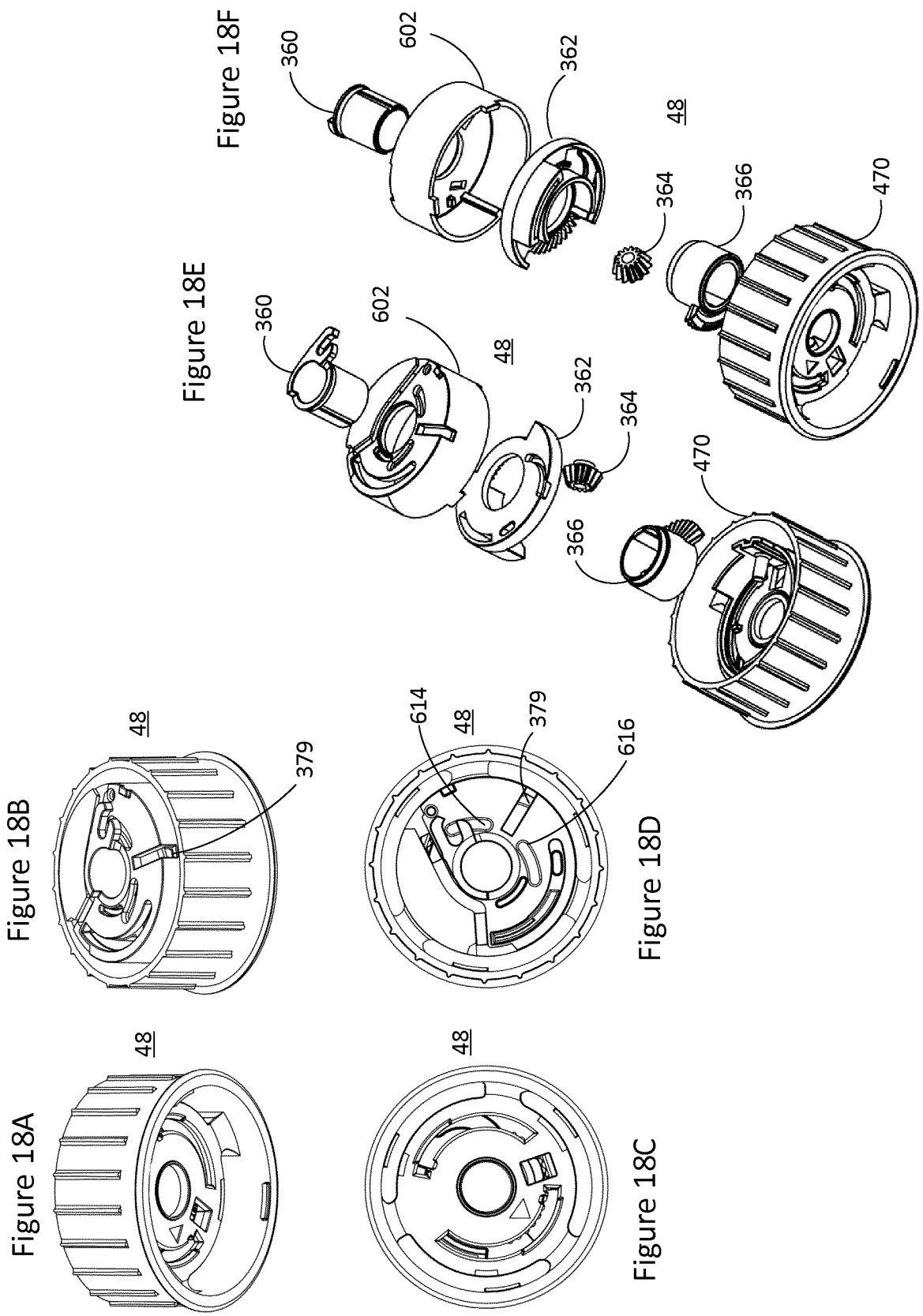

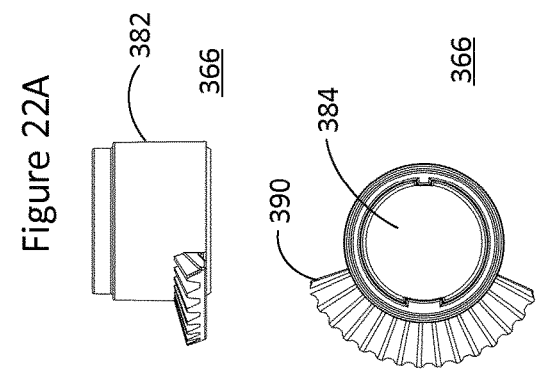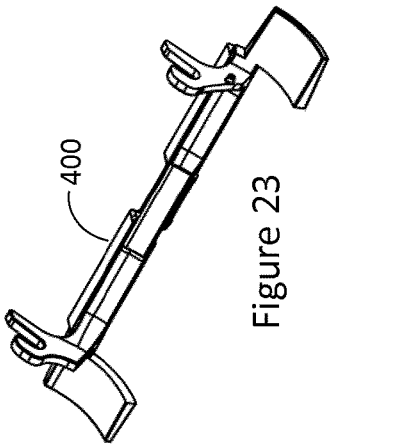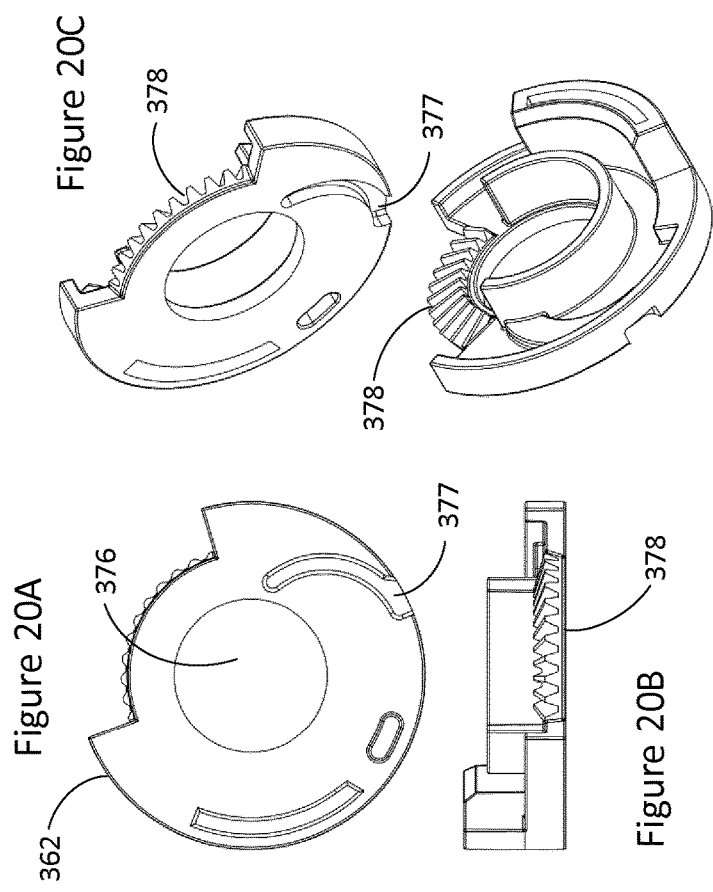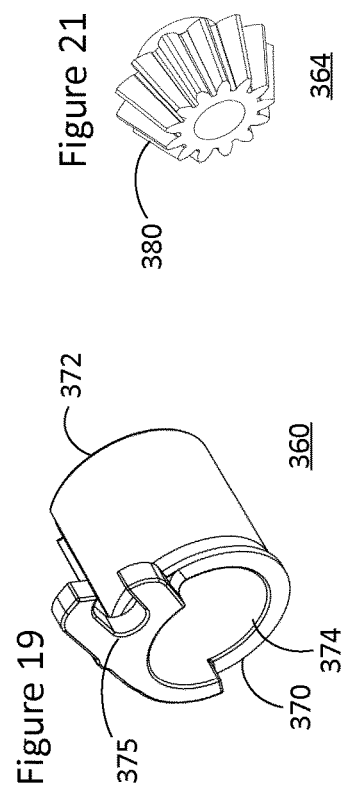

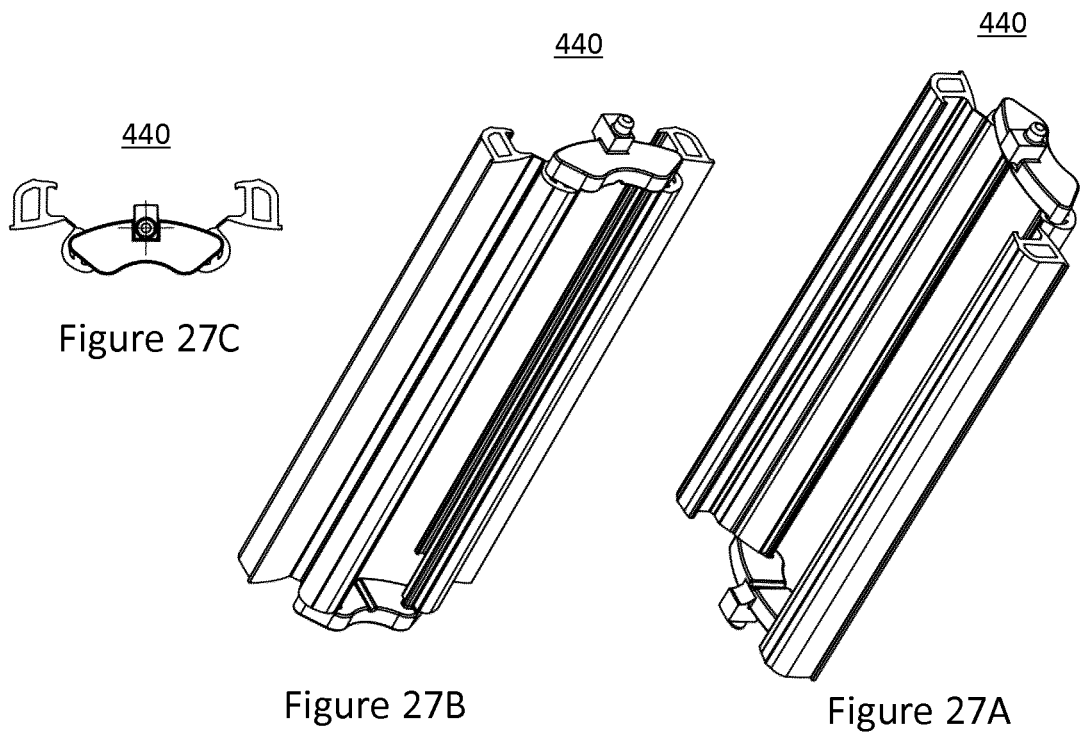
Figure 27C
Figure 27B
Figure 27A
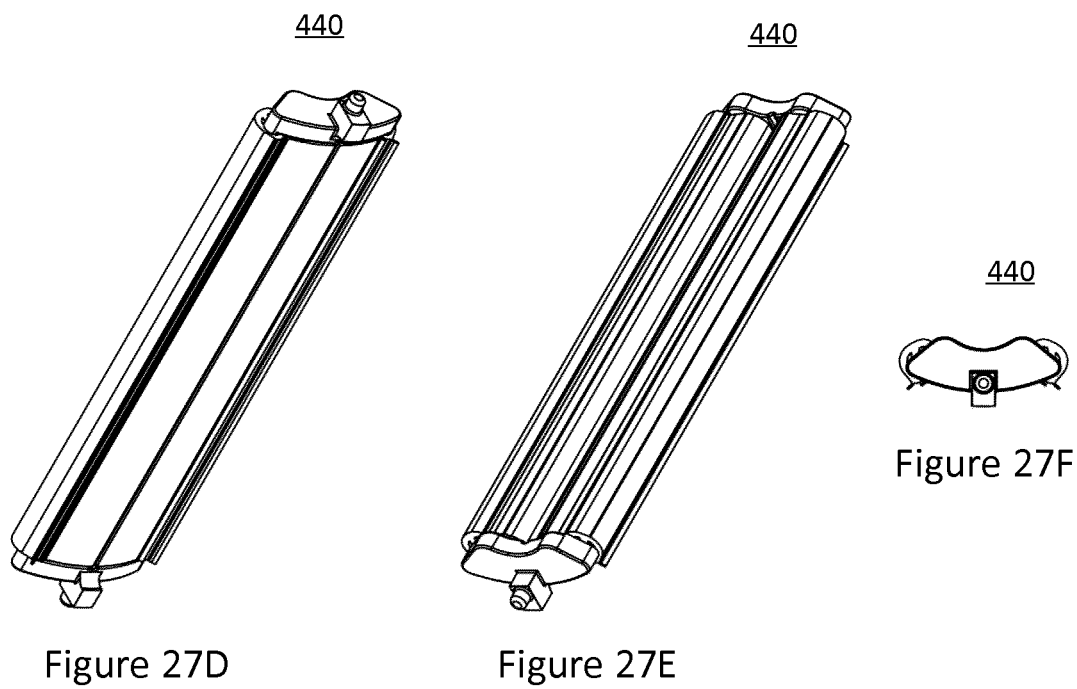
Figure 27D
Figure 27E
Figure 27F

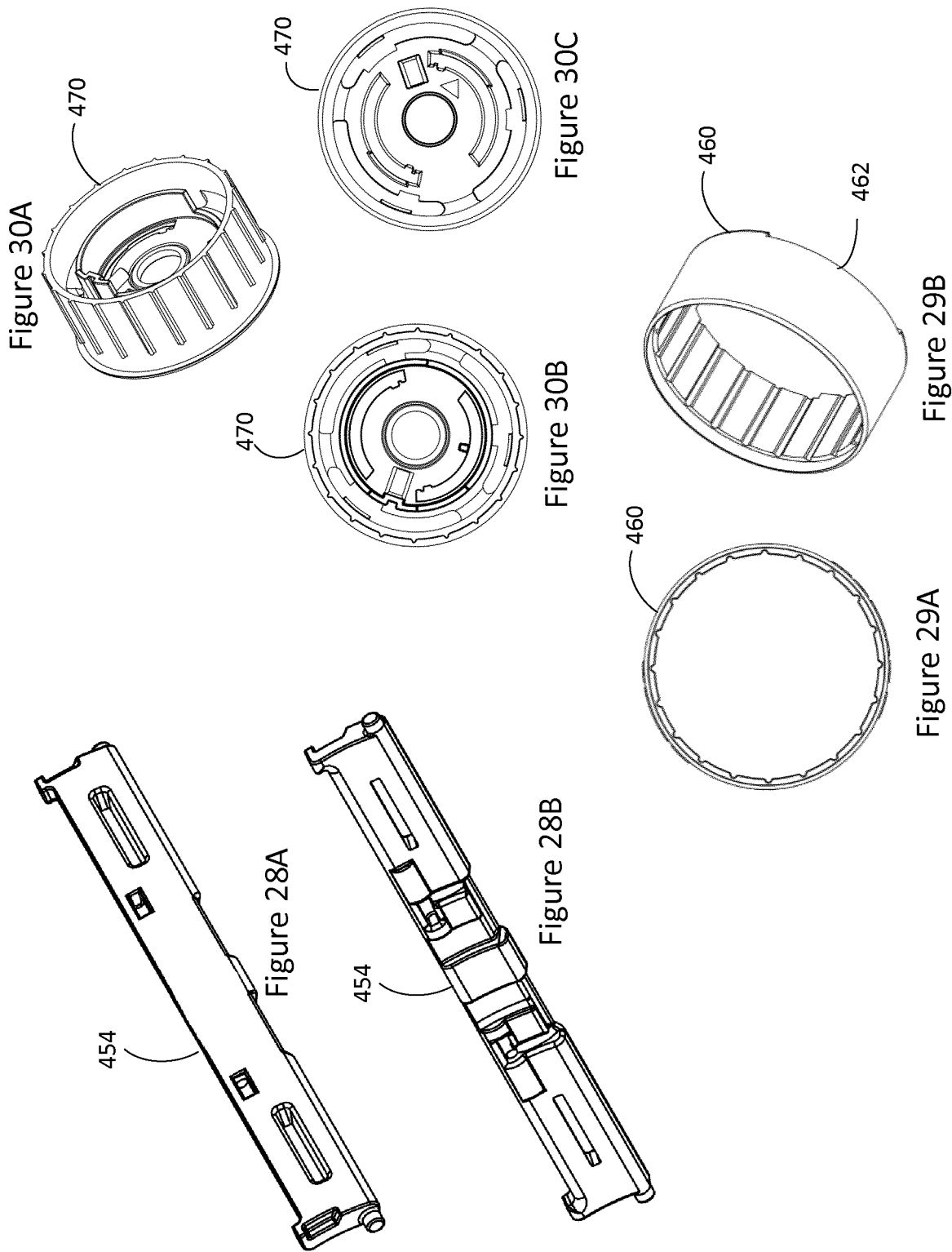

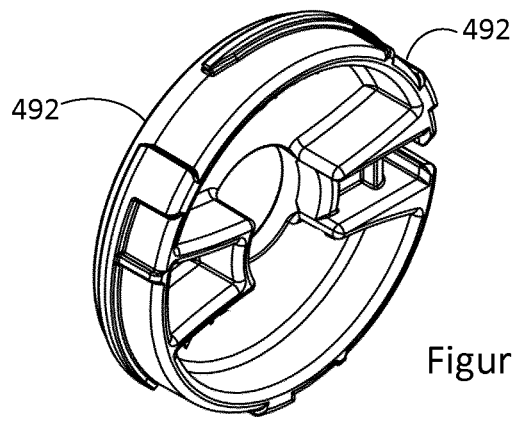
Figure 35
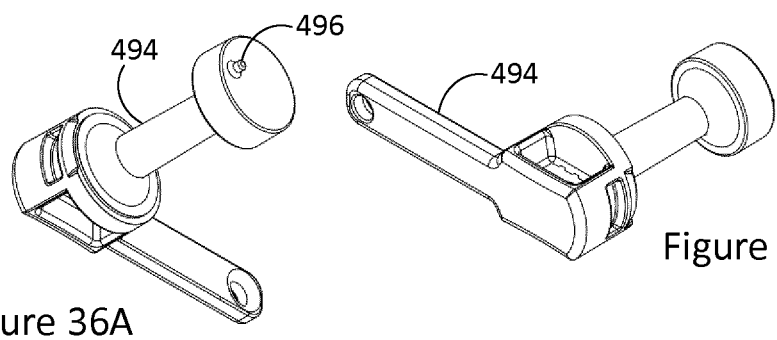
Figure 36A
Figure 36B
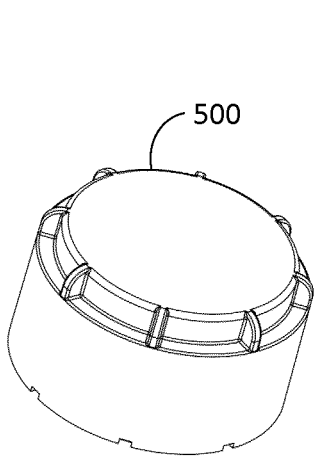
Figure 37A
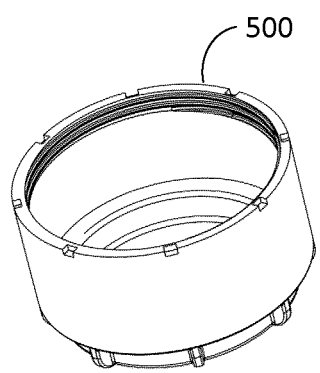
Figure 37B
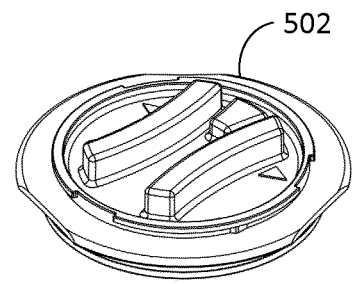
Figure 38A
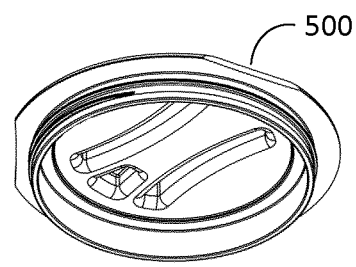
Figure 38B

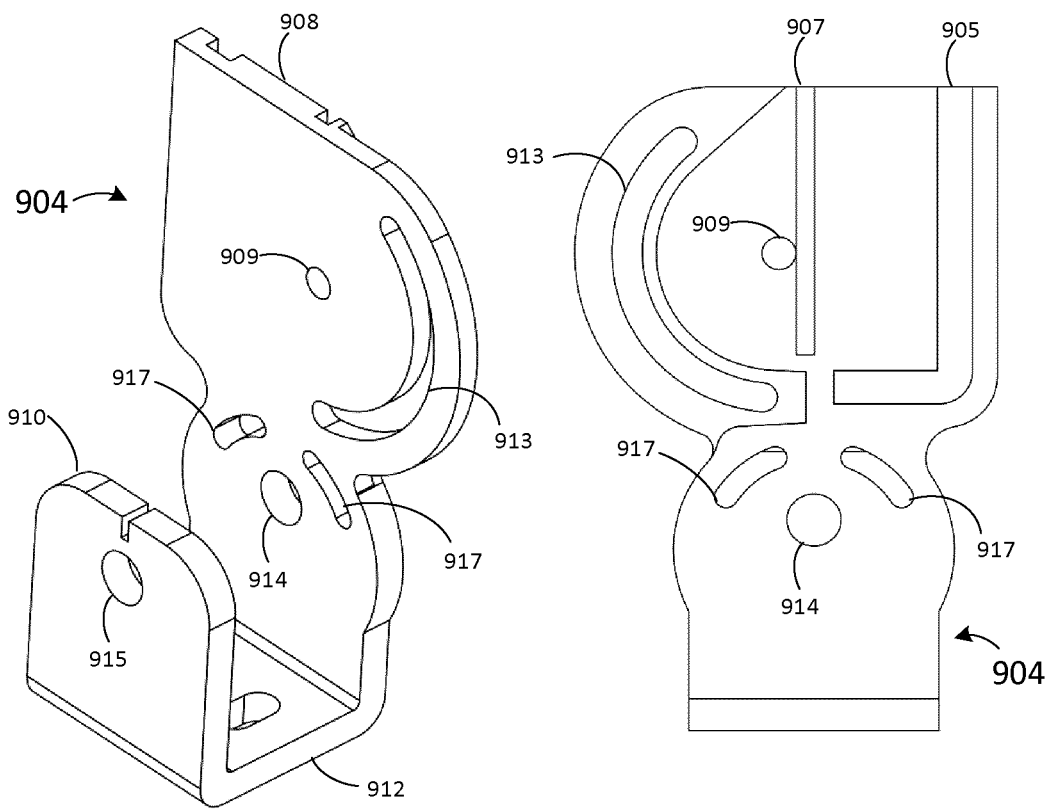
Figure 61A
Figure 61B
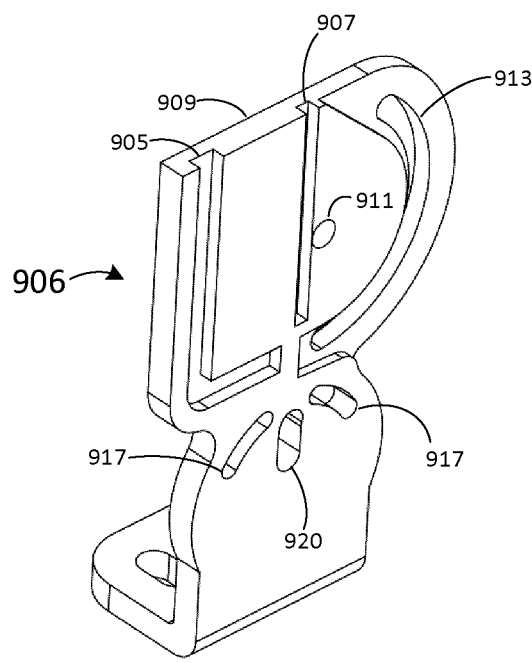
Figure 62

CIGARETTE ROLLER

FIELD

The present invention relates generally to a device and method for rolling a paper to form a cigarette tube and a device and method for rolling paper around ground material to form a cigarette.

BACKGROUND

Cigarettes are formed from paper tubes that are stuffed with finely cut tobacco leaves. Cigarettes are generally manufactured by factories. Some people prefer to hand make their own cigarettes rather than purchase them. Handmade cigarettes are made by grinding tobacco then stuffing pre-rolled paper tubes with the ground tobacco or placing the ground tobacco on a paper which is then rolled into a tube. A filter may be included in the pre-rolled paper tube or added after to the pre-rolled paper tube or the paper that is rolled into a tube.

Hand rolling cigarette paper around ground material is known but requires dexterity to create a cigarette. Existing hand rolling machines that wrap paper around ground materials may also require a certain amount of dexterity.

Devices such as The Cone Roller™ (www.coneroller.com or www.ryocones.com) create pre-rolled paper tubes, but these devices are not automated and only one tube can be made at a single time. Pre-rolled paper cone filling devices require the tubes to be filled, forcing material into the tube.

Currently, filling devices are not "all-in-one" systems, meaning that other devices are required to grind the ground material, blend the ground material, wrap papers, fill papers etc.

Accordingly, there is a need for an improved single device for forming cigarettes.

SUMMARY

In an aspect, there is provided a device for rolling papers into cigarettes, the device comprising: an openable chamber configured to receive a ground material, the chamber having a first end and a second end; a rolling assembly disposed within the chamber, the rolling assembly receiving paper and forming a paper tube around the ground material, the rolling assembly having a first end and a second; and a first gear assembly at the first chamber end and communicatively connected to the first end of the rolling assembly, and a second gear assembly at the second chamber end and communicatively connected to the second end of the rolling assembly, the first and second gear assemblies activating the rolling assembly when rotated to roll the paper around the ground material forming a cigarette.

In an embodiment, the rolling assembly comprises: a skirt for receiving and retaining the ground material; a first and second roller, the first and second roller communicatively connected to the first and second gear assemblies, the first and second rollers engaging the skirt, opening and closing with the rotation of the first and second gear assemblies thereby opening and closing the skirt; and a paperfeed for inserting the paper therein, the paperfeed communicatively connected to the first and second gear assemblies to roll the paper around, and encase, the ground material on the skirt when the first and second gear assemblies are rotated.

In an embodiment, the cigarette is removable from the second chamber end.

In an embodiment, the chamber is openable for paper to be inserted into the rolling assembly.

In an embodiment, the paperfeed is openable for a user to access the ground material on the skirt.

In an embodiment, the device further comprises a grinder to grind material for depositing into the chamber.

In an embodiment, the device further comprises a blender to blend the ground material for depositing into the chamber.

In an embodiment, the device further comprises a funnel for sifting the ground material for depositing into the chamber.

In an embodiment, the device further comprises a wetting assembly for wetting an end of the paper to seal the cigarette.

In an embodiment, the wetting assembly comprises a sponge on an openable flap of the chamber.

In an embodiment, the material is any material or substance that is capable of being smoked, i.e., a smokeable material or substance.

In an embodiment, the material is an organic material.

In an embodiment, the plant material is any part of a plant.

In an embodiment, the any part of a plant is selected from the roots, the stems, the bark, the leaves, the buds, the flowers, the seeds and any combination thereof.

In an embodiment, the plant material may be dry, semi-dry and/or wet.

In an embodiment, the plant material may be green and/or ripe.

In an embodiment, the material is selected from the group consisting of tobacco, cannabis, an herb and any combinations thereof.

In an embodiment, the material is tobacco.

In an embodiment, the material is a non-tobacco smokeable substance.

In an embodiment, the material is cannabis.

In an embodiment, the cannabis is cannabis containing relatively higher concentrations of tetrahydrocannabinol (THC), also referred to as marijuana or weed.

In an embodiment, the cannabis is cannabis containing relatively lower concentrations of THC, also known as hemp.

In an embodiment, the cannabis is selected from the group consisting of *Cannabis sativa, Cannabis indica, Cannabis ruderalis* and any combinations thereof.

In an embodiment, the cannabis is *Cannabis sativa*.

In an embodiment, the cannabis is *Cannabis indica*.

In an embodiment, the cannabis is *Cannabis ruderalis*.

In an embodiment, the material is marijuana.

In an embodiment, the material is weed.

In an embodiment, the material is hemp.

In an embodiment, the material is an herb.

In an embodiment, the material is a coffee.

In an embodiment, the material is a tea.

In an embodiment, the material is a spice.

In accordance with another aspect, there is provided a device for forming cigarettes, the device comprising: a grinder for grinding a material; a blender for blending the ground material; a funnel for sifting the ground material; an openable chamber for receiving the ground material therein from the funnel, the chamber having a first end and a second end; a rolling assembly disposed within the chamber, the rolling assembly receiving paper and forming a paper tube around the ground material, the rolling assembly having a first end and a second; and a first gear assembly at the first chamber end and communicatively connected to the first end of the rolling assembly, and a second gear assembly at the second chamber end and communicatively connected to the second end of the rolling assembly, the first and second gear assemblies activating the rolling assembly when rotated to roll the paper around the ground material forming a cigarette.

In an embodiment, the rolling assembly comprises: a skirt for receiving and retaining the ground material; a first and second roller the first and second roller communicatively connected to the first and second gear assemblies, the first and second rollers engaging the skirt, opening and closing with the rotation of the first and second gear assemblies thereby opening and closing the skirt; and a paperfeed for inserting the paper therein, the paperfeed communicatively connected to the first and second gear assemblies to roll the paper around, and encase, the ground material on the skirt when the first and second gear assemblies are rotated.

In an embodiment, the cigarette is removable from the second chamber end.

In an embodiment, the chamber is openable for paper to be inserted into the rolling assembly.

In an embodiment, the paperfeed is openable for a user to access the ground material on the skirt.

In an embodiment, the device further comprises a wetting assembly for wetting an end of the paper to seal the cigarette.

In an embodiment, the wetting assembly comprises a sponge on an openable flap of the chamber.

In an embodiment, the material is any material or substance that is capable of being smoked, i.e., a smokeable material or substance.

In an embodiment, the material is an organic material.

In an embodiments, the material is a plant material.

In an embodiment, the plant material is any part of a plant.

In an embodiment, the any part of a plant is selected from the roots, the stems, the bark, the leaves, the buds, the flowers, the seeds and any combination thereof.

In an embodiment, the plant material may be dry, semi-dry and/or wet.

In an embodiment, the plant material may be green and/or ripe.

In an embodiment, the material is selected from the group consisting of tobacco, cannabis, marijuana, weed, hemp, an herb and any combinations thereof.

In an embodiment, the material is tobacco.

In an embodiment, the material is a non-tobacco smokeable substance.

In an embodiment, the material is cannabis.

In an embodiment, the cannabis is cannabis containing relatively higher concentrations of tetrahydrocannabinol (THC), also referred to as marijuana or weed.

In an embodiment, the cannabis is cannabis containing relatively lower concentrations of THC, also known as hemp.

In an embodiment, the cannabis is selected from the group consisting of *Cannabis sativa, Cannabis indica, Cannabis ruderalis* and any combinations thereof.

In an embodiment, the cannabis is *Cannabis sativa*.

In an embodiment, the cannabis is *Cannabis indica*.

In an embodiment, the cannabis is *Cannabis ruderalis*.

In an embodiment, the material is marijuana.

In an embodiment, the material is weed.

In an embodiment, the material is hemp.

In an embodiment, the material is an herb.

In an embodiment, the material is coffee.

In an embodiment, the material is tea.

In an embodiment, the material is a spice.

In accordance with another aspect, there is provided a device for forming a cigarette tube, the device comprising: a rolling assembly, the rolling assembly for receiving paper and forming a paper tube, the rolling assembly having a first end and a second end; a mandrel disposed in the rolling assembly, the rolling assembly rolling the paper around the mandrel to form the cigarette tube, and a retainer for retaining the first end and second end of the rolling assembly and the mandrel.

In an embodiment, the rolling assembly comprises: a skirt for receiving and a paper; and a first and second roller inserted into the skirt, the first and second roller communicatively connected in arched slots in the retainer, the first and second rollers moving along the arched slots thereby opening and closing the skirt around the mandrel, wherein, the opening and closing of the skirt turns the paper the mandrel, forming a cigarette tube.

In an embodiment, the device further comprises a paperfeed for dispensing the paper into the rolling assembly, the paperfeed communicatively connected to the retainer.

In an embodiment, the retainer retains the mandrel via a through-hole.

In an embodiment, when pushed, the mandrel is propelled through the through-hole, exposing an end of the mandrel around which a paper filter is wound.

In an embodiment, when released after being pushed, the mandrel is propelled back through the through-hole by piston motion.

In an embodiment, the device further comprises a wetting assembly retained by the retainer for wetting the paper to seal the cigarette tube.

In an embodiment, the wetting assembly is a sponge in a rotatable sponge holder, the rotatable sponge holder rotating to move sponge over the paper in the skirt.

In an embodiment, the mandrel is removable from the retainer allowing the cigarette tube to be removed from the mandrel.

In an embodiment, the retainer is a plurality of brackets having a plurality of slots to retain the rolling assembly and the mandrel.

In an embodiment, the retainer is a plurality of brackets having a plurality of slots to retain the rolling assembly, the mandrel, and the paperfeed.

In an embodiment, the retainer is a plurality of brackets having a plurality of slots to retain the rolling assembly, the mandrel, and the wetting assembly.

In an embodiment, the plurality of brackets is secured to a surface.

In an embodiment, the retainer is secured to a surface.

In an embodiment, when the mandrel is removed from rolling assembly, the skirt receives ground material around which the cigarette tube is formed.

Further advantages will become apparent to those skilled in the art from reading the following detailed description of the embodiments described and illustrated herein.

BRIEF DESCRIPTION OF THE DRAWINGS

Features and advantages of embodiments will become apparent from the following detailed description, taken in combination with the appended drawings in which:

FIG. 1 is an exploded perspective view of a filler device;

FIG. 6E is a bottom elevation view of the funnel assembly of FIG. 6A;

FIG. 7A is a top perspective view of a roller gear of the device of FIG. 3A;

FIG. 7B is a side view of the roller gear FIG. 7A;

FIG. 7C is a top elevation view of the roller gear of FIG. 7A;

FIG. 7D is an exploded view of the roller gear of FIG. 7A;

FIG. 8A is a bottom perspective view of a first body piece of the chamber of FIG. 3A;

FIG. 8B is a top perspective view of the first body piece of the chamber of FIG. 3A;

FIG. 8C top elevation view of the first body piece of the chamber of FIG. 3A;

FIG. 9A is a top perspective view of a second body piece of the chamber of FIG. 3A;

FIG. 9B is a bottom perspective view of the second body piece of the chamber of FIG. 3A;

FIG. 9C is a bottom perspective view from another side of the second body piece of the chamber of FIG. 3A;

FIG. 9D is a top elevation view of the second body piece of the chamber of FIG. 3A;

FIG. 12A is a top perspective view of a first gearbox of FIG. 2A;

FIG. 12B is a bottom perspective view of the first gearbox of FIG. 2A;

FIG. 12C is a top elevation view of the first gearbox of FIG. 2A;

FIG. 12D is a bottom, elevation view of the first gearbox of FIG. 2A;

FIG. 12E is a top exploded view of the first gearbox of FIG. 2A;

FIG. 12F is a top exploded view of the first gearbox of FIG. 2A, rotated 180 degrees;

FIG. 13 is a perspective view of a first lever of the first gearbox of FIG. 12A;

FIG. 14A is a top perspective view of a first main gear of the first gearbox of FIG. 12A;

FIG. 14B is a bottom perspective view of the first main gear of the first gearbox of FIG. 12A;

FIG. 14C is a bottom elevation view of the first main gear of the first gearbox of FIG. 12A;

FIG. 15 is a perspective view of a first pinion of the first gearbox of FIG. 12A;

FIG. 18A is a bottom perspective view of a second gearbox of FIG. 2A;

FIG. 18B is a top perspective view of the second gearbox of FIG. 2A;

FIG. 18C is a bottom elevation view of the second gearbox of FIG. 2A;

FIG. 18D is a top elevation view of the second gearbox of FIG. 2A;

FIG. 18E is a top exploded view of the second gearbox of FIG. 2A;

FIG. 18F is a bottom exploded view of the second gearbox of FIG. 2A;

FIG. 19 is a perspective view of a second lever of the second gearbox of FIG. 18A;

FIG. 20A is a top view of the second main gear of the second gearbox of FIG. 18A;

FIG. 20B is a side view of the second main gear of the second gearbox of FIG. 18A;

FIG. 20C is a top perspective view of the second main gear of the second gearbox of FIG. 18A;

FIG. 20D is a bottom perspective view of the second main gear of the second gearbox of FIG. 18A;

FIG. 21 is a perspective view of the second pinion of the second gearbox of FIG. 18A;

FIG. 22A is a is a side view of a first bevel gear of the first gearbox of FIG. 18A;

FIG. 22B is a top view of the first bevel gear of the first gearbox of FIG. 18A;

FIG. 23 is a perspective view of a gear handle of FIG. 2A;

FIG. 27A is a top perspective view of a paperfeed of the rolling assembly of FIG. 24 when the paperfeed is open;

FIG. 27B is a bottom perspective view of the paperfeed of the rolling assembly of FIG. 24 when the paperfeed is open;

FIG. 27C is a side view of the paperfeed of the rolling assembly of FIG. 24 when the paperfeed is open;

FIG. 27D is a bottom perspective view of the paperfeed of the rolling assembly of FIG. 24 when the paperfeed is closed;

FIG. 27E is a top perspective view of the paperfeed of the rolling assembly of FIG. 24 when the paperfeed is closed;

FIG. 27F is a side view perspective view of the paperfeed of the rolling assembly of FIG. 24 when the paperfeed is closed;

FIG. 28A is a top perspective view of a lever lockroller of FIG. 2A;

FIG. 28B is a bottom perspective view of the level lockroller of FIG. 2A;

FIG. 29A is a perspective view of a base lock sleeve of FIG. 2A;

FIG. 29B is a top elevation view of the base lock sleeve of FIG. 29A;

FIG. 30A is a top perspective view of a base lock of FIG. 2A;

FIG. 30B is a top elevation view of the base lock of FIG. 30A;

FIG. 30C is a bottom elevation view of the base lock of FIG. 30A;

FIG. 35 is a perspective view of a base knob of FIG. 2A;

FIG. 36A is a perspective view of a base valve of FIG. 2A;

FIG. 36B is another perspective view of the base valve of FIG. 36B;

FIG. 37A is a perspective view of a container of FIG. 2A;

FIG. 37B is another perspective view of the container of FIG. 37A;

FIG. 38A is a perspective view of a lid for the container of FIG. 37A;

FIG. 38B is another perspective view of the lid of FIG. 38A;

FIG. 39A is a perspective view of a tool used in conjunction with the filler device of FIG. 1;

FIG. 39B is a side view of the tool of FIG. 39A;

FIG. 44A is a perspective view of a piston assembly;

FIG. 44B is another perspective view of FIG. 44A;

Figure 44A:
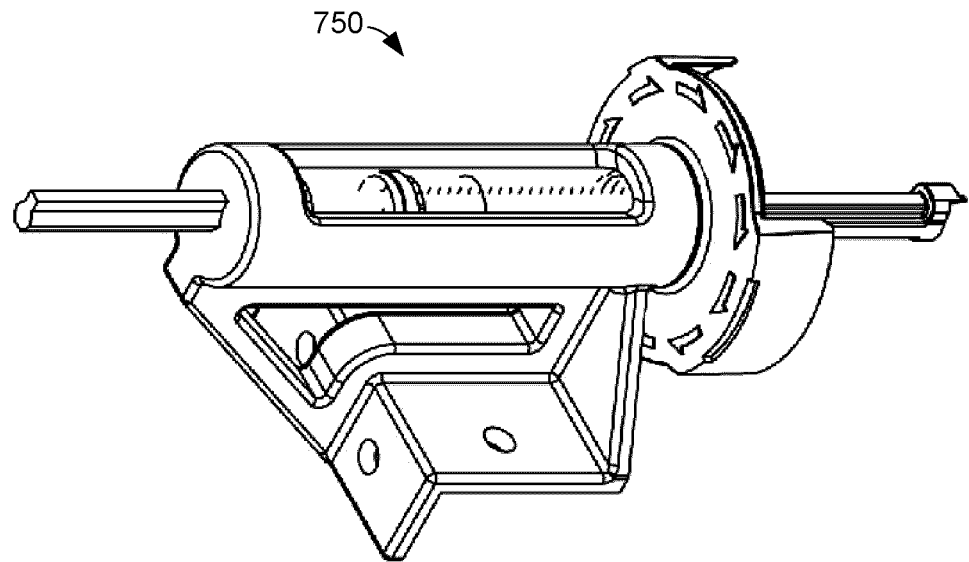
Figure 44B:
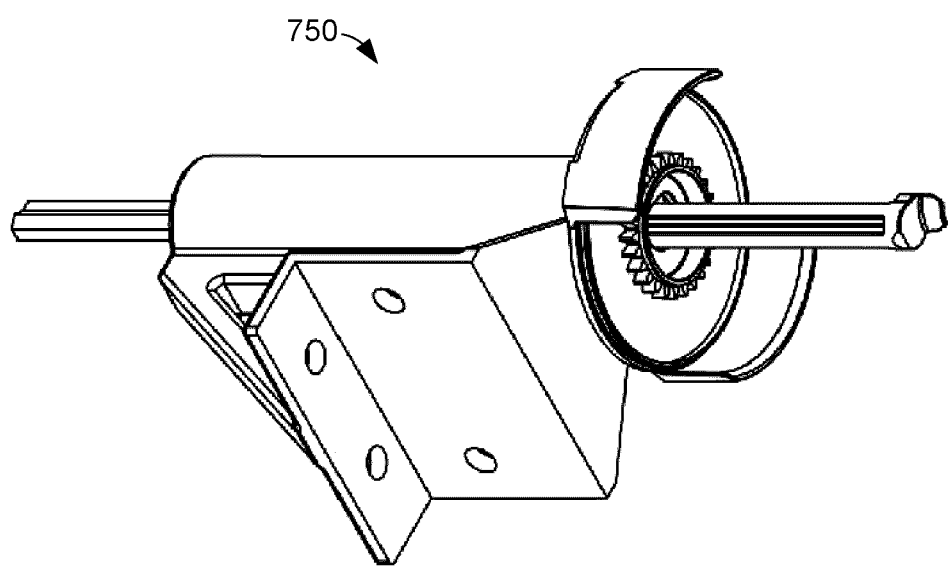
Figure 44C:
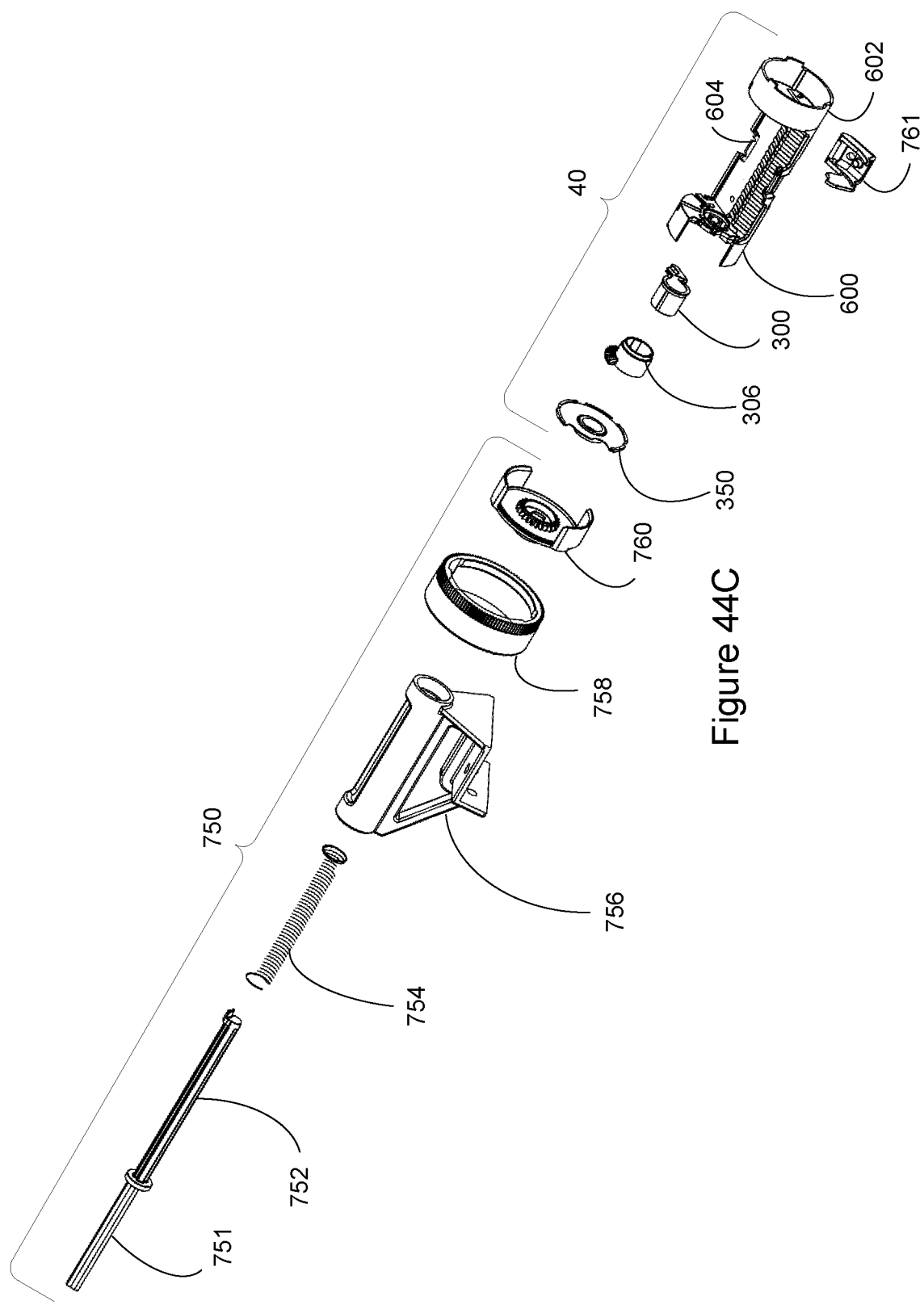
Figure 45A:
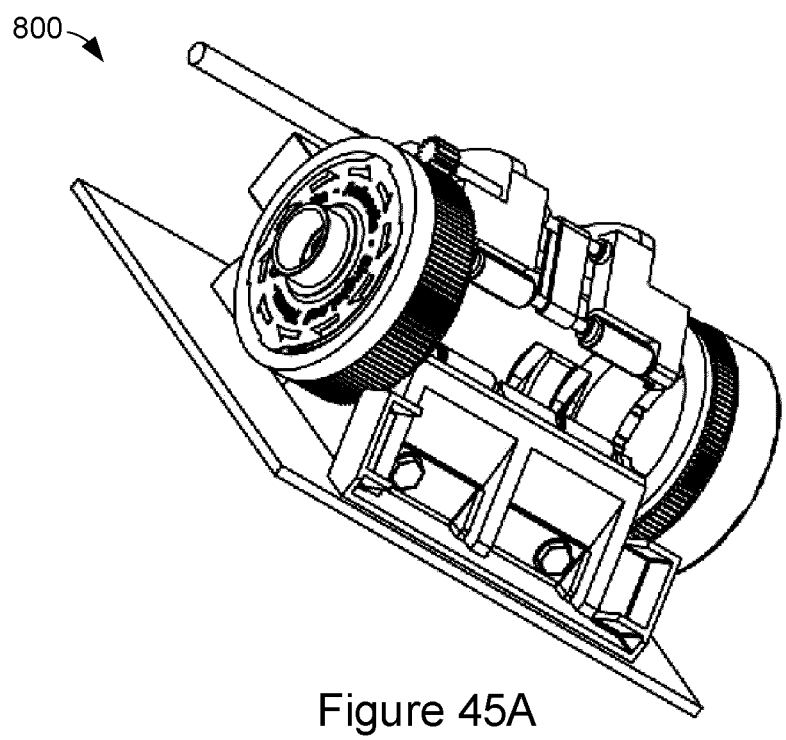
Figure 45B:
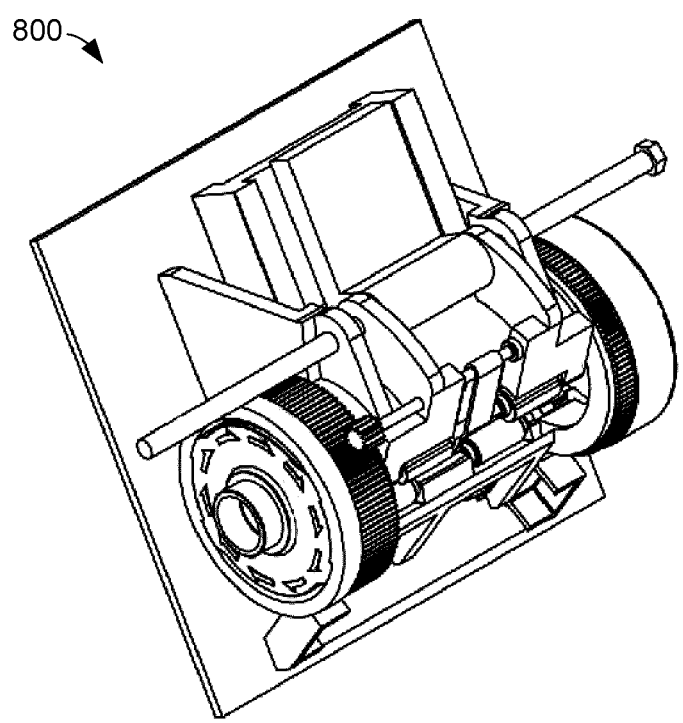
Figure 46:
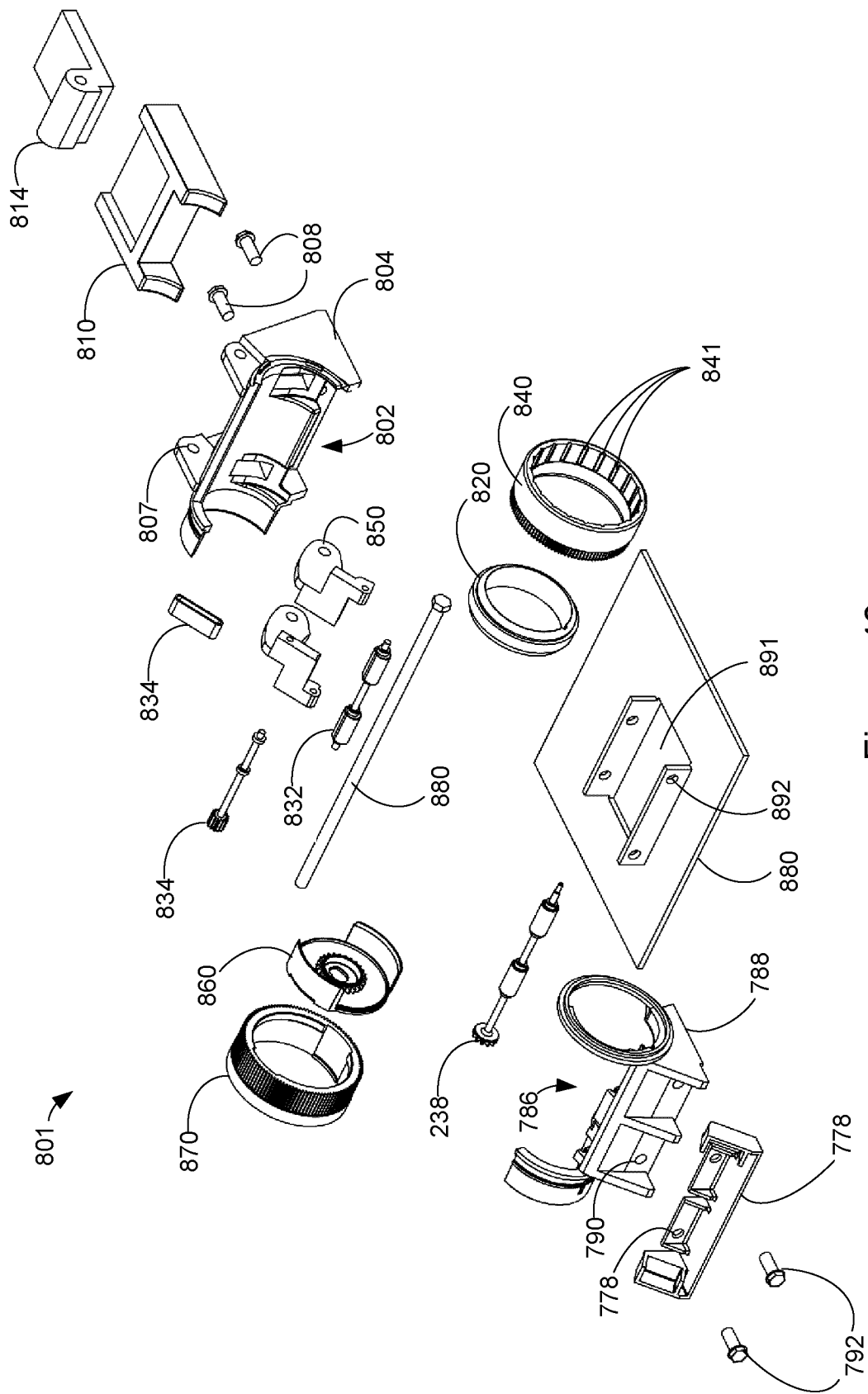
Figure 47:
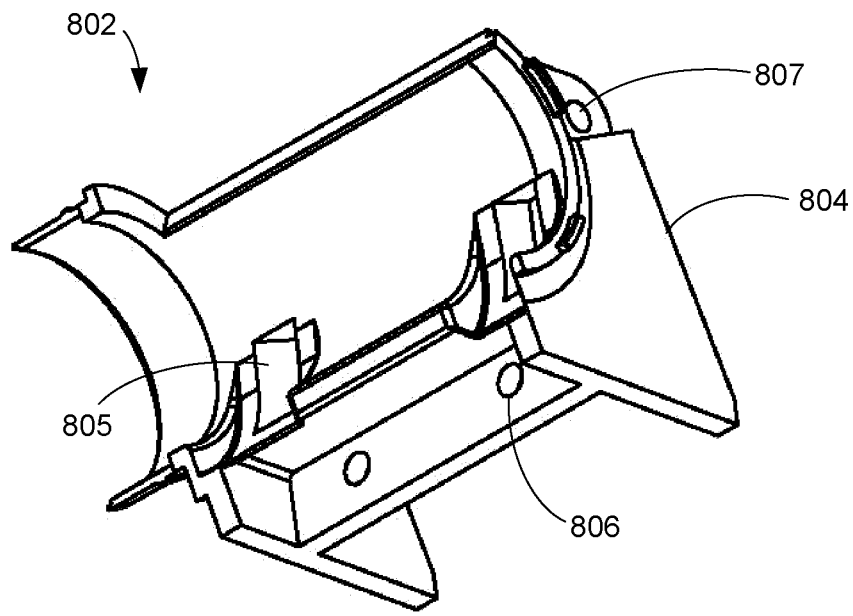
Figure 48:
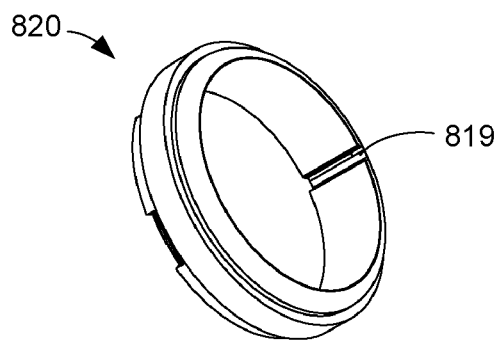
Figures 49A, 49B:
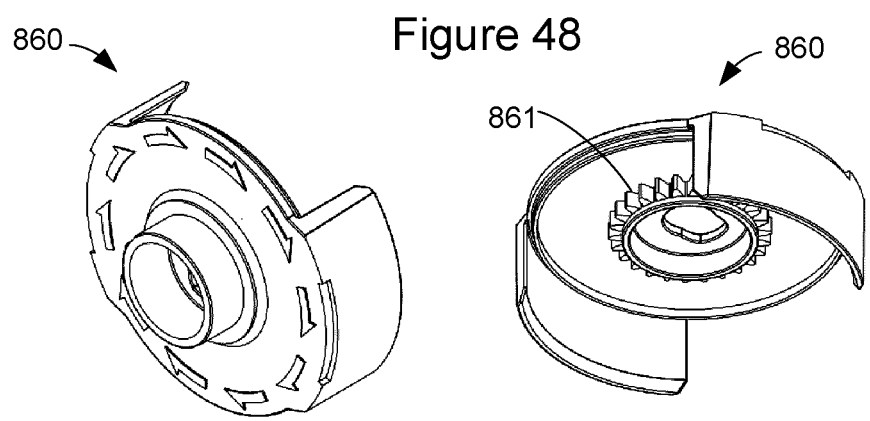
Figures 50A, 50B:
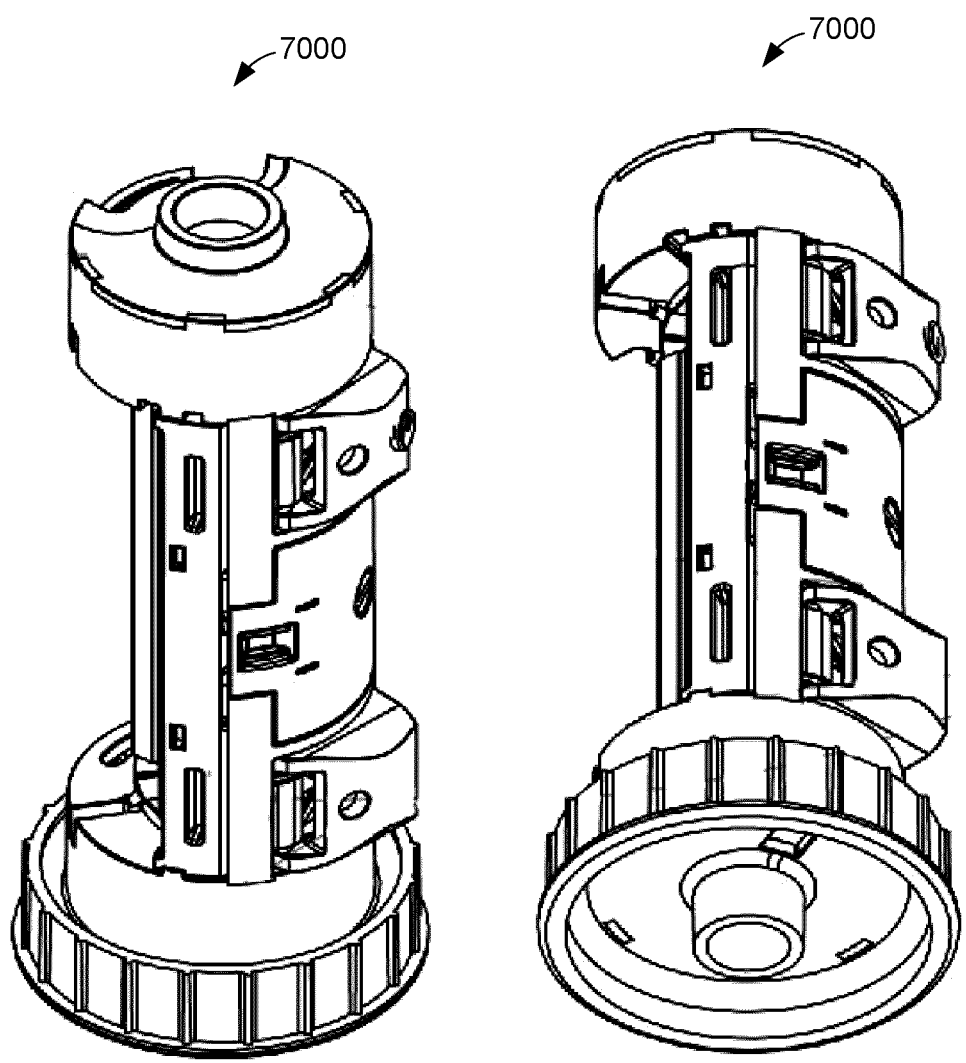
Figure 50C:
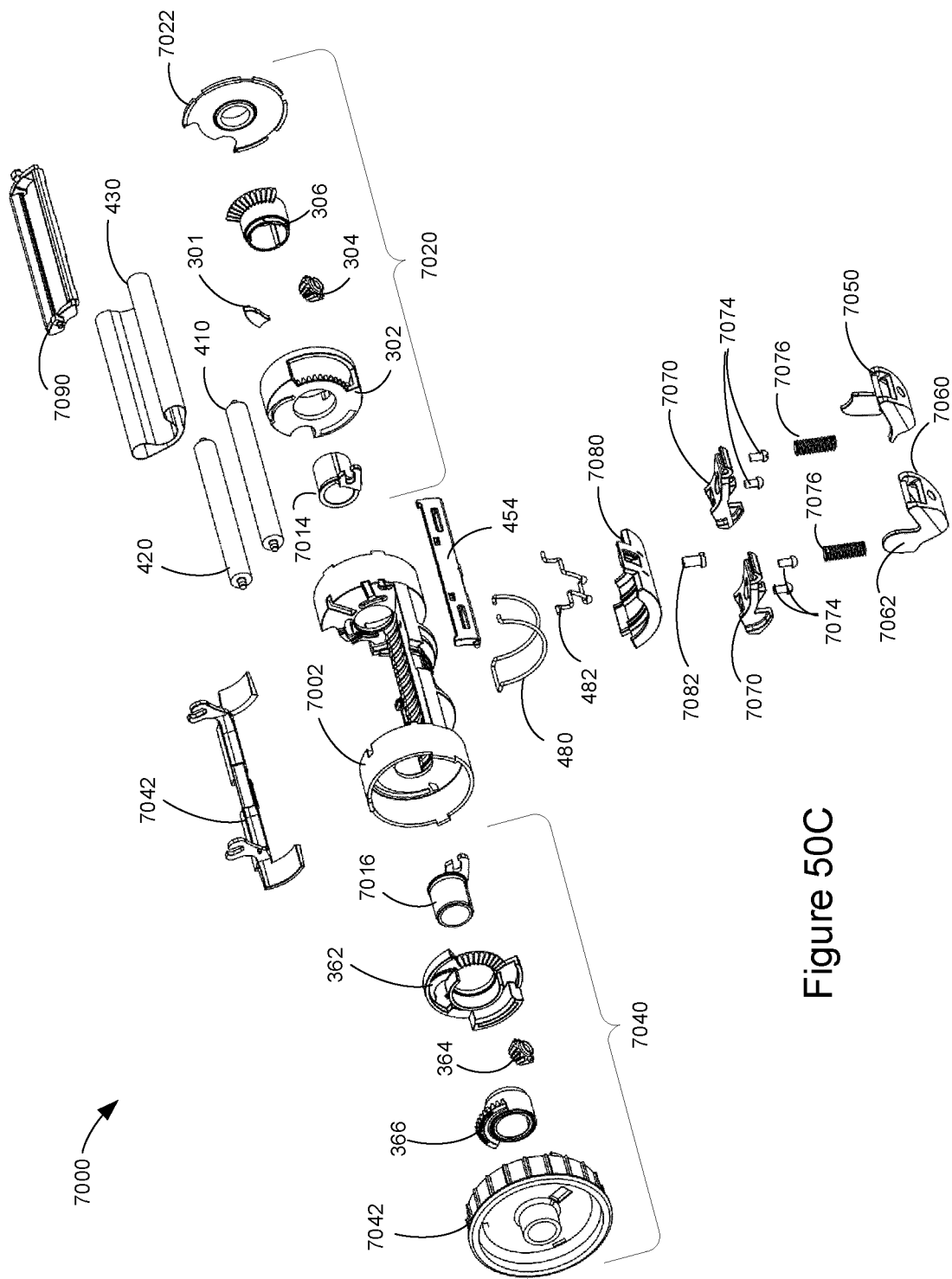
Figure 51C:
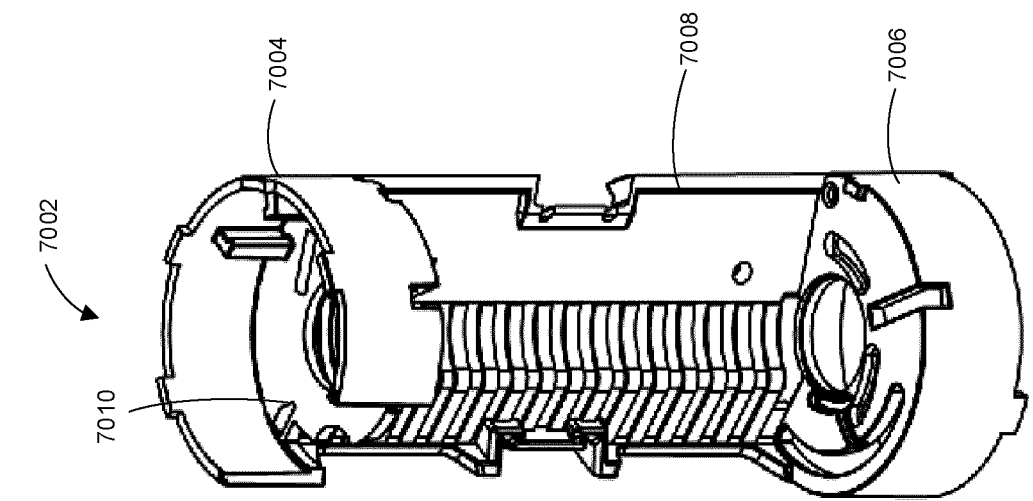
Figure 51B:
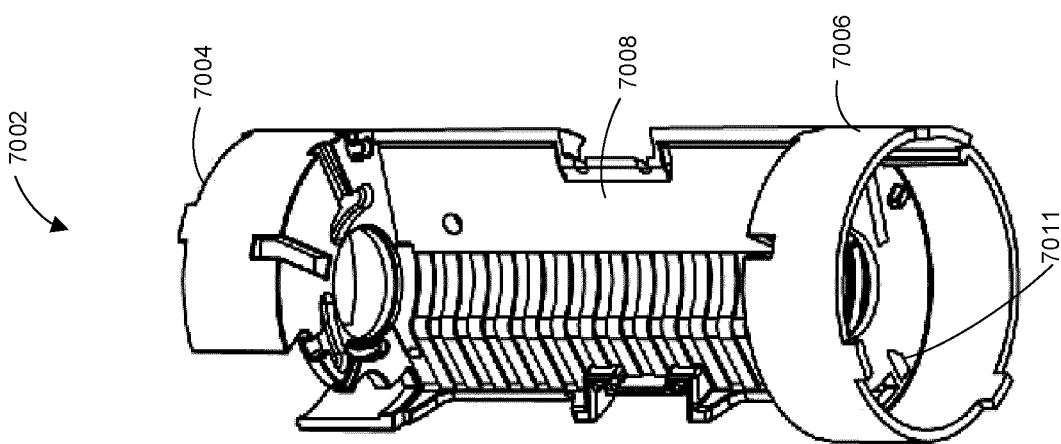
Figure 51A:
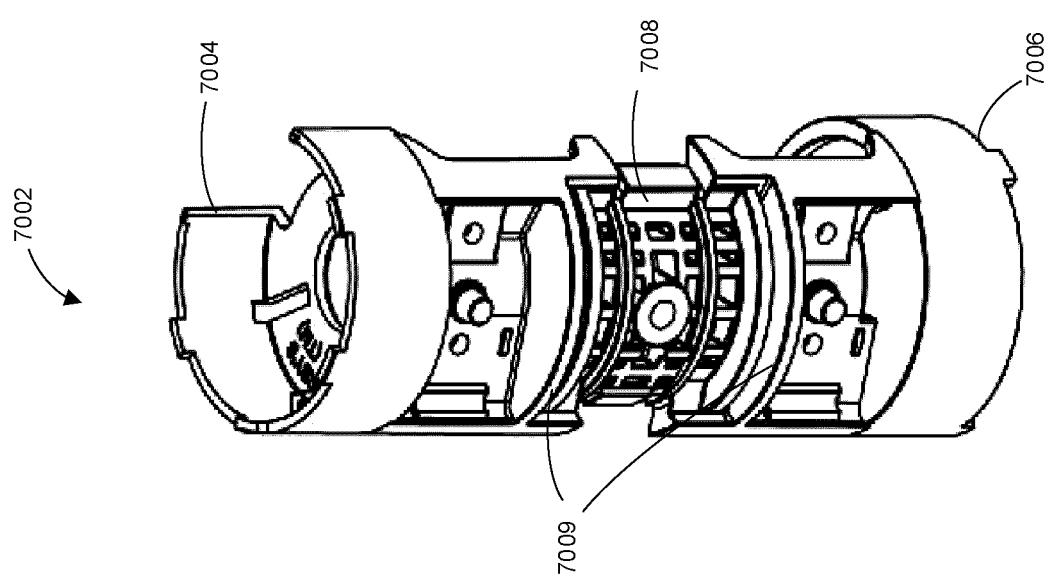
Figure 52A:
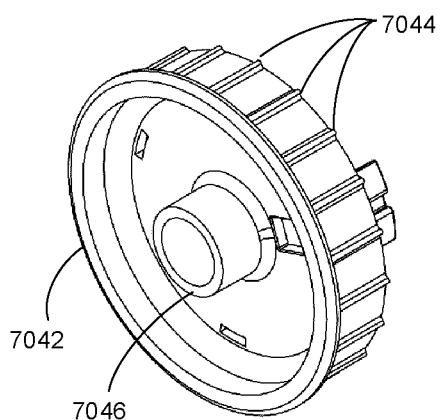
Figure 52B:
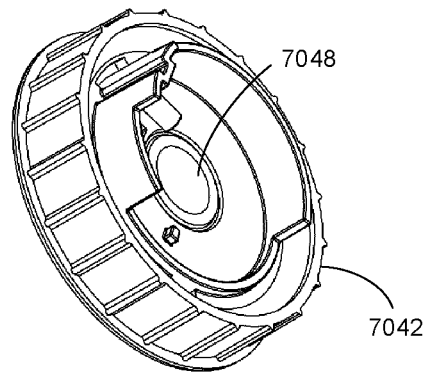
Figure 53:
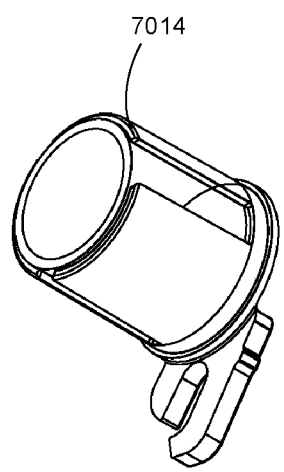
Figure 54:
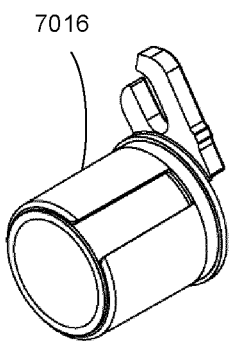
Figure 55:
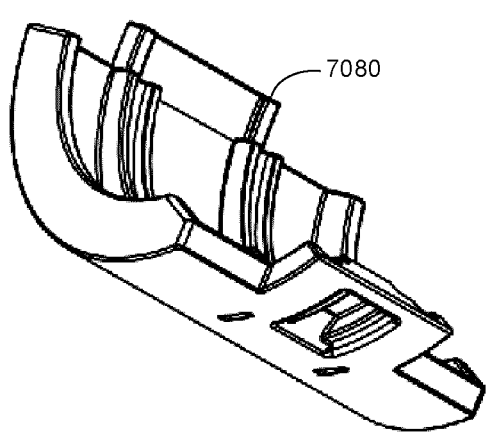
Figure 56:
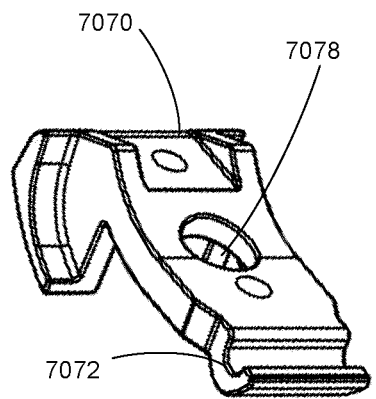
Figure 57:
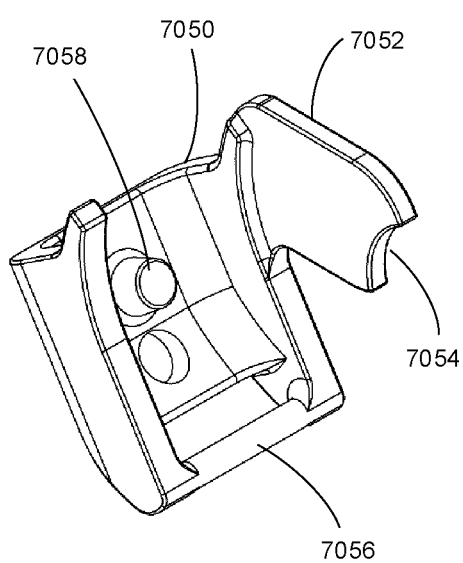
Figure 58A:
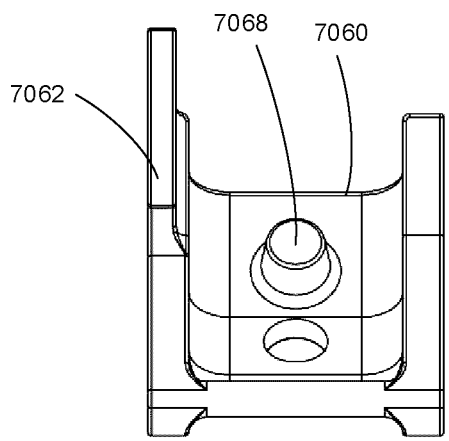
Figure 58B:
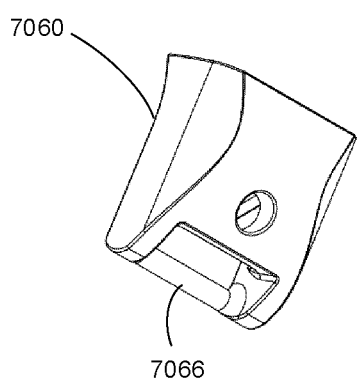
Figure 59A:
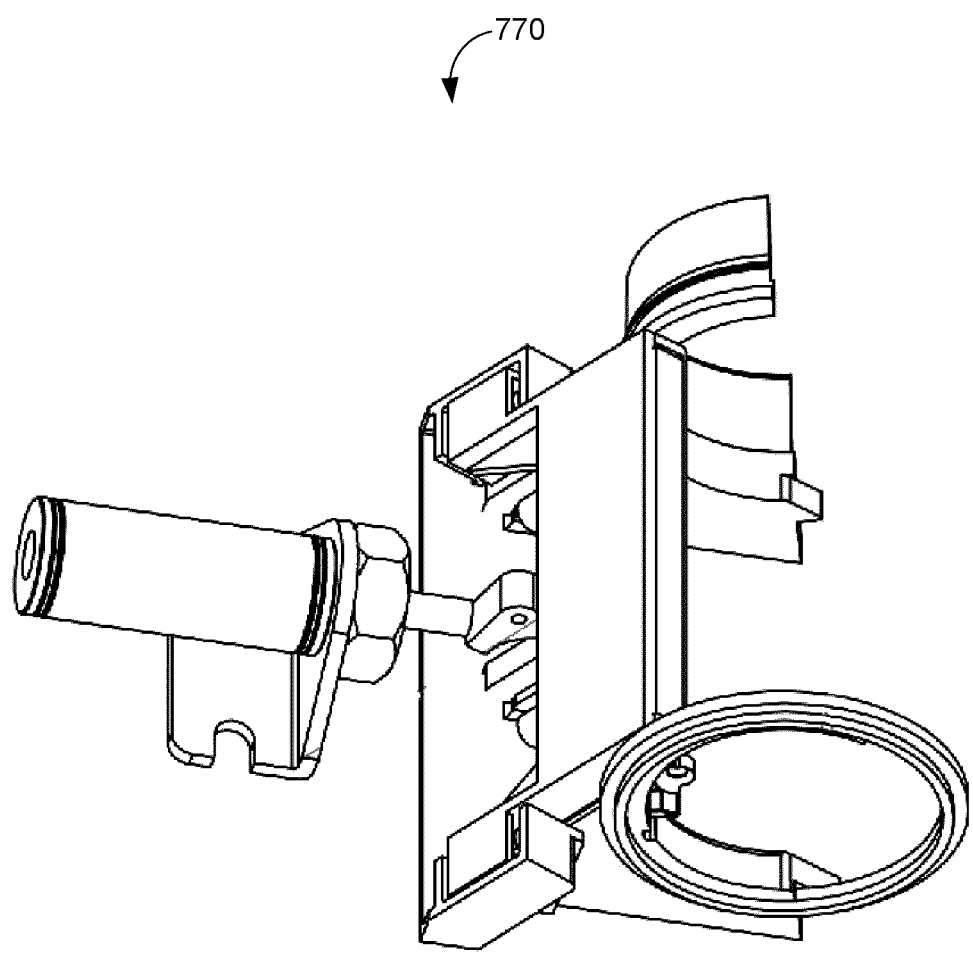
Figure 59B:
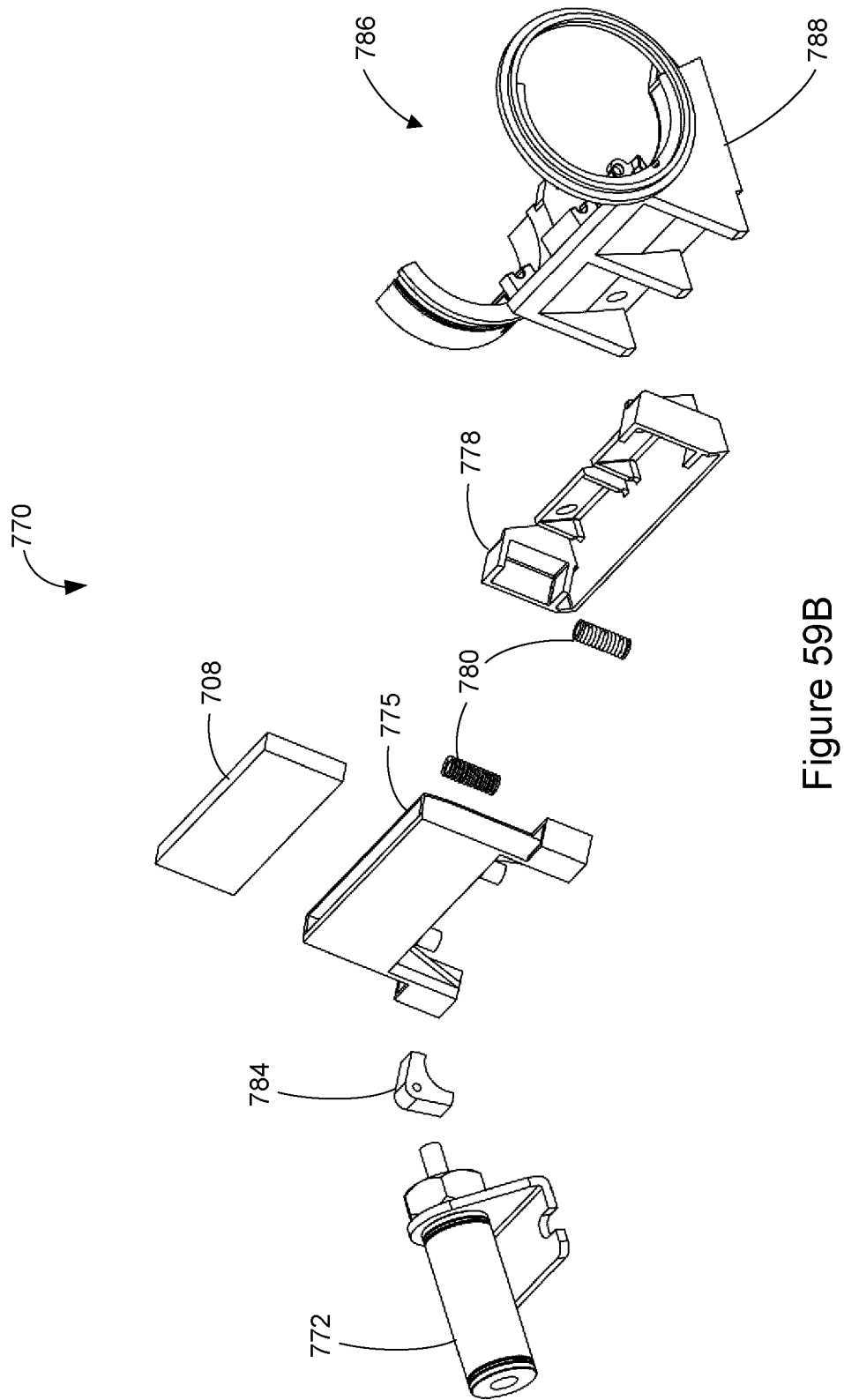
Figure 59A:
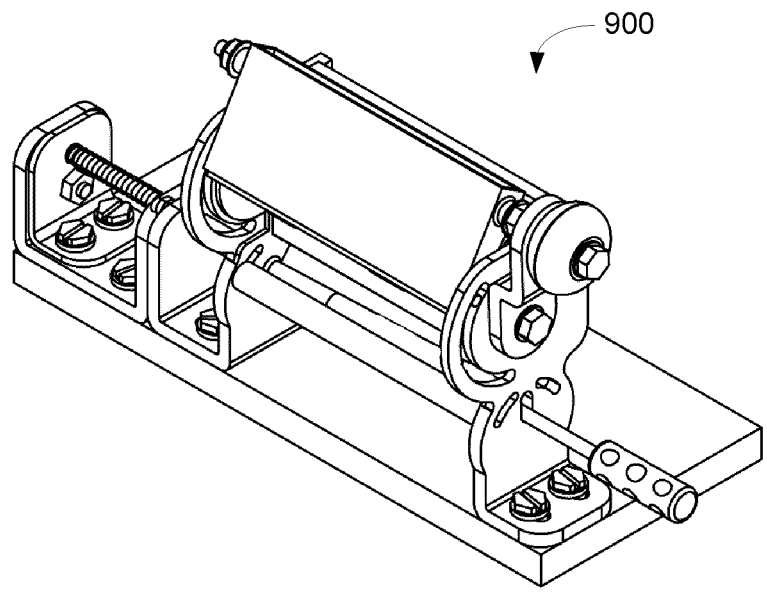
Figure 59B:
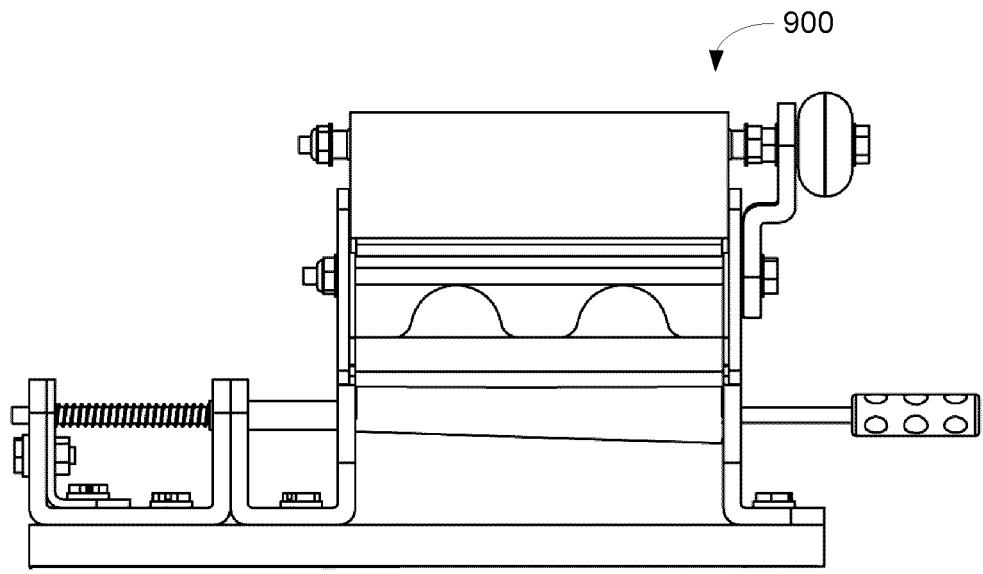
Figure 60C:
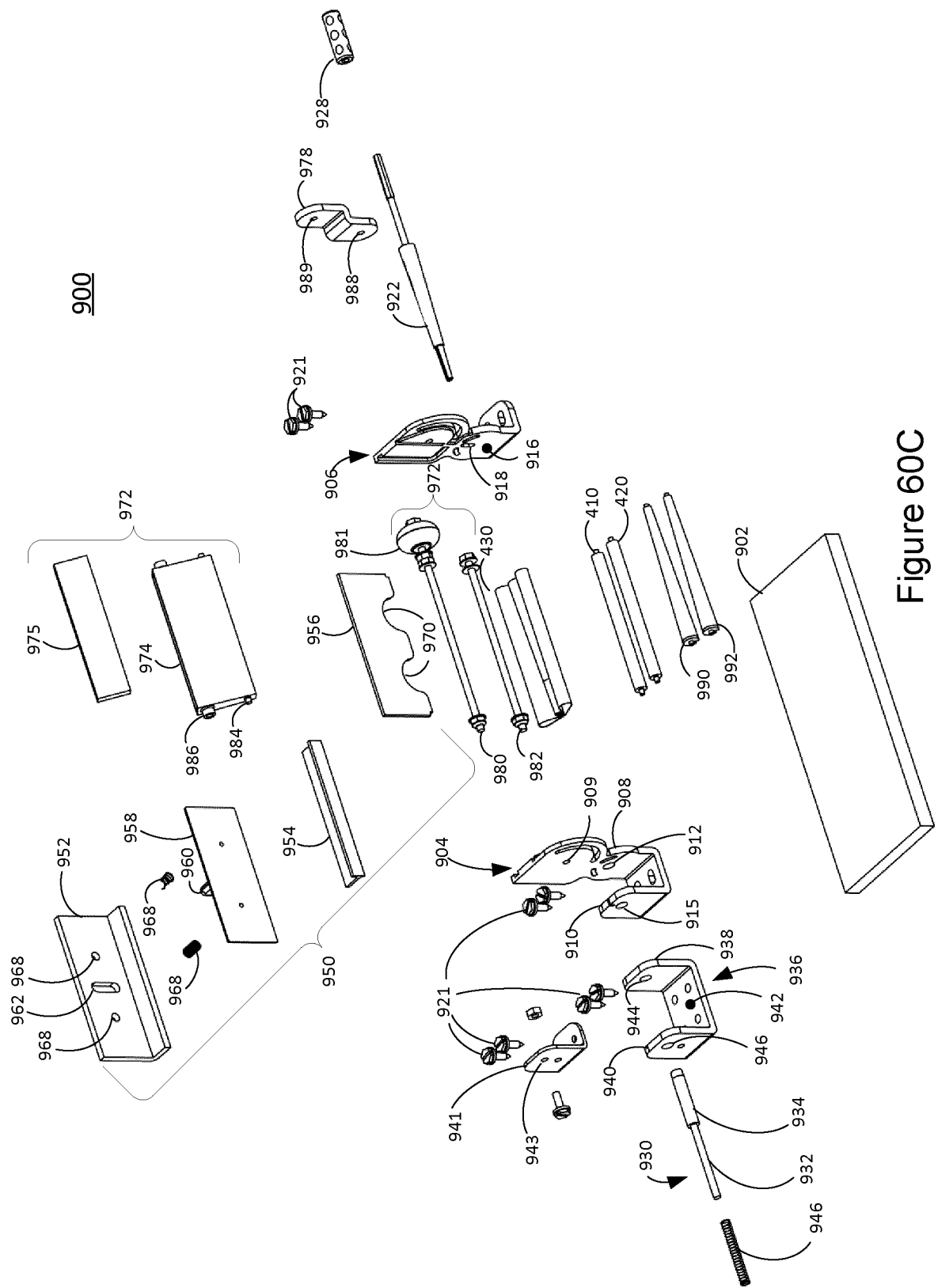
Figure 63:
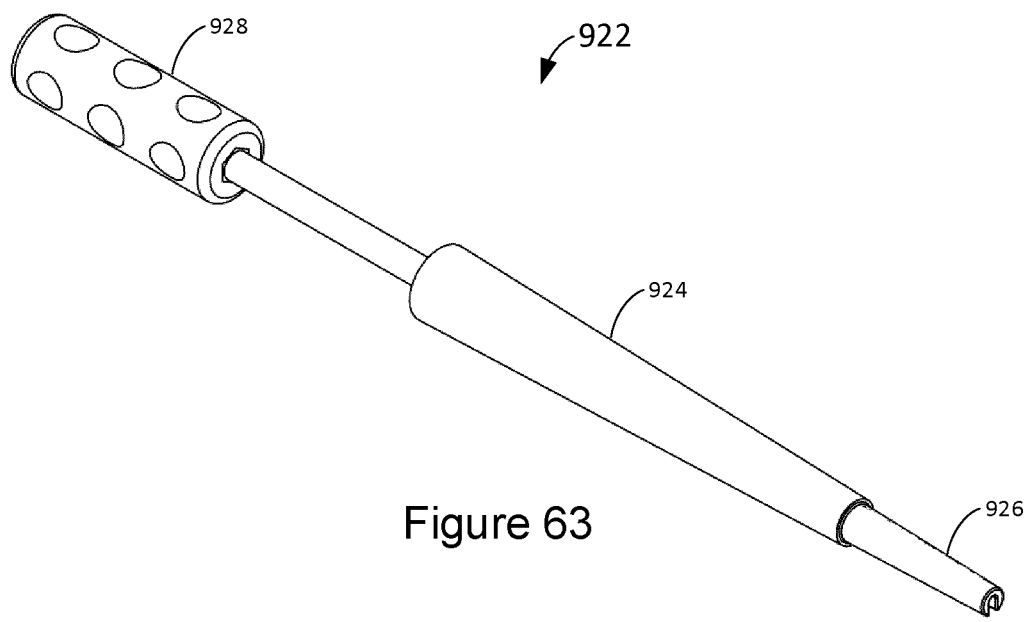
Figure 64:
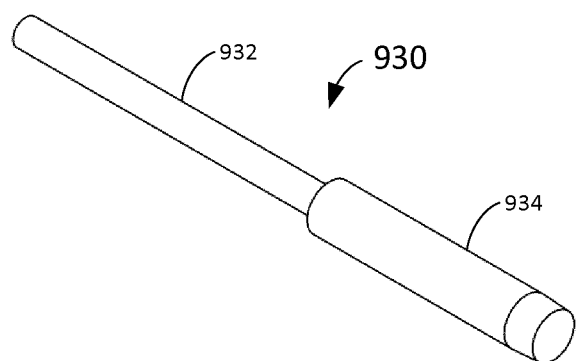
Figure 65:
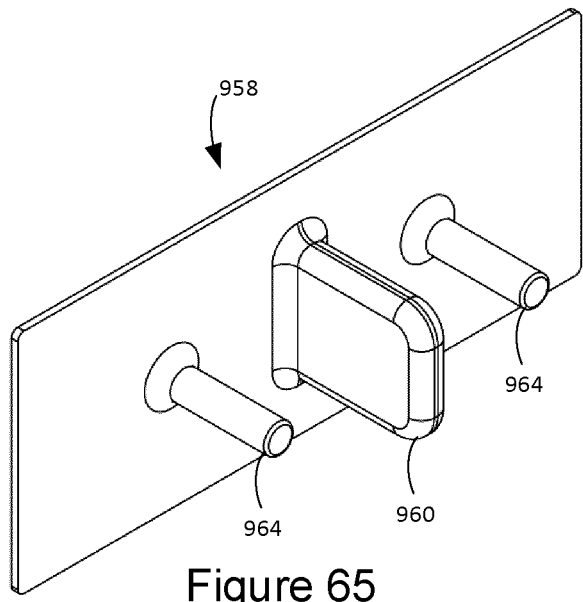
Figure 66:
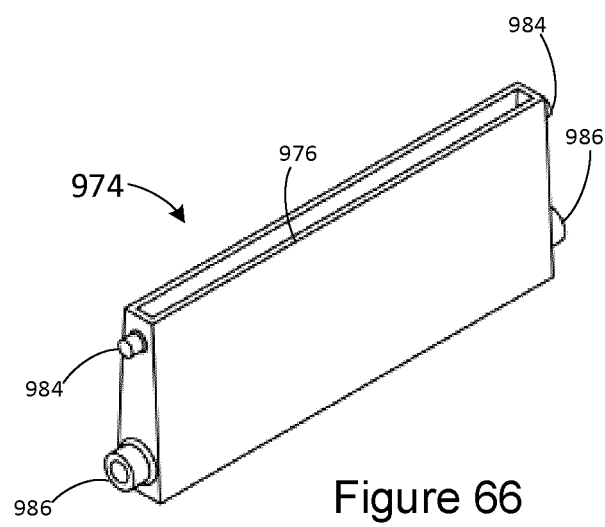
Figure 67:
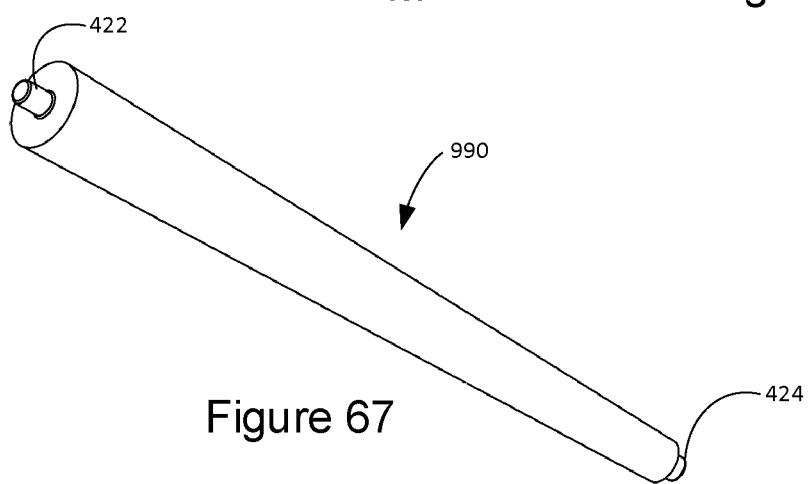

FIG. 44C an exploded view of the piston assembly of FIG. 44A;

FIG. 45A is a perspective view of an embodiment of a stationary system;

FIG. 45B is another perspective view of the stationary system of FIG. 45A;

FIG. 46 is an exploded view of the chamber of FIG. 45A;

FIG. 47 is a perspective view of an embodiment of a second body of a chamber of FIG. 46;

FIG. 48 is a perspective view of an embodiment of a chamber end;

FIG. 49A is a perspective view of the funnel of FIG. 46;

FIG. 49B is another perspective view of the funnel of FIG. 46;

FIG. 50A is a perspective view of an alternative embodiment of the core;

FIG. 50B is another perspective view of the alternative embodiment of the core;

FIG. 50C is an exploded view of the alternative embodiment of the core of FIG. 49A;

FIG. 51A is a perspective view of an alternative embodiment of the chassis of FIG. 50A;

FIG. 51B is another perspective view of an alternative embodiment of the chassis of FIG. 50A;

FIG. 51C is another perspective view of an alternative embodiment of the chassis of FIG. 50A;

FIG. 52A is a perspective view of the base lock of the core of FIG. 50C;

FIG. 52B is another perspective view of the base lock of the core of FIG. 50C;

FIG. 53 is a perspective view of the first lever of the core of FIG. 50C;

FIG. 54 is a perspective view of the second lever of the core of FIG. 50C;

FIG. 55 is perspective view of the wire cover of the core of FIG. 50C;

FIG. 56 is a perspective view of the lever bracket of the core of FIG. 50C;

FIG. 57 is a perspective view of a first chassis lever of the core of FIG. 50C;

FIG. 58 is a top view of a second chassis lever of the core of FIG. 50C;

FIG. 59A is a perspective view of a wetting assembly;

FIG. 59B is an exploded view of the wetting assembly of FIG. 48A;

FIG. 60A is a perspective view of an embodiment of a tube rolling device;

FIG. 60B is a front view of the tube rolling device of FIG. 60A;

FIG. 60C is an exploded view of the tube rolling device of FIGS. 60A and 60B,

FIG. 61A is a perspective view of a first end bracket of the tube rolling device of FIG. 60C;

FIG. 61B is a side view of the first end bracket of FIG. 51B,

FIG. 62 is a perspective view of a second end bracket of the tube rolling device of FIG. 60C;

FIG. 63 is a perspective view of a shaping mandrel of the tube rolling device of FIG. 60C;

FIG. 64 is a perspective view of a piston of the tube rolling device of FIG. 60C;

FIG. 65 is a perspective view of a pull plate of the tube rolling device of FIG. 60C;

FIG. 66 is a perspective view of a sponge holder of the tube rolling device of FIG. 60C; and FIG. 67 is a perspective view of a roller of the tube rolling device of FIG. 60C.

Similar references are used in different figures to denote similar components.

DETAILED DESCRIPTION OF THE EMBODIMENTS

Turning now to FIG. 1, an exploded perspective view of filler device and is generally identified by reference numeral 10. The device 10 has a generally and substantially cylindrical shape, thus, the various elements of the device 10 are generally and substantially cylindrically shaped. As can be seen, the device 10 comprises a grinder 20 (shown in FIGS. 4A and 4B), a blender 30 (shown in FIGS. 5A-5C), a core 40 (shown in FIGS. 2A-2C), a chamber 50 (shown in FIGS. 3A-3C) and a storage unit 60. The grinder 20 is connected to the blender 30 which is also connected to the chamber 50. The core 40 is inserted into the chamber 50 and connected thereto. The storage unit 60 is connected to the core 40. As shown in FIGS. 1, and 1A to 3C, when the grinder 20, blender 30, core 40, chamber 50 and storage unit 60 are connected in this configuration, the device 10 forms a single unit for grinding material and depositing the ground material into the core 40 as will be explained in more detail below.

Figure 1A:
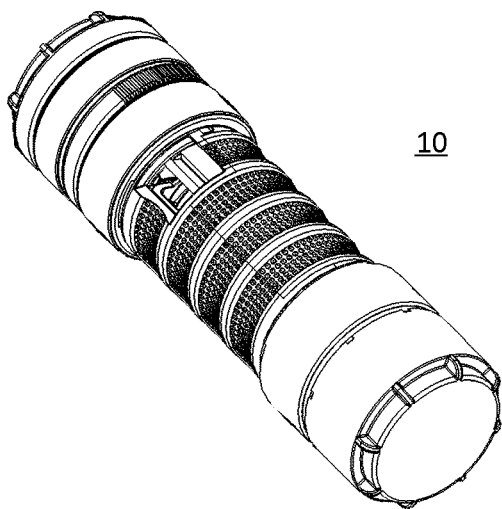
FIG. 1A is a perspective view of the filler device of FIG. 1 as assembled.
Figure 1B:
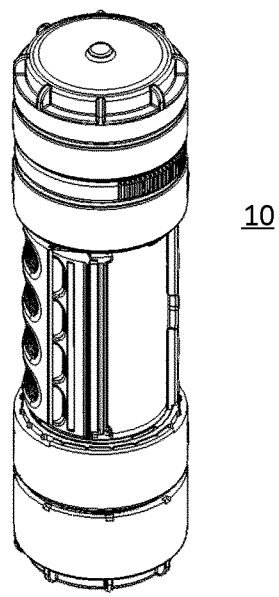
FIG. 1B is a front perspective view of the filler device of FIG. 1.
Figure 1C:
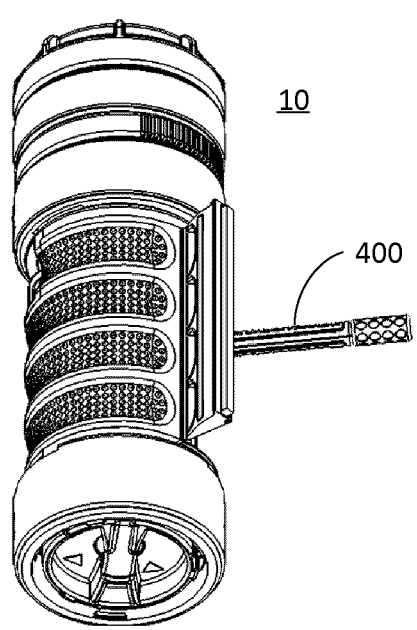
FIG. 1C is a bottom perspective view of the filler device of FIG. 1 with the container removed and the door opened.
Figure 1D:
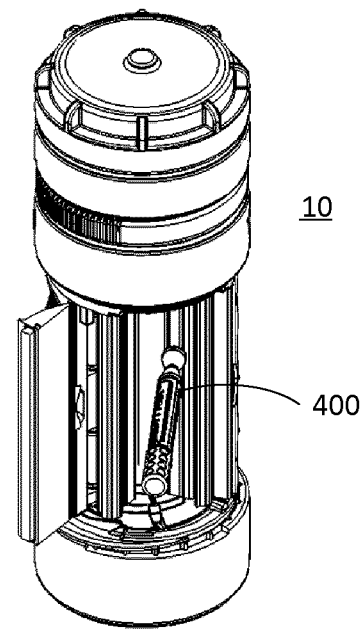
FIG. 1D is a top perspective view of the filler device of FIG. 1 with the container removed and the door opened.
Figure 2A:
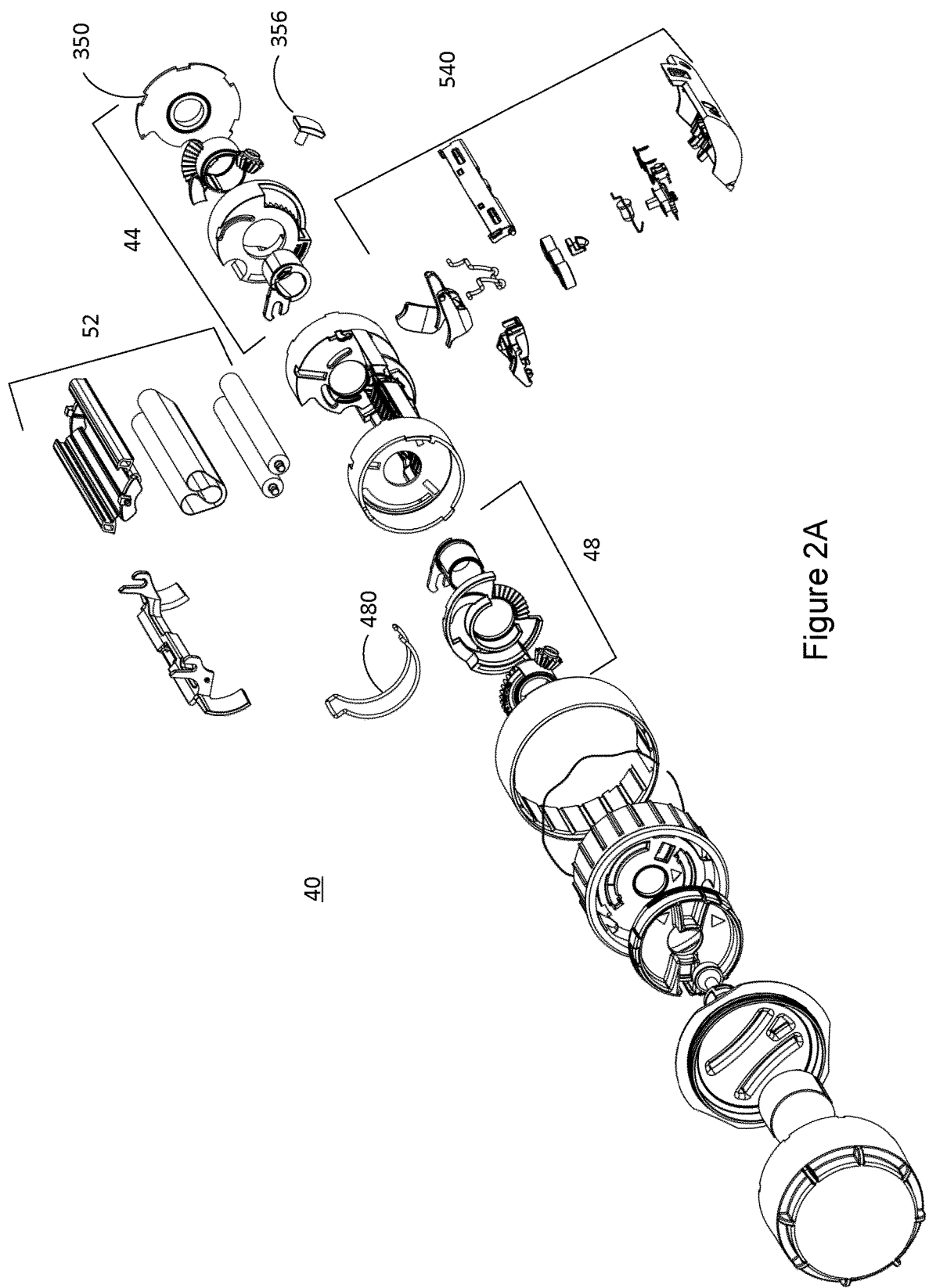
FIG. 2A is an exploded perspective view of the core of the filler device of FIG. 1.
Figure 2C:
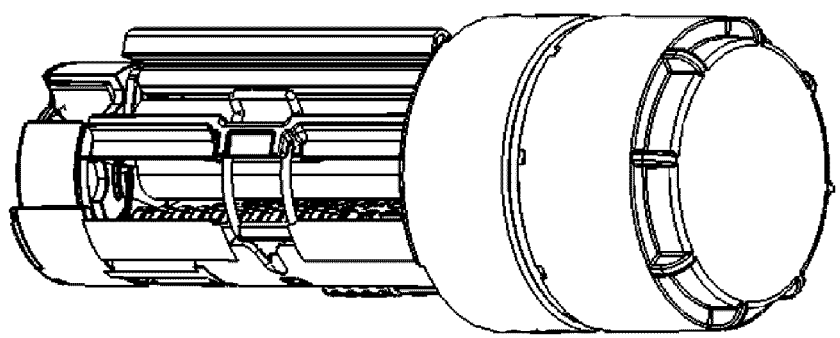
FIG. 2C is a bottom perspective view of the assembled core of FIG. 2A.
Figure 2B:
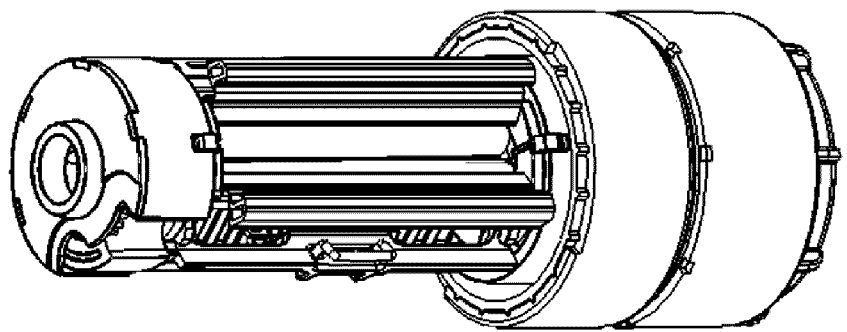
FIG. 2B is a top perspective view of the assembled core of FIG. 2A.

FIGS. 2A to 2C show the core 40. The core comprises a first gearbox 44 and a second gearbox 48, a rolling assembly 52, an LED assembly 54, and a container 500.

Figure 3A:
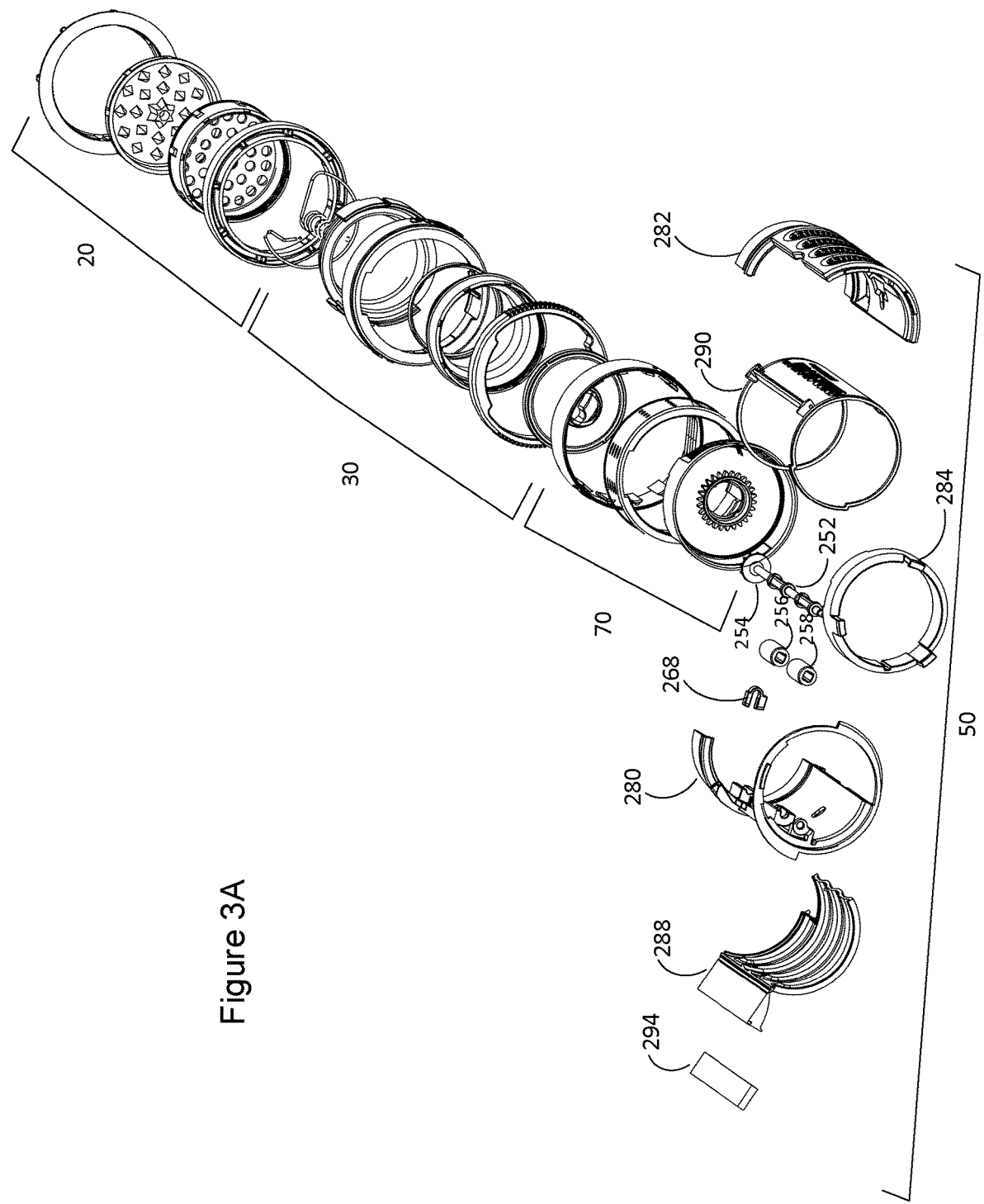
FIG. 3A is an exploded perspective view of the chamber of FIG. 1.
Figure 3B:
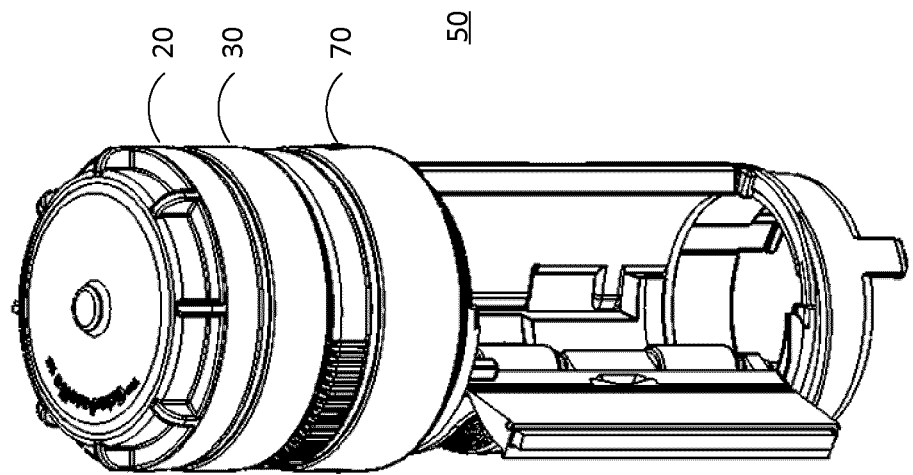
FIG. 3B is a top perspective view of the assembled chamber of FIG. 3A.
Figure 3C:
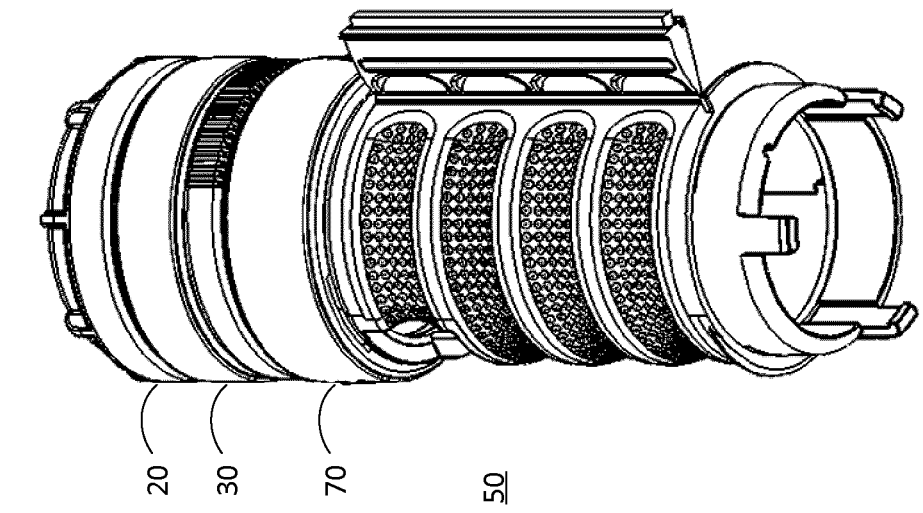
FIG. 3C is a bottom perspective view of the assembled core of FIG. 2A.

FIGS. 3A to 3C show the chamber 50 of the filler device 10. The chamber 50 is connected to the funnel assembly 70, which in turn is connected to the blender, which is connected to the grinder 20.

Figures 4A, 4B:
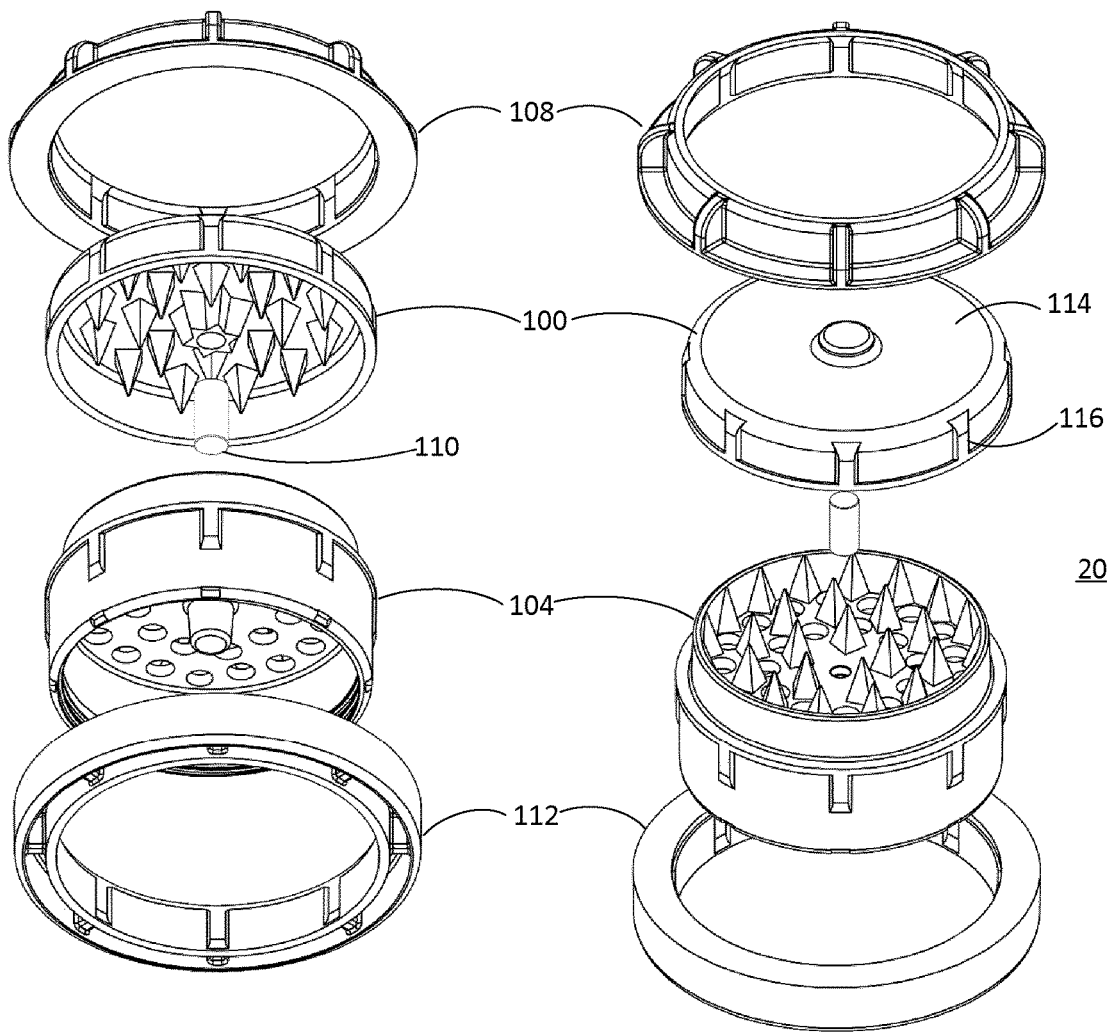
FIG. 4A is a bottom exploded view of the grinding assembly of FIG. 1.
FIG. 4B is a top exploded view of the grinding assembly of FIG. 1

FIGS. 4A and 4B show the grinder 20. The grinder 20 is configured to grind material, such as dried organic material. The grinder 20 comprises a first grinding unit 100, a second grinding unit 104, a first sleeve 108, a second sleeve 112, a first magnet 102 within the first grinding unit 100, and a second magnet 106 within the second grinding unit.

Figure 4F:
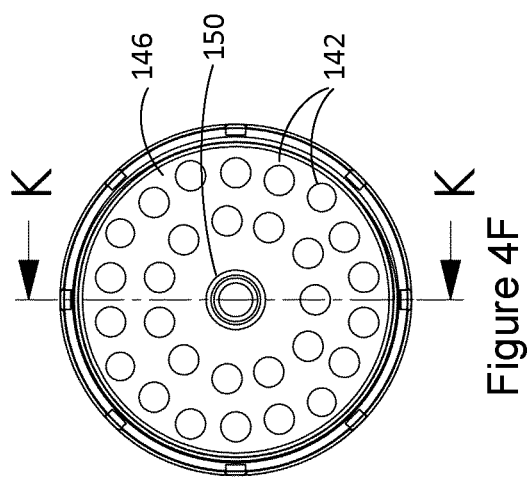
FIG. 4F is a bottom elevation of the second grinding unit of FIGS. 4A and 4B.
Figure 4E:
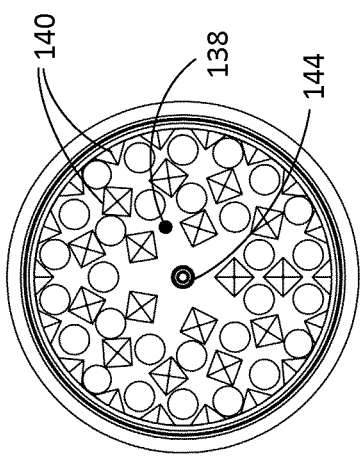
FIG. 4E is a top elevation of the second grinding unit of FIGS. 4A and 4B.
Figure 4G:
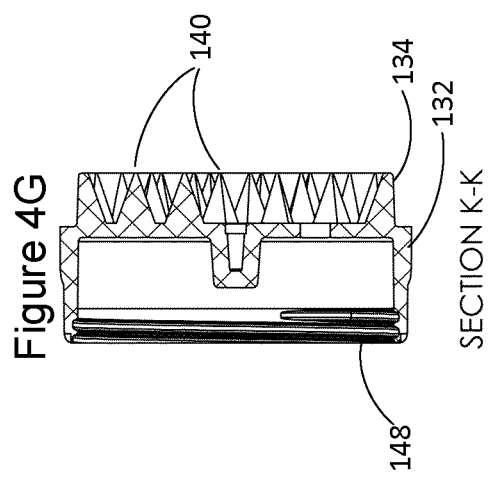
FIG. 4G is a cross section of the second grinding unit of FIG. 4F.
Figure 4C:
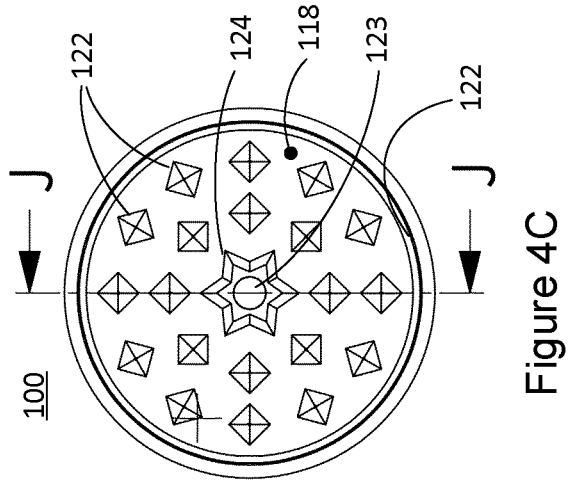
FIG. 4C is a top elevation of the first grinding unit of FIGS. 4A and 4B.
Figure 4D:
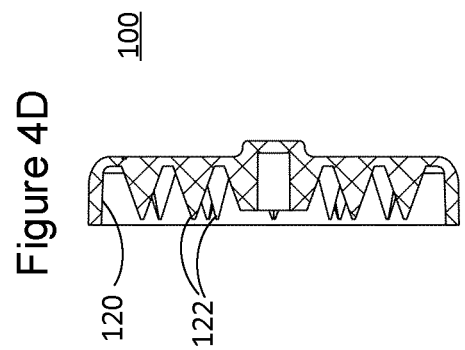
FIG. 4D is a cross section of the first grinding unit of FIG. 4C.

The first grinding unit 100, shown in more detail in FIGS. 4C and 4D, comprises an outer surface 114, a first gripping surface 116, an inner surface 118, an inner wall surface 120, projections 122, a protrusion 124 and a first magnetic element 102. The projections 122 extend vertically from the inner surface 118. While there may be any number of projections 122 on the inner surface to effect grinding, in this embodiment, there are 20 projections. Furthermore, in this embodiment, the projections 122 are generally and substantially conically shaped. The first magnetic element 110 is housed within a central aperture 123 of the protrusion 122. The protrusion 122 is generally and substantially centrally located as well as generally and substantially star-shaped.

The second grinding unit 104, shown in more detail in FIGS. 4E to 4G, comprises an outer surface 132, a rim 134, a receiving surface 136, an inner surface 138, offset projections 140, apertures 142, a central aperture 144, and a threaded surface 148. The offset projections 140 extend vertically from the inner surface 138. In this embodiment, the offset projections are generally and substantially conically shaped offset projections 140. While there may be any number of projections 140 on the inner surface 138 to effect grinding, in this embodiment, there are 34 offset projections. The apertures 142 are distributed between the projections 140. The apertures 142 allow ground material to pass therethrough by gravity. The central aperture 144 is generally and substantially conically shaped. The central aperture 144 holds a second magnet (not shown) to keep the first grinding unit and second grinding unit together. The central aperture 144 forms a central protrusion 150 from the bottom surface 146 of the second grinding unit 104. The central protrusion 150 is inserted into the auger of the blending unit 20 explained in more detail below. The threaded surface 148 is threaded for connection to the blender 30 which will be explained in more detail below.

The first sleeve 108 is shaped to fit around the outer surface 114 of the first grinder unit 100 and may be used to provide grip for the grinder 20. The first sleeve 108 may be shaped like a spur gear to be able to be attached to a motor for automation.

The second sleeve 112 is shaped to fit around the outer surface 132 of the second grinder unit 104 and may be used to provide grip for the grinder 20. The second sleeve 112 may be shaped like a spur gear to be able to be attached to a motor for automation.

In operation, the first grinding unit 100 is removably seated on the second grinding unit 104 when the inner wall surface 120 of the first grinding unit 100 abuts the rim 134 of the second grinding unit 104. The first grinding unit 100 is rotatable relative to the second grinding unit 104. The projections 122 of the first grinding unit 100 and the offset projections 140 of the second grinding unit 104 are positioned such that prior to, and during rotation of the first grinding unit 100 relative to the second grinding unit 104, the projections 122 and offset projections 140 do not directly connect each other.

The second magnetic element in the second grinding unit 104 is magnetically attracted to the first magnetic element 110 of the first grinding unit 100 when the first grinding unit 100 is seated on the second grinding unit 104. The magnetic elements are magnetized such that the first grinding unit 100 will stay affixed to the second grinding unit 104 in any orientation and such that a user may remove the first grinding unit 100 from the second grinding unit 104 without overly significant effort.

While FIGS. 4A to 4G show one possible embodiment for the grinder 20, other configurations may be possible. For example, several embodiments for the grinder are discussed in U.S. Pat. No. 9,427,020, which is incorporated herein by reference.

Returning to FIG. 1, the blender 30 comprises an auger 200, a sleeve thread 204, an adapter sleeve 208, a sleeve 210, and an overmoulding 212.

Figure 5:
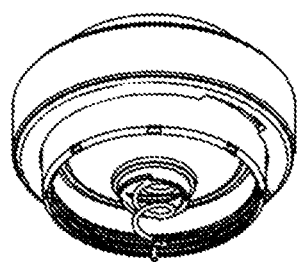
FIG. 5A is a top perspective of the blending unit of FIG. 1.
FIG. 5B is a bottom perspective of the blending unit of FIG. 1.
FIG. 5C is an exploded view of the blending unit of FIGS. 5A and 5B.
Figure 5:
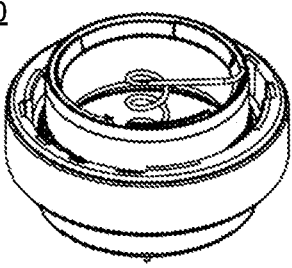
Figure 5:
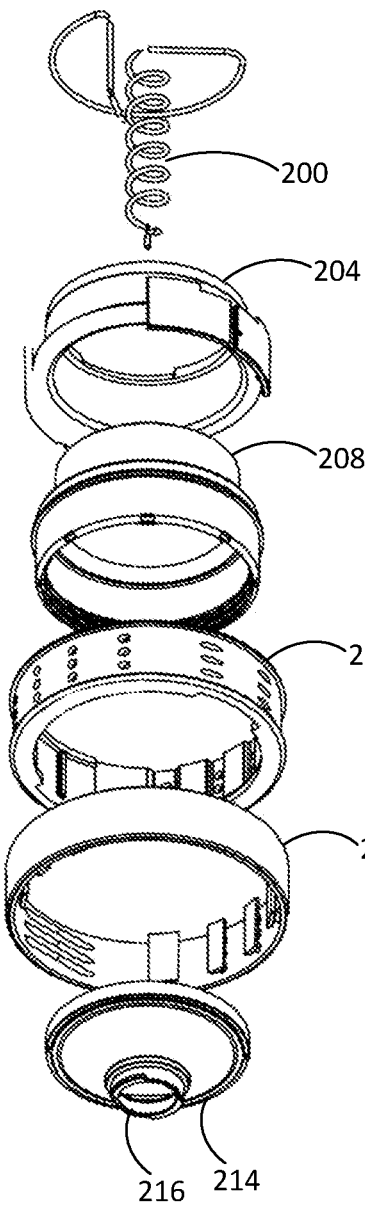

The blender assembly 30 is shown in more detail in FIGS. 5A to 5C. The auger 200 is typically used to blend material together. The auger 200, in this embodiment, is made of wire and is generally and substantially corkscrew shaped. The semi-circular top 202 of the auger 200 rests around the central protrusion 150 of the second grinding unit 104. The lower tip 203 of the auger 200 fits through a screen 214.

The auger rests on top of an adapter sleeve thread 204. The sleeve thread 204 is threaded at its bottom onto which the second grinding unit is screwed. The sleeve thread 204 is shaped to spin around an adapter 208. The sleeve thread 204 is squeeze-locked onto the adapter 208. There may be a band or washer (not shown) between the surfaces of the adapter 208 and the sleeve thread 204 where the two parts meet to help reduce friction. The adapter 208 has an internally threaded bottom portion to thread into a funnel assembly 70 discussed in more detail below. The adapter 208 may have a screen on the outside of the threaded bottom portion. The adapter 208 is formed to house a sleeve 210. The sleeve is formed cradle the adapter 208 and connect to outer surface of the sleeve thread 204. The sleeve 210 is typically squeezable for removability from the sleeve thread 204. The sleeve 210 may have an overmoulding 212 for an enhanced gripping surface.

While FIGS. 4A to 4G show one possible embodiment for the blender 30, other configurations may be possible. For example, several embodiments for the blender are discussed in U.S. Pat. No. 9,427,020.

Ground and blended material moves from the blender 30 by gravity to the funnel assembly 70. The blender 30 and funnel assembly 70 may have filler sleeves (not shown) between them. The funnel assembly 70, shown in FIGS. 6A to 6E, is used to sift and screen material before leaving the funnel assembly 70, and to rotate, turning the roller gear 250 described in more detail below. The funnel assembly 70 comprises a screen 214, a funnel 220, a grip 224, and a rubber sleeve 228.

Figure 6B:
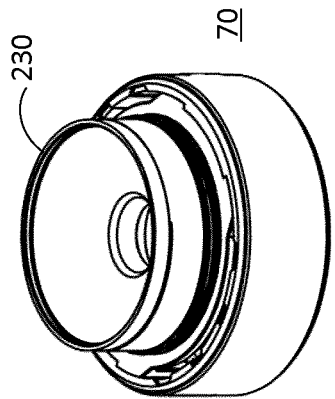
FIG. 6B is a top perspective view of the funnel assembly of FIG. 6A.
Figure 6C:
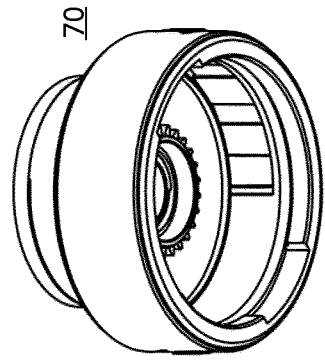
FIG. 6C is a bottom perspective view of the funnel assembly of FIG. 6A.
Figure 6A:
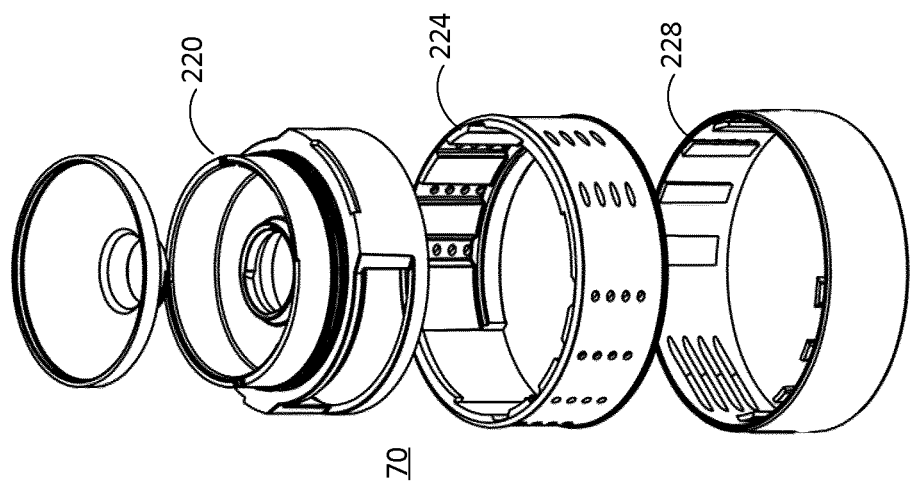
FIG. 6A is an exploded view of a funnel assembly of the device of FIG. 3A.
Figure 6D:
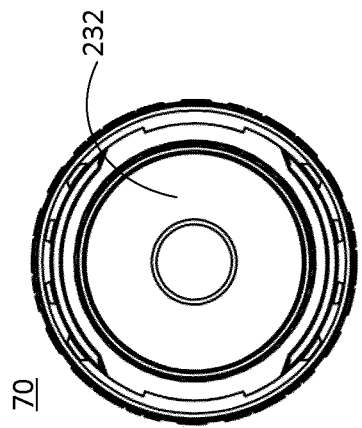
FIG. 6D is a top elevation view of the funnel assembly of FIG. 6A.
Figure 6C:
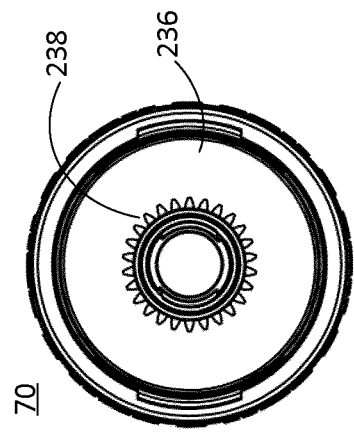

The screen 214 may be solid plastic (as shown in FIG. 6C) or may be a frame with a selectively porous material (not shown). In the case of selectively porous material, the screen 214 may also be used to separate, for example in the case where the material is cannabis, the cannabis trichomes, also called kief or pollen, and the resin (hashish), from the ground material before leaving the blender 30. The cannabis trichomes occur most abundantly on the floral calyxes and bracts of female plants. In this embodiment, the screen 214 is substantially and generally conically shaped. The screen 214 has a large opening relative to the smaller sized aperture 216 which, in this embodiment, is generally and substantially centrally located. The selectively porous material 214 may be any material containing pores known to persons skilled in the art to separate large and small material including, but not limited to, filter paper, wire mesh or wire screening as long as the pores of the selectively porous material 214 are smaller than the aperture 216.

The screen 214 is housed by a funnel 220 and channels the ground material into the chamber 50. The funnel 220 has an upper collar 230 which is threaded to engage the threading on inside surface of the lower portion of the adapter 208 of the blender 30. Alternatively, in another embodiment, the blender 30 may be removed and replaced with the second grinding unit 104, allowing for a smaller overall device 10. In a further embodiment, both the blender 30 and the grinder 20 may be removed for an even smaller overall device 10. In this embodiment, the upper collar 230 would be capped with a threaded cap (not shown). In this embodiment, the device 10 would be manually filled with ground material and used as a cigarette rolling device.

The funnel 220 has an upper inside surface 232 with a conically-shaped aperture 234, extending through to a lower inside surface 236. The aperture 234 has a rotating gear 238 around the aperture 234 on the lower inside surface 236. This rotating gear 238 engages a roller gear 250 of the rolling assembly 52, which will be discussed in more detail below. The funnel 220 has a lower collar 240 which may be shaped to have the appearance and functionality of a spur gear which allows it to be attached to a motor for automated operation. A grip 224 fits to the lower collar 240 of the funnel 220. The funnel 220 may be removable from the grip 224 by squeezing. The grip 224 may have an overmoulded rubber sleeve 228 to aid with gripping. Alternatively, the sleeve 228 may be fitted to the grip 224 by other means.

Turning back to FIG. 3A, the rotating gear 238 engages with the roller gear 250. Roller gear 250 is shown in greater detail in FIGS. 7A to 7D. Roller gear 250 is a metal rod 252 with a gear 254 at the top end 262 of the rod 252. Around the metal rod 252 are a first silicone pad 256 and second silicone pad 258 which may be overmoulded around the rod 252. The silicone pads 256 and 258 apply pressure to a first roller 410 which will be discussed in more detail below. Gear 254 engages the rotating gear 238 of the funnel 220. Thus, turning the funnel 220 turns the rotating gear 238. The bottom end 260 of the rod 252 engages with a first gearbox 44, which will be discussed in further detail below.

Figure 10A:
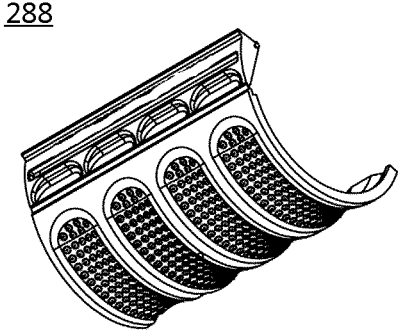
FIG. 10A is a bottom perspective view of the grip plate of the chamber of FIG. 3A when the flap is closed.
Figure 10B:
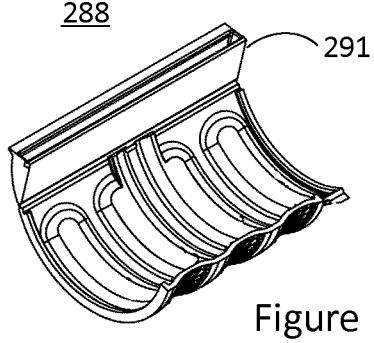
FIG. 10B is a top perspective view of the grip plate of the chamber of FIG. 3A when the flap is closed.
Figure 10C:
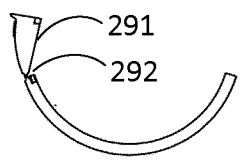
FIG. 10C is a top elevation view of the grip plate of the chamber of FIG. 3A when the flap is closed.
Figure 10D:
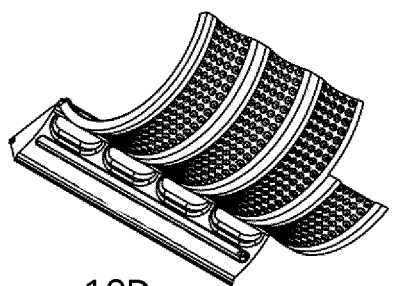
FIG. 10D is a bottom perspective view of the grip plate of the chamber of FIG. 3A when the flap is open.
Figure 10E:
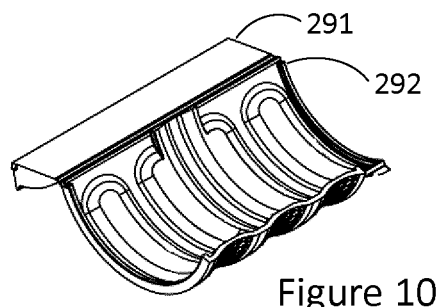
FIG. 10E is a top perspective view of the grip plate of the chamber of FIG. 3A when the flap is open.
Figure 10F:
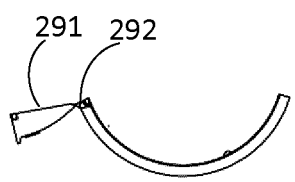
FIG. 10F is a top elevation view of the grip plate of the chamber of FIG. 3A when the flap is open.

Turning back to FIG. 3A, the roller gear 250 is housed within the chamber 50 and held in place by a rollerpost 268 which is glued, sonic welded, or similarly adhered into place within the chamber 50. In this embodiment, the chamber 50 comprises a first body 280, a second body 282, a chamber end 284, a grip plate 288, and a window 290. First body 280 is shown in more detail in FIGS. 8A to 8C. Second body 282 is shown in more detail in FIGS. 9A to 9D. The first body 280, second body 282, grip plate 288, chamber end 284, and window 290 form the main cylindrical chamber 50 that houses the roller gear 250 and the core 40. Second body 282 slides into first body 280, and are retained together by the funnel assembly 70 on one end, specifically by the grip 224, via tongue and groove. On the other end of the chamber 50, the second body 282 and first body 280 are retained together by chamber end 284, which may be glued or welded onto the first and second body 280 and 282. Window 290 comprises two circular frames attached by a spar which acts as a cover when it is secured in the chamber 50. Window 290 is inserted into first body 280 and second body 282. The circular frames of window 290 may rest inside grooves around the inside perimeter of first body 280 and second body 282 when they are fitted together, allowing window 290 to rotate about a central axis of the device 20, giving the window 290 the ability to form an opening in the device 10 when the spar of window 290 is moved. This opening may allow a user of the device 10 access to the inside of the chamber 50. Chamber grip 288 forms part of the chamber 50 and is shown in more detail in FIGS. 10A to 10F. Chamber grip 288 is glued or welded onto first body 280. Chamber grip 288 has a flap 291 that is able to open and close to allow a user of the device 10 access to the inside of the chamber 50. FIGS. 10A to 10C show the chamber grip 288 with flap 291 closed. FIGS. 10D to 10F show the chamber grip 288 with the flap 291 open flap 291. Flap 291 may be formed as a living hinge. A living hinge is a thin flexible hinge (flexure bearing) made from the same material as the two rigid pieces it connects. The material is typically thinned or cut to allow the rigid pieces to bend along the line of the hinge. In this example, the flap 291 is formed by a crease 292 in the chamber grip 288 forming a hinge around which the flap 291 may bend. Other hinge means are possible to form an openable flap 291 in the chamber grip 288. Flap 291 may hold a licking strip or sponge 294 for wetting papers which will be discussed in detail below. Alternatively, flap 291 may be formed so that it is able to rotate around the axis of the device 10.

The chamber 50 is able to rotate about the device's 10 centre axis relative to the core 40. Chamber 50 and core 40 rotate in opposite directions to activate and de-activate multiple parts within the device 10 which will be discussed in detail below. After rotation, chamber 50 is held in place by chamber end 284, lock sleeve 460, and base knob 492.

While the example above shows one embodiment of the structure of the chamber, other configurations are possible. For example, other chamber structures are discussed in U.S. Pat. No. 9,427,020.

Chamber 50 fits to the funnel assembly 70 by tongue and groove. Funnel 220 is squeezed into grip 224. The bottom of grip 224 has a groove into which a tongue from the chamber fits onto, allowing grip 224 to rotate around the central axis of the device 10.

Turning now to FIG. 2A, which shows an exploded view of the core 40. The core 40, when assembled, is shaped to inside the chamber 50. The core 40 slidably engages with the chamber 50 to sit inside the chamber.

Figure 11C:
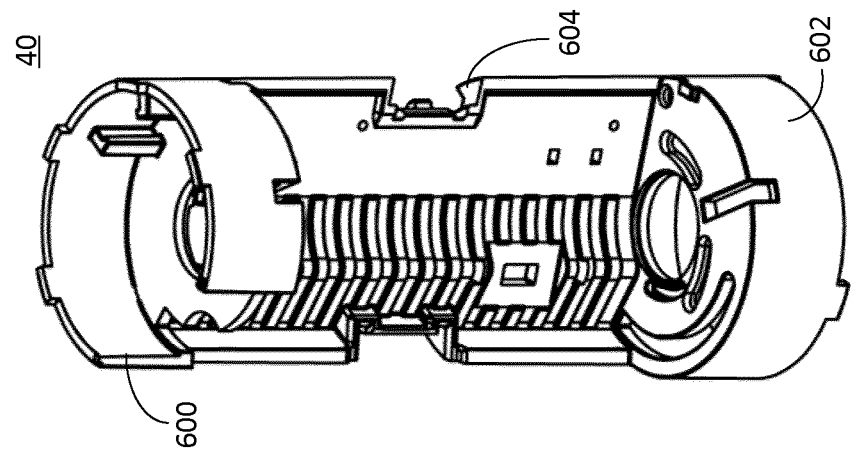
FIGS. 11A, 11B, and 11C are perspective views of the chassis from various angles.
Figure 11B:
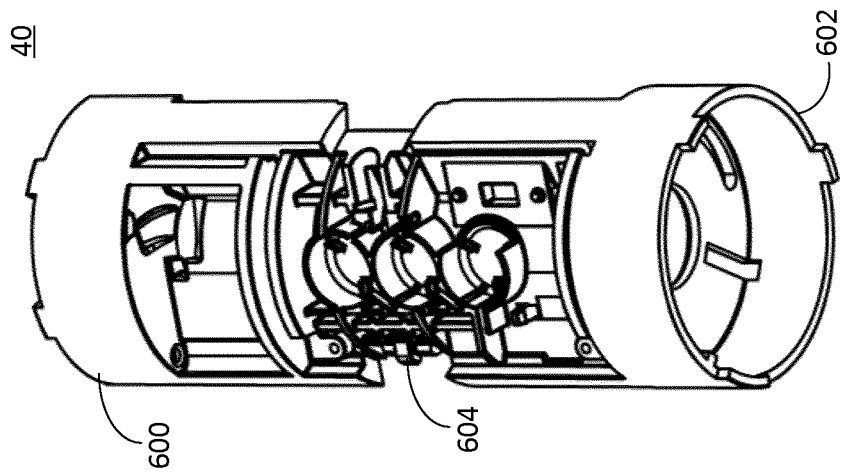
Figure 11A:
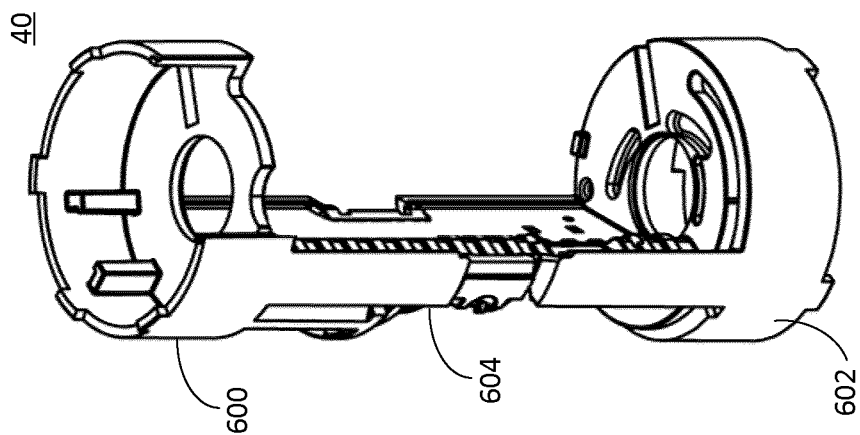

The core 40 comprises a chassis 42 that houses a first gearbox 44 and a second gearbox 48, a rolling assembly 52, an LED assembly 54. Chassis 42 is shown in more detail in FIGS. 11A to 11C, which show the chassis 42 to be formed as one piece. Chassis 42 has a first chassis end 600, a second chassis end 602 and a middle chassis body 604. FIGS. 11A to 11C show the chassis 42 to be formed as one piece. Alternatively, chassis 42 may be formed as three pieces first chassis end 600, second chassis end 602, and middle chassis body 604 which are fitted together.

Figure 16A:
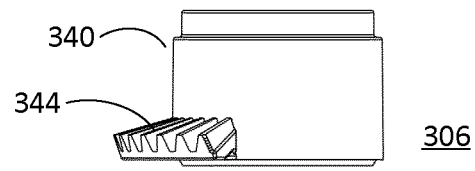
FIG. 16A is a side view of a first bevel gear of the first gearbox of FIG. 12A.
Figure 16B:
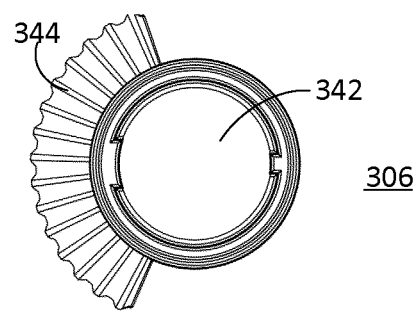
FIG. 16B is a top view of the first bevel gear of the first gearbox of FIG. 12A.
Figure 17:
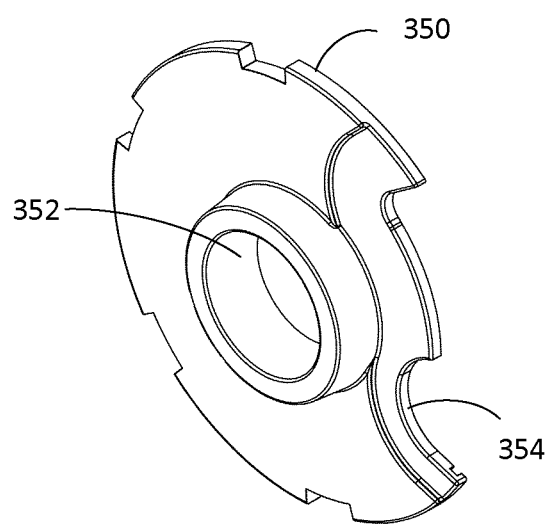
FIG. 17 is a perspective view of a cover for first gearbox of FIG. 12A.

First gearbox 44 is shown in more detail in FIGS. 12A to 12G. First gearbox 44 comprises a first lever 300, a first main gear 302, a first pinion 304, a first bevel gear 306, all of which rest within chassis end 600, shown in these diagrams to be separate from the chassis 42. In this embodiment, first lever 300, shown in FIG. 13, has a keyed top 320 with a substantially cylindrical base 322 having an aperture 324 therethrough. Aperture 324 allows ground material to pass therethrough. Keyed top 320 ensures location of first gearbox 44 in relation to the rest of the device 10. Lever 300 holds rolling assembly 52 in place, which will be discussed in more detail below. First lever 300 connects to a first main gear 302 by means of a press fit within a central aperture 326 in the first main gear 302. A first main gear 302, shown in FIGS. 14A to 14C, has a notch 330 for roller gear 250 to pass through as the core 40 is slid into the chamber 50. First main gear 302 is substantially round and has a toothed portion 332 which is shaped to engage with the cogs 334 of a first pinion 304. First main gear 302 may have a cover 301 to prevent debris from filling a void in main gear 302. First pinion 304, shown in FIG. 15, is substantially round and is spoked with cogs 334 around its circumference. First pinion 304 has a central aperture 335 which engages a first mandrel 356, holding it in place within the chassis 42. Cogs 334 also engage a first bevel gear 306. First bevel gear 306, shown in FIGS. 16A and 16B, is has a cylindrical base 340 with an aperture 342 therethrough for allowing ground material to pass therethrough. First bevel gear 306 has a partial flange 344 at the base of one end of the cylindrical base 340. Partial flange 344 is ridged and shaped to fit the cogs 334 of first pinion 304. First pinion 304 is sandwiched between the first main gear 302 and the first bevel gear 306, permitting the first main gear 302 and first bevel gear 306 to work in tandem. First gearbox 44 has a cover 350, shown in FIG. 17, which sits over bevel gear 306, keeping the first gearbox 44 in alignment with the funnel assembly 70. Cover 350 helps to guide the core 40 into the chamber 50. Cover 350 has a central aperture 352 to allow organic material to pass therethrough by gravity from the funnel assembly 70 into the first gearbox 44 and has a notch 354 to match the notch 330 in the main gear to hold the roller gear 250 in place. A protrusion (not shown) on cover 350 engages and is inserted into the underside of funnel 220 to stabilize and center the core 40 into chamber 50. This tongue/groove fitting stabilizes this end of the core 40.

Second gearbox 48 is shown in more detail in FIGS. 18A to 18F. Second gearbox 48 comprises a second lever 360, a second main gear 362, a second pinion 364, a second bevel gear 366, all of which rest within second chassis end 602, shown to be separate from chassis 42 in these diagrams. Second gearbox 48 works in conjunction with first gearbox 44 to operate rolling assembly 52. In this embodiment, second lever 360, shown in FIG. 19, has a keyed top 370 with a substantially cylindrical base 372 having an aperture 374 therethrough. Aperture 374 allows a finished rolled product (not shown) to pass therethrough. Keyed top 320 ensures location within the second gearbox. Second lever 360 connects to a second main gear 362 by means of a press fit within a central aperture 376 in the second main gear 362. Second lever 360 holds rolling assembly 52 in place. A second main gear 362 is shown in FIGS. 20A to 20D. Second main gear 362 is substantially round and has a toothed portion 378 which is shaped to engage with the cogs 380 of a second pinion 364. Second pinion 364, shown in FIG. 21, is substantially round and is ridged with cogs 380 around its circumference. Cogs 380 also engage a second bevel gear 366. Second bevel gear 366, shown in FIGS. 22A and 22B, has a cylindrical base 382 with an aperture 384 therethrough for allowing a finished rolled product I to pass therethrough. Second bevel gear 366 has a partial flange 390 at the base of one end of the cylindrical base 382. Partial flange 390 is ridged and shaped to fit the cogs 380 of second pinion 364. Second pinion 364 is sandwiched between the second main gear 362 and the second bevel gear 366, permitting the second main gear 362 and second bevel gear 366 to work in tandem.

FIG. 23 shows a gear handle 400. Gear handle 400 rests between and connects first gearbox 44 to second gearbox 48, while permitting the gearboxes 44 and 48 to rotate at the same time, in tandem at a 1:1 ratio.

Figure 24:
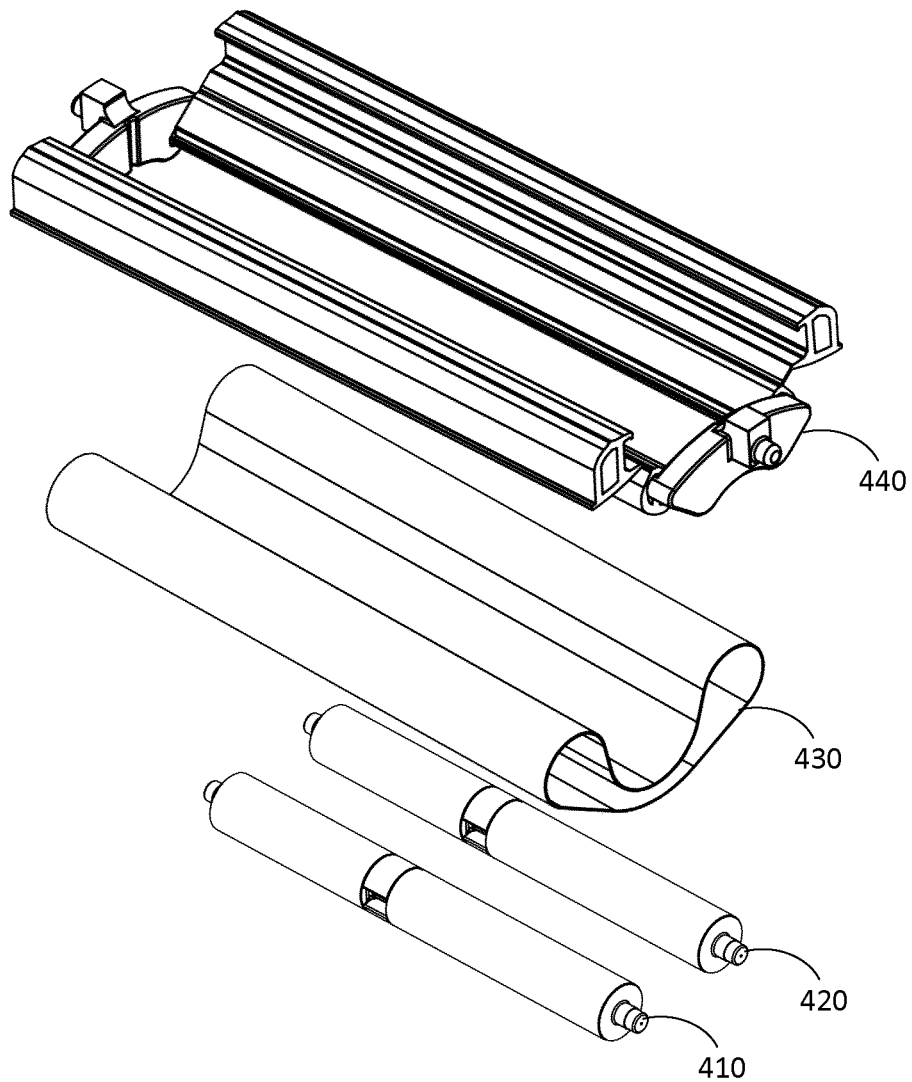
FIG. 24 is an exploded view of a rolling assembly of FIG. 2A.

FIG. 24 shows an exploded view of the rolling assembly 52. Rolling assembly 52 comprises a first and a second roller 410 and 420 respectively, a skirt 430, and a paperfeed 440. First and second rollers 410 and 420 may be identical.

Figure 25A:
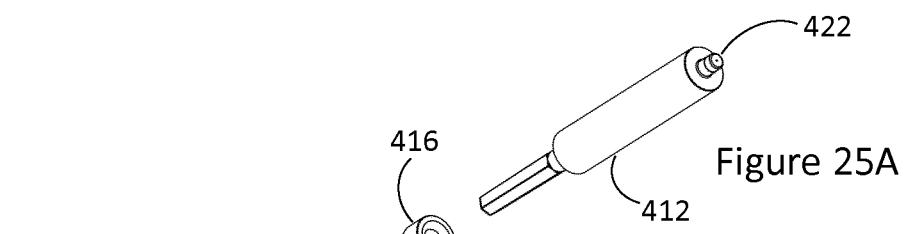
FIG. 25A is a top exploded view of the roller of the rolling assembly of FIG. 24.
Figure 25B:
FIG. 25B is a bottom exploded view of the roller of the rolling assembly of FIG. 24.

FIG. 25A shows an exploded view of the roller 410 or 420. Roller 410 or 420 comprise a first half 412 and a second half 414. First half 412 is shaped to fit within second half 414, which is hollow. Clip 416 is a spacer between first half 412 and second half 414 the two halves at a certain distance apart. FIG. 25B shows an alternative embodiment of the roller 410 or 420, where a spring 418 is used in place of the clip 416 of FIG. 25A. First half 412 has a protrusion 422 at its end and second half 414 has a protrusion 424 at its end, such that when joined, the protrusions 422 and 424 act as a dowel to keep the roller 410 or 420 in place within the chassis 42 by resting in the within the first lever 300 and second lever 360. That is, if protrusion 422 from first roller 410 rests within a slot 610 of first chassis end 600, then protrusion 424 from second roller 420 rests within the slot 612 of first chassis end 600. In this case, protrusion 424 from first roller 410 rests within a slot 614 of second chassis end 602, and protrusion 422 from the second roller 420 rests within the slot 616 of second chassis end 602. Thus, first and second rollers 410 and 420 move in accordance with first gearbox 44 and second gearbox 48.

FIGS. 26A to 26D show the skirt 430 in more detail. Ground material from the funnel lands on the skirt 430 to be rolled in paper to form a cigarette. The skirt 430 is inserted into the chassis 42 over the first and second rollers 410 and 420. The skirt 430 may be made of but is not limited to nylon, leather or any other tear-resistant fabric. While FIGS. 26A to 26D show an embodiment having a general U-shape, the skirt 430 may have any shape to allow the formation of a cigarette. For example, the skirt 430 may be concave in shape for certain types of paper.

Figure 26B:
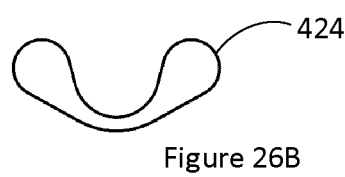
FIG. 26B is a side view of the skirt of FIG. 24 when the skirt is open.
Figure 26D:
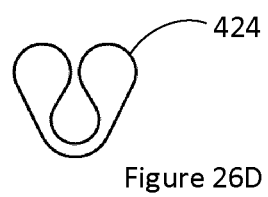
FIG. 26D is a side view of the skirt of FIG. 24 when the skirt is closed.
Figure 26A:
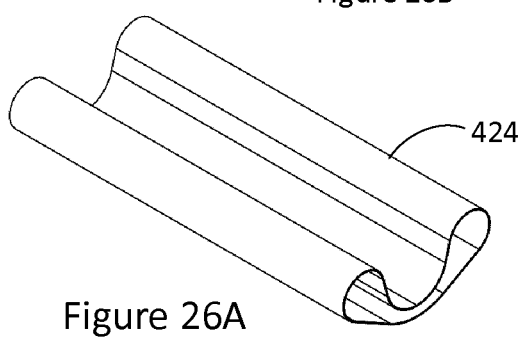
FIG. 26A is a perspective view of a skirt of the rolling assembly of FIG. 24 when the skirt is open.
Figure 26C:
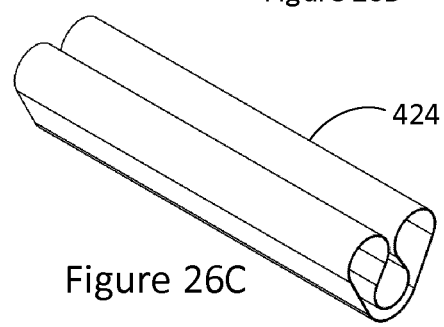
FIG. 26C is a perspective view of the skirt of FIG. 24 when the skirt is closed.

FIGS. 26A and 26B show the skirt 430 in an open position. FIGS. 26C and 26D show the skirt 430 in a closed position. Skirt 430 moves from the open to closed position by rotating the funnel assembly 70. Rotating the funnel assembly 70 rotates the roller gear 250. Roller gear 250 applies pressure on the first and second rollers 410 and 420, which rotates the skirt 430. Rotating the skirt 430 rolls paper over the ground material resting on the skirt.

The skirt 430 may be shaped so that when rolling paper is inserted into the rolling assembly 52, symmetrical shaped tubes are created. Alternatively, the skirt 430 may be shaped to make cone-like or conical shaped tubes.

Figure 27G:
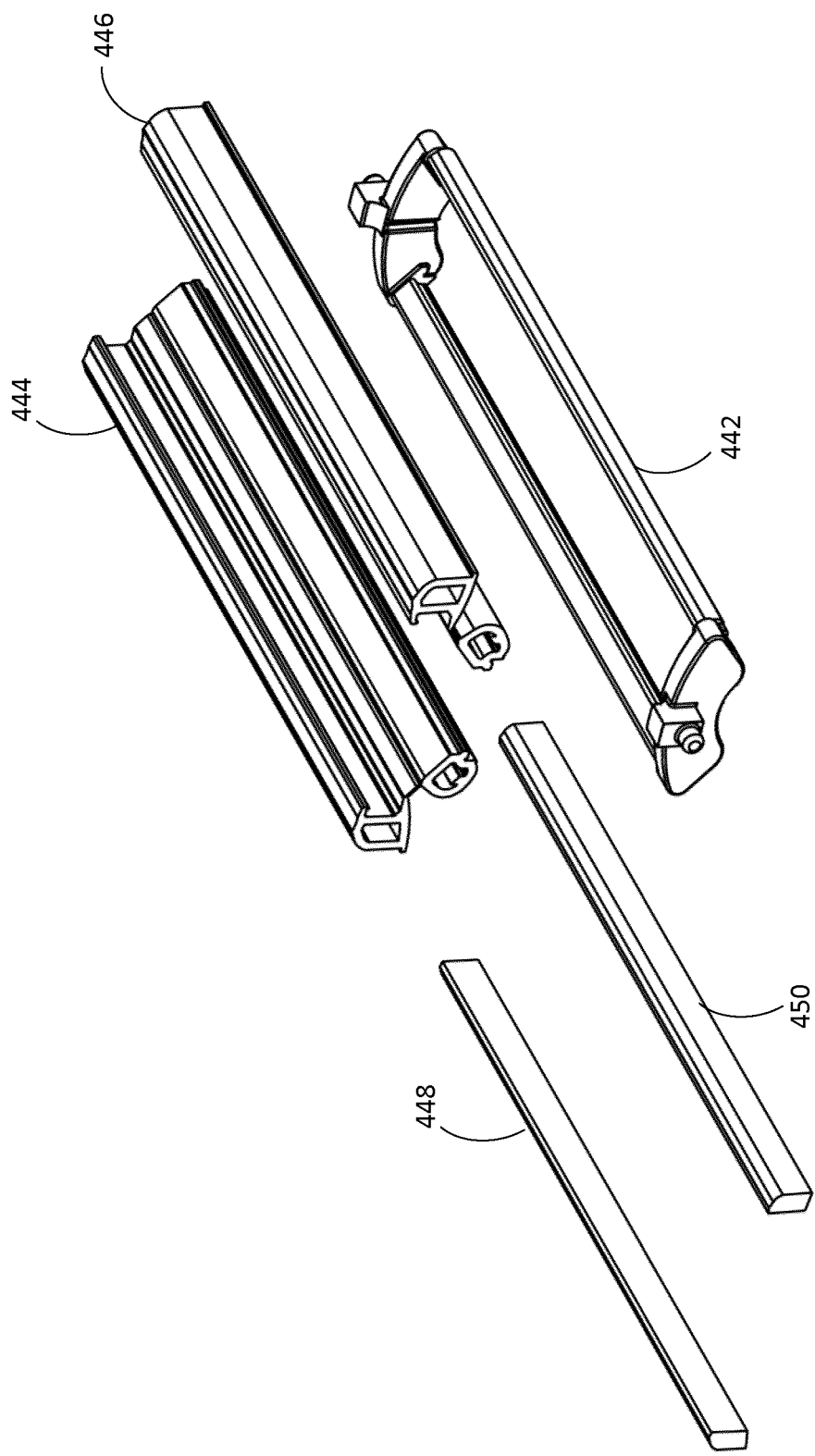
FIG. 27G is an exploded view of the paperfeed of FIG. 24.

FIGS. 27A to 27G show the paperfeed 440 in more detail. FIG. 27G shows an exploded view of the paperfeed 440. Paperfeed 440 comprises a frame 442, a first arm 444, a second arm 446, a first reinforcement arm 448, and a second reinforcement arm 450. FIGS. 27A to 27C show the paperfeed 440 in an open position. When the paperfeed is open, a user can access the rolling assembly 52. FIGS. 27D to 27F show the paperfeed 440 in a closed position. When the paperfeed is closed, the materials cannot fall out of the rolling assembly 52.

First arm 444 and second arm 446 may be made from, but is not limited to, rubber, urethane, or silicone. First arm 444 and second arm 446 are hinged via a living hinge. First reinforcement arm 448 is inserted into first arm 444 and second reinforcement arm 450 is inserted into second arm 446. First and second reinforcement arms 448 and 450 provide rigidity to first arm 444 and second arm 446. First and second reinforcement arms 448 and 450 may be made from, but are not limited to, nylon, ABS, or any other cost-effective plastic that adds rigidity to the arm.

The frame 442 may be made from, but is not limited to, metal or polycarbonate. Frame 442 has protrusions 443 and 445 on each end, which fit into radial slots 337 and 379 on first gearbox 44 and second gearbox 48, respectively. Frame 442 moves radially in and out with first gearbox 44 and second gearbox 48. As the frame 442 moves, first and second rollers 410 and 420 engage with and disengage from each other. The underside of the frame 442 may be covered in a rubber wrap-around (not shown) that forms part of the hinge of the first arm 444 and second arm 446. A rubber wrap-around on the underside of the frame 442 may allow the skirt 430 to close and seal easily, thereby creating a rolling chamber within.

FIGS. 28A and 28B show a lever lockroller 454. The lever lockroller 454 locks the second roller 420 in place within the rolling assembly 52, by butting up against it, thereby removing stress on the bevel gears of the first and second gearboxes. Lever lockroller 454 works in conjunction with base lock sleeve 460 (shown in FIGS. 29A and 29B) to reduce stress on the first gearbox 44 and the second gearbox 48.

Figure 31:
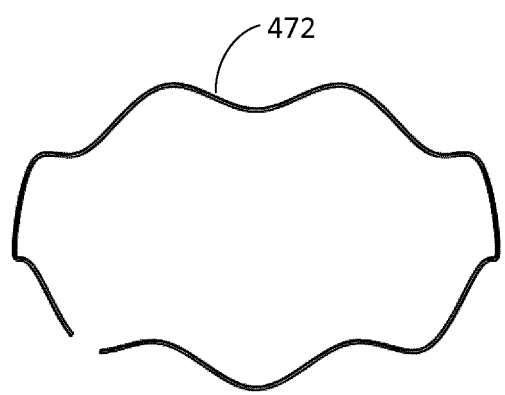
FIG. 31 is a perspective view of a wavespring of FIG. 2A.

Base lock sleeve 460 is substantially and generally cylindrical and its inner surface is shaped to slide over a base lock 470, shown in FIGS. 30A to 30C. Base lock 470 is part of the core 40. Base lock 470 houses the second gearbox 48 and forms the end of the chassis 42 by adhesive or screws or other connection means. Base lock 470 also locks the chamber 50 to the core 40. Base lock 470 has a wavespring 472, shown in FIG. 31 located between the base lock 470 and the lock sleeve 460. Wavespring 472 rests under the base lock sleeve 460 at the bottom of base lock 470. Wavespring 472 pushes lock sleeve 460 up to prevent stress on the gears and to prevent the rollers from opening spontaneously. When rotated, the wavespring 472 pushes the base lock sleeve 460 up into the end of the first body 280.

Base lock 470 has ribs to prevent the base lock sleeve 460 from rotating. The base lock sleeve 460 moves up and/or down the base lock 470. When the device 10 is closed and the rollers 410 and 420 are together, the base lock 470 is rotated into a position where the base lock sleeve 460 has open access to move up the base lock as it is pushed up by the wavespring 472. Once base lock sleeve 460 is pushed up, base lock sleeve 460 engages with the end of first body 280 and locks into place. At one of end of first body 280, two fins 281 protruding radially opposite each other. Base lock sleeve 460 has two notches 462 into which these fins 281 fit, preventing the device 10 from opening and reducing stress on the gears. To open the system, the base lock sleeve 460 is pushed down.

Figure 33:
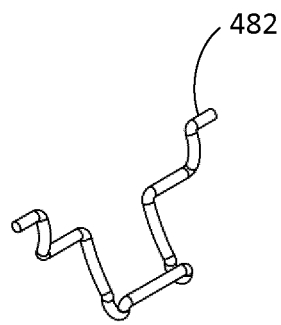
FIG. 33 is a perspective view of a lockroller wire of FIG. 2A.
Figure 32:
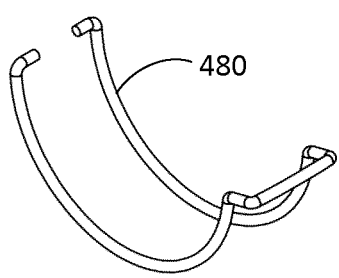
FIG. 32 is a perspective view of lockroller handle of FIG. 2A.

Lever lockroller 454 moves when the core 40 and chamber 50 are rotated. FIG. 32 shows a lever lockroller handle 480. The level lockroller handle brings the level lockroller 454 into position to lock the second roller 420. It works in tandem with lockroller wire 482, shown in FIG. 32. Lockroller handle 480 moves lockroller wire 482 when the chamber body is rotated opposite the core 40. Gear handle 400 moves in the direction around the axis of the device 10 approximately 20 degrees. Gear handle 400 connects with the lockroller handle 480 by means of the lockroller wire 482 in order to move it. Lockroller wire 482 is shown in FIG. 33. The lockroller 454 moves in/out by means of the lockroller wire 482 and lockroller handle 480, which work congruently to automatically move the lockroller 454. Lockroller handle 480 and lockroller wire 482 are activated when the core/chamber are rotated.

Figure 34A:
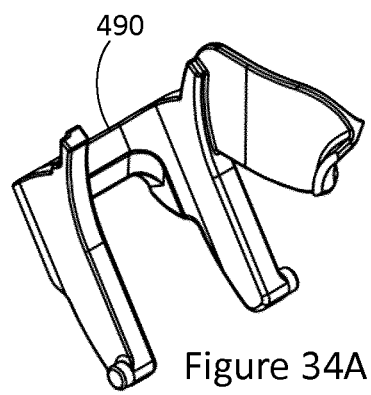
FIG. 34A is a perspective view of a lever skirt lock of FIG. 2A.
Figure 34B:
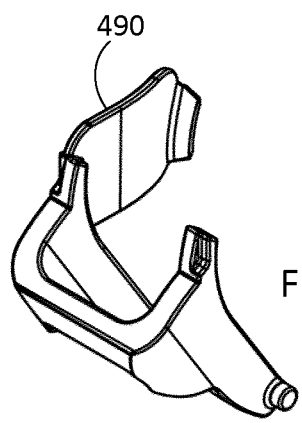
FIG. 34B is another perspective view of the lever skirt lock of FIG. 34B.

FIG. 34 shows a lever skirt lock 490. The lever tarp lock 490 holds the skirt 430 down and closes the skirt when the chamber 50 body is rotated against the chassis 42. The back of lever skirt lock 490 keys with the keyed top 320 of first lever 300 and the front side of lever skirt lock 490 holds skirt 430 down. When first lever 300 rotates it disengages from lever skirt lock 490.

FIG. 35 shows a base knob 492 which snap fits into base lock 470. Base knob 492 locks the core 40 and chamber 50 together when rotated. Base knob 492 is connected to chamber end 284. Base knob 492 retains base valve 494, shown in FIGS. 36A and 36B. Base valve 494 may be made from, but is not limited to, silicone, rubber or hard material. Base valve 494 is removable from base knob 492 so that content can be removed from the device 10. Base valve 494 has a nib 496 to keep the skirt 430 open. Skirt 430 is pushed under nib 496, allowing nib 496 to keep the skirt 430 in place.

FIGS. 37A and 37B show a container 500. Container 500 fits onto the base knob 492. Container 500 is generally and substantially cylindrical having one open end and a closed end. Container 500 is used to store organic material, tools, filter tips and other contents used to make the product in the device 10. Container 500 connects to lid 502, shown in FIGS. 38A and 38B. Lid 502 locks into the base knob 492. When base valve 494 is opened, contents may be inserted or removed from container 500.

Figure 39C:
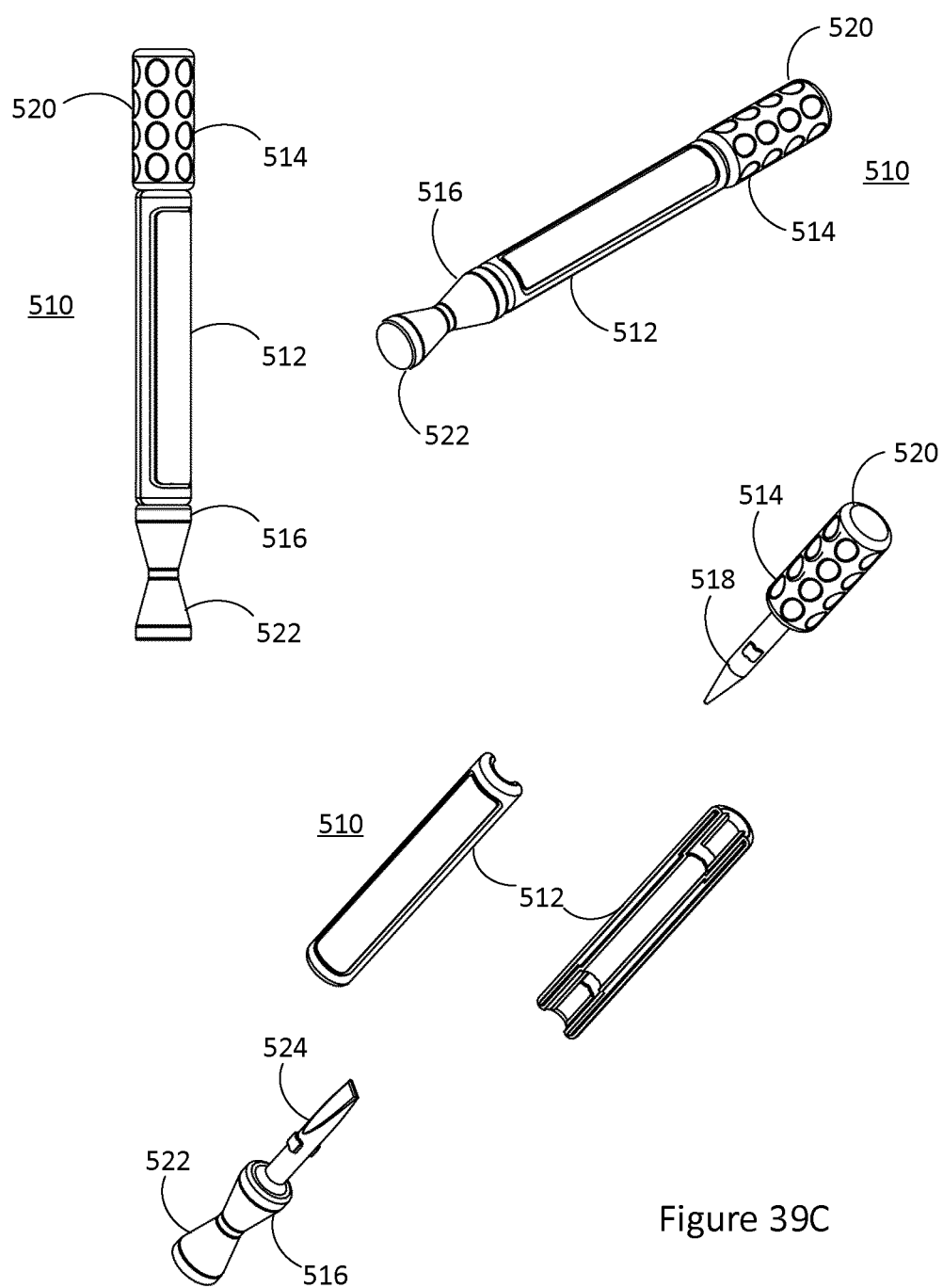
FIG. 39C is an exploded view of the tool of FIG. 39A.

FIGS. 39A to 39C show a tool 510. Tool 510 has a main body 512, a first removable end 514, and a second removable end 516. Main body 512 is hollow and substantially tube shaped. Main body 512 is shaped to fit removable ends 514 and 516. Removable first end 514 has a first end 518 and a second end 520. First end 518 is a pick. Second end 520 is a grip. Removable second end 516 has a first end 522 and a second end 524. First end 522 is a screw driver head. Second end 524 is a tamper or a masher. When assembled, first end 518 of the removable first end 514 and first end 522 of removable second end 524 are inserted into main body 512 so that only second end 520 or the grip and second end 524 and the tamper are visible. Tamper 524 may be used to pack ground material within the chamber before rolling papers.

Figure 40:
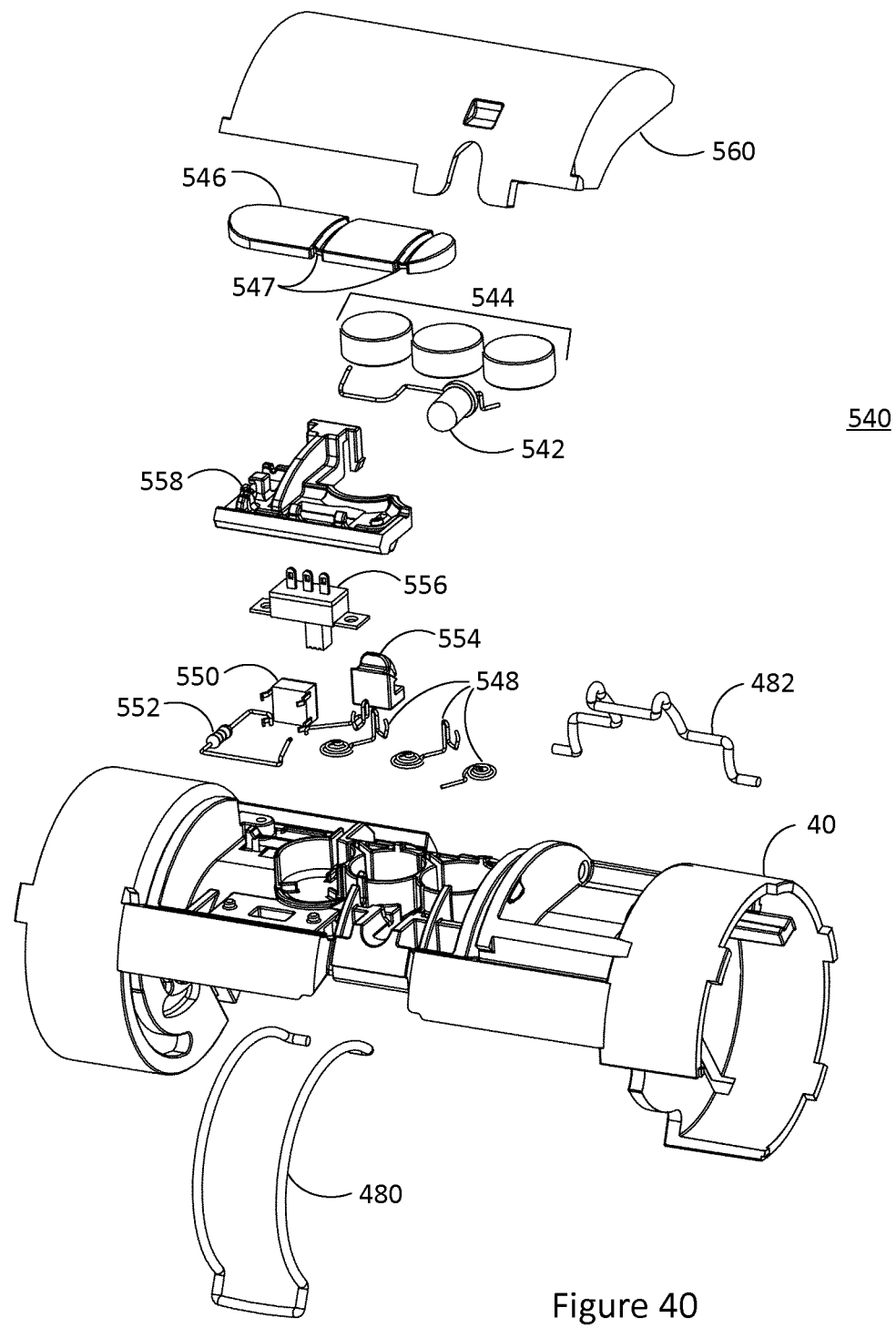
FIG. 40 is an exploded view of an LED assembly.

The filler device 10 may include an LED lighting assembly 540. LEDs may be used to light areas of the device 10 which are difficult to see. An example of using an LED in the filler device 10 would be when the window 290 is opened. FIG. 40 shows an exploded view of an exemplary LED lighting assembly 540 and how it relates to the chassis 42. In this embodiment, LED 542 is powered by batteries 544. In this example, 3 batteries 544 are used. Any battery configuration may be used to power LED 542. Batteries 544 are covered by a battery cover 546. Battery cover 546 may have grooves 547 to help guide lockroller handle 480 into place within the chassis 42. Springs 548 connect batteries 544 to the circuitry which regulates the LED 542. In this example, a first button 550, a second button 554 and resistor 552 are configured with the springs 548 and batteries 544 to power the LED 542, however any circuitry known to person of skill in the art may be used. A switch 556 may be included in the circuitry to allow a user to turn the LED 542 on or off so that the LED is not automatically activated with the movement of the window 290. Circuit cover 558 keeps switch 556, buttons 550 and 554, batteries 544, and resistor 552 in place. The LED assembly 540 is covered by an LED cover 560. LED cover 560 protects the LED assembly 540 as well as strengthens the chassis. The LED cover 560 may be shaped to guide the locker roller handle 480 or the lockroller wire 482.

In operation, material to be ground may be removed from container 500 or wherever material is stored. Lever skirt lock 490 is pulled to lock the skirt 430 in place and open a pathway for the material to flow down from the grinder 20. Alternatively, this can be left closed until after grinding has taken place. Material is deposited into the grinder 20 by removing the first grinding unit 100 from the second grinding unit 104. The first grinding unit is replaced, closing the grinder 20. Rotating the first grinding unit 100 and the second grinding unit 104 in opposite directions causes the material to be chopped up and ground. Ground material passes through the apertures 142 in the second grinding unit 104 and into the blender 30. Blender 30 may be rotated left to blend and sift the material or it may be rotated to the right to pass the material to the rolling chamber in the chassis 42. The chamber 50 is rotated in opposite directions to close the rollers 410 and 420. First gearbox 44 and second gearbox 48 are activated. Paperfeed 440 moves transversely inward and outward via radial slots 337 and 379 located in gearboxes 44 and 48, and slot 335 on first main gear 302 and slot 377 on second main gear 362. The skirt lock 490 is raised thereby closing the pathway and preventing material from leaving the chamber while rolling. With the skirt lock 490 closed, the skirt 430 moves with the rollers 410 and 420 as the gearboxes 44 and 48 move. As the gearboxes move, the rollers are brought together, further closing the rolling chamber. The roller gear 250 engages first roller 410 only unless a "twist and turn" action happens. This prevents the silicone pads 256 and 258 on the roller gear 250 from turning the rolling assembly 52 accidently when the system is in an open position. The lockroller 454 abuts the second roller, bringing the rollers 410 and 420 together. The lockroller 454 is activated by the lockroller wire 482 and the lockroller handle 480 that work in tandem to close the lockroller 454. The lockroller 454 locks the second roller 420 in place, thereby locking the first gearbox 44 and the second gearbox 48. The rollers 410 and 420 cannot be pushed apart at this point. At this point, a user may wish to roll a very thin cigarette.

Because the wavespring 472 is compressed, the wavespring 472 pushes the base lock sleeve 460 up the base and locks roller 410. This reduces tension on the first gearbox 44 and the second gearbox 48. Thus, rollers 410 and 420 are locked into position, preventing the chamber from being opened. Both gearboxes 44 and 48 are activated in tandem by gear handle 400. Gearboxes 44 and 48 are controlled by the interaction of the roller gear 250, the first body 280, and the gear handle 400 which connect and interact within the core 40 when inserted in the chamber 50. Nib 496 is no longer holding the skirt 430 down when the core 40 and chamber 50 are rotated, allowing the skirt 430 to move with the gearboxes 44 and 48.

Roller gear 250 is now in full contact with first roller 410. First roller 410 turns the silicone pads 256 and 258, causing the roller gear to turn. This allows the skirt 430 to be controlled. The rotating gear 238 of the funnel assembly 70 is only effective when the rollers 410 and 420 are engaged after rotating the core and chamber to close the rollers. The roller gear 250 does not engage roller 410 unless the rotating of the core occurs. Both rollers 410 and 420 move in tandem when the core is rotated or twisted. The gearboxes 44 and 48 activate with this twisting which engages the first and second rollers 410 and 420 to bring them together or apart, creating a closed rolling chamber.

The device 10 can be opened by lifting the flap 291 and sliding the window down. The paperfeed 440 arms may be opened and the tool 510 may be used to push ground material into the desired place by the user. Alternatively, a vibrating motor may be used to evenly distribute the ground material. Rolling paper, or other appropriate paper for forming a cigarette, is then inserted into the paperfeed. The sponge on the flap may be used to wet the edge of the paper by closing the flap over the edge of the paper to be wetted or glued down.

Once the paper is finished rolling, the chamber 50 is twisted in the opposite direction to disengage the rollers 410 and 420. The base valve 494 is unplugged from the base knob 492 to allow the rolled cigarette product to slide out of the device 10.

To automate the device 10, the outer surfaces of the twisting and rotating parts of the device 10 may be modified to resemble a spur gear and is then connected to motors.

In another embodiment of the device 10, any of the grinder 20, blender 30, or funnel assembly 70 may be removed from the device. In this way, the device 10 would comprise the rolling assembly 52, which does not require the grinder 20, blender 30, or funnel assembly 70 and may be used to roll papers around hand deposited materials.

In another embodiment of the device 10, a rolling paper may be fed individually into the rolling assembly 52 from a stack of sheets in a tray via a feeding means such as a friction feeder, which is described in more detail in FIGS. 49A-C.

The device may be used in different orientations depending on the needs/requirements of the user. For example, the device 10 may be held in the vertical plane such as the gravity fed device described in U.S. Pat. No. 9,427,020.

However, the device may be held in a horizontal plane as described in embodiments below.

In a further embodiment of the device 10, a filter tip may be wound into the paper during rolling of the paper such that the cigarette is formed with a filter. In this case, the device 10 may be held in a horizontal plane, that is, along the axis of the device 10.

In a still further embodiment of the device 10, may have a cone or tube-shaped jig or shaping mandrel, similar to that shown in FIG. 63, to make pre-rolled cigarette tubes to be filled later. The shaping mandrel would insert into the rolling assembly 52 through the first gearbox assembly 44. The shaping mandrel may also replace the funnel assembly 70 and may be used to push the final product out of the device 10.

Figure 41A:
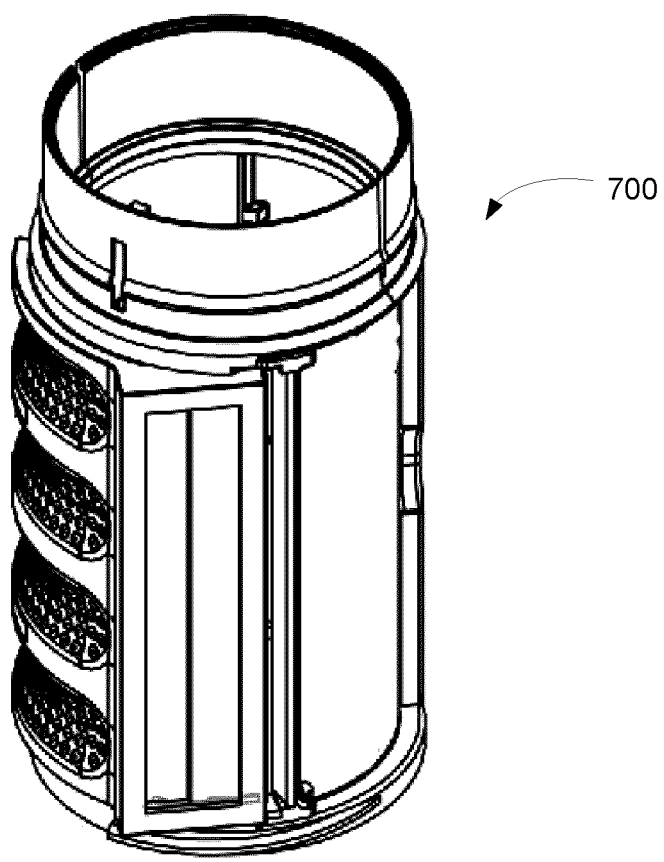
FIG. 41A is a perspective view of another embodiment of a filler device.
Figure 41B:
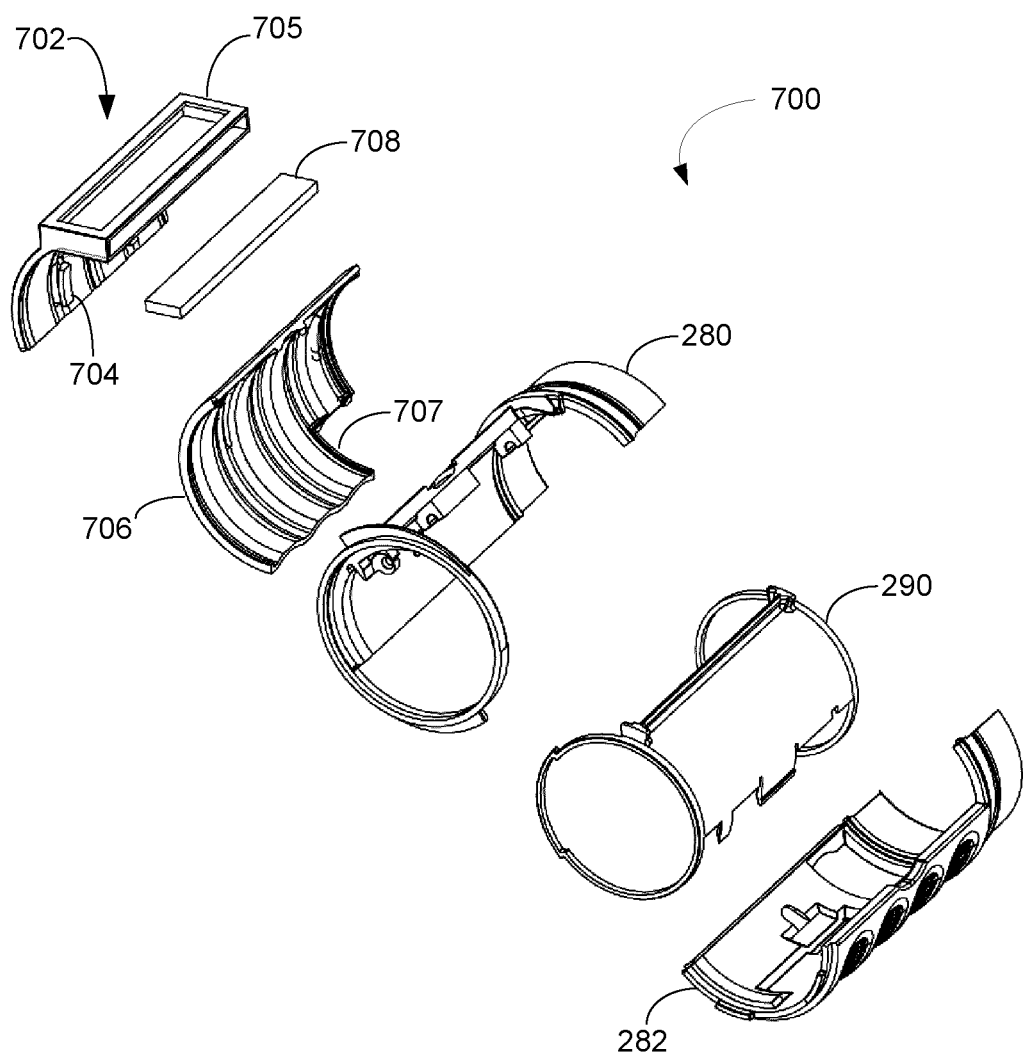
FIG. 41B is an exploded view of the chamber of FIG. 41A.

Turning now to FIGS. 41A and 41B, an embodiment of a chamber 700 in accordance with the present invention is shown. As shown in FIG. 41B, the chamber 700 comprises a slider 702, a chamber grip 706, the first body 280, the second body 282 and the window 290 described herein. The slider 702 may replace the flap 291 with the sponge as described for device 10. The slider 702 comprises feet-like members or protrusions 704 which protrude underneath so they can engage with grooves 707 of the chamber grip 706 (described below). The slider also comprises a sponge holder 705 capable of holding a sponge 708. In embodiments, the sponge 708 is rectangular, and thus the sponge holder 705 is shaped to match the sponge 708 (e.g. having a rectangular orifice for receiving the sponge 708, and/or having a generally overall rectangular shape for housing the sponge 708). The shape of the sponge holder 705 may be any conceivable shape, so long as it is capable of holding the sponge 708.

In some embodiments, the slider 702 is able to rotate slightly around the axis of the device 10 within about a quarter turn around the axis. This rotation may be in the left or right direction. In typical embodiments, the sponge 708 is moist (e.g. sponge 708 is capable of holding water) and when the user moves the slider 702 closer to the paper, the slider 702 then moistens the glue strip with the sponge 708. In this way, when the sponge 708 is slightly moist and it hits the paper glue area, it may seal the paper together to form, for example, a pre-roll tube, a cone, a finished cigarette or a filled cigarette.

In some embodiments, the slider 702 may also have springs (not shown) behind it, which may encourage an automatic return. In embodiments using springs (not shown), it is contemplated that the user would simply push the slider 702 to hit the paper and then let go so the spring (not shown) can return it to its position.

The chamber grip 706 comprises grooves 707 that are capable of accepting or engaging with the slider 702 (e.g. via the protrusions 704). There may be any number of grooves 707, however, in exemplified embodiment, there are two. The grooves 707 may also take on any possible shape, and in the exemplified embodiment, the shape is rectangular. In this way, the grooves 707 may allow the slider 702 to travel within the grooves 707 of the chamber grip 706. In the described embodiments, the slider 702 is therefore capable of connecting to the chamber grip 706 using a type of "tongue and groove" mechanism, wherein the feet-like members 704 of the slider 702 engage with the grooves 707 of the chamber grip 706.

In an alternative embodiment to FIGS. 41A and 41B, the slider 702 and sponge 708 may be replaced with a steamer or steaming assembly (not shown) to wet the glue on the paper.

Figure 42A:
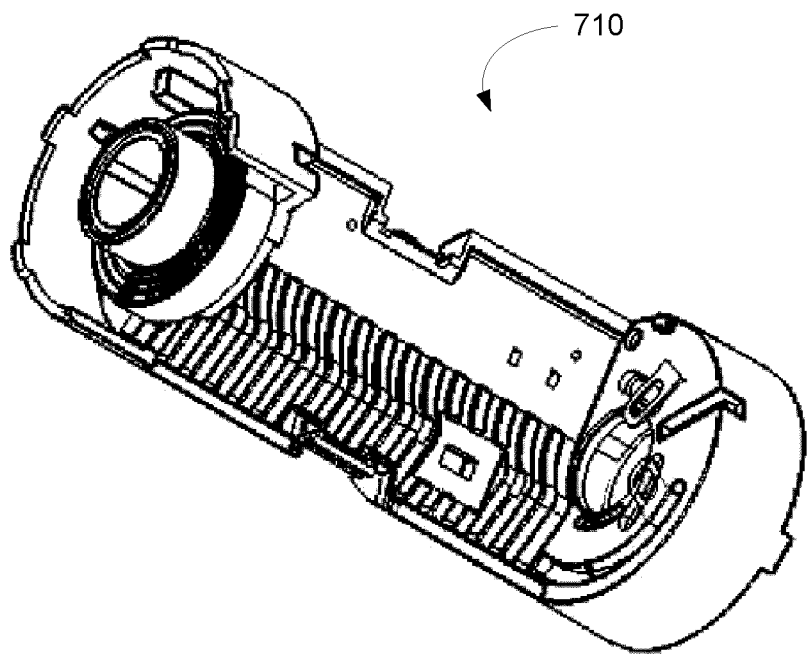
FIG. 42A is a perspective view of another embodiment of a chassis with coils instead of gears.
Figure 42B:
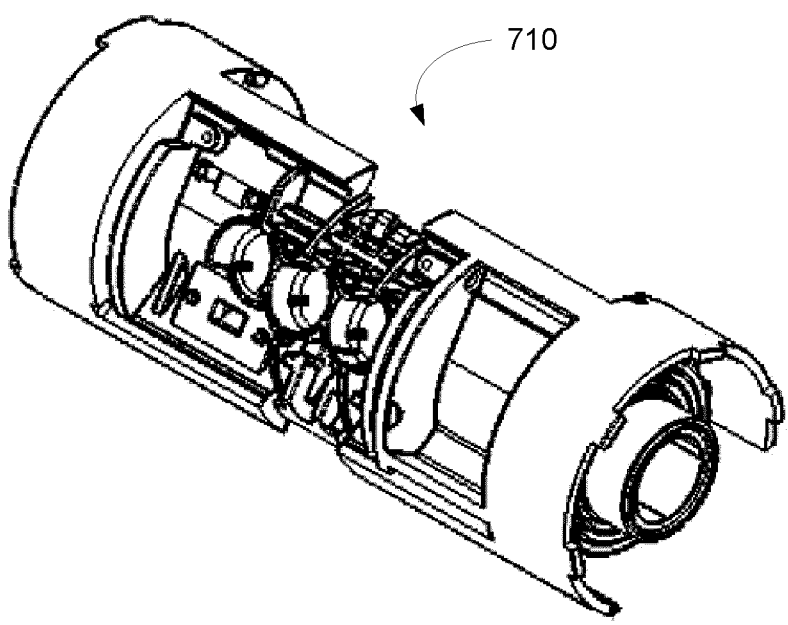
FIG. 42B is another perspective view of FIG. 42A.
Figure 42C:
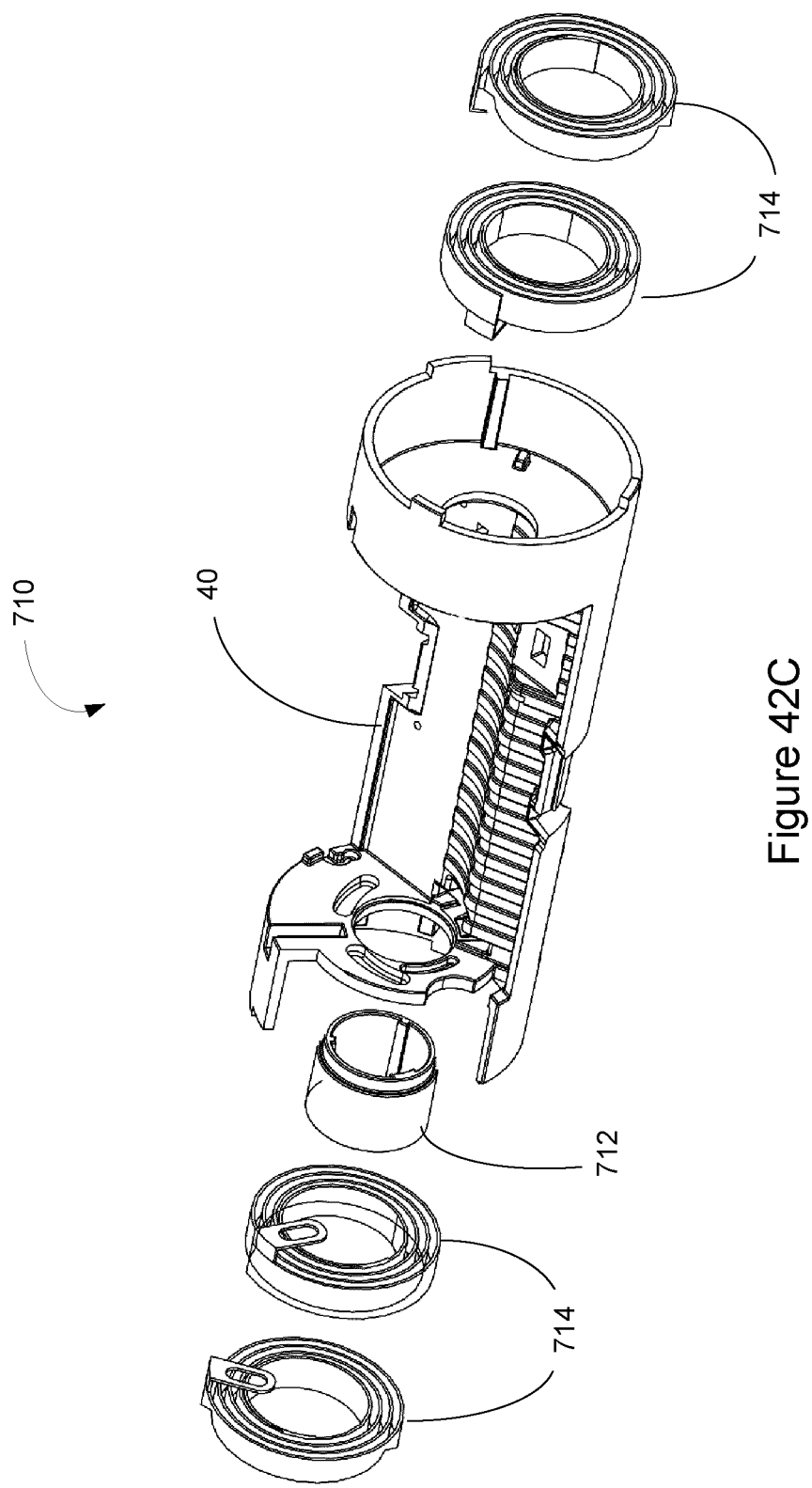
FIG. 42C is an exploded view of the chassis of FIG. 42A.

As shown in FIGS. 42A and 42B, an embodiment of a chassis 710 is shown. In this embodiment, the chassis 710 has coils 714, instead of gearboxes 44, 48 described herein. In this way, alternative elements can be used with the device 10 described herein, such that, for example, the use of coilboxes 714, postboxes 720 or springboxes (not shown), instead of gears and gearboxes 44, 48 described herein, are contemplated within the scope of the invention.

As shown in FIG. 42B, when the chassis 710 uses coils 714 instead of the gears as described herein, the coils 714 may reduce the amount of residue or debris that can collect inside the gear box 44, 48 described herein, thereby possibly avoiding any unnecessary or difficult cleaning of the same. By functioning in this manner, the coils 714 may also add to the longevity to the device 10. In embodiments, the coils 714 or springs (not shown) may be used in such a way that they could be wound to bring the levers 300, 360 described herein together or apart at a 1:1 ratio. In embodiments, the coils 714, may replace the levers 300, 360 described herein that can function to retain the rollers 410, 420 described herein, such that they may 'spring' back into original position. In embodiments, the coils 714 may be housed inside a coil mandrel 712 to operate the levers 300, 360 described herein.

Figure 43A:
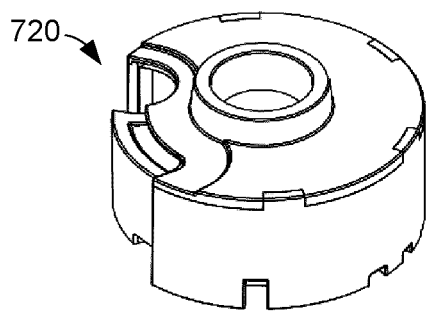
FIG. 43A is a top perspective view of a postbox.
Figure 43B:
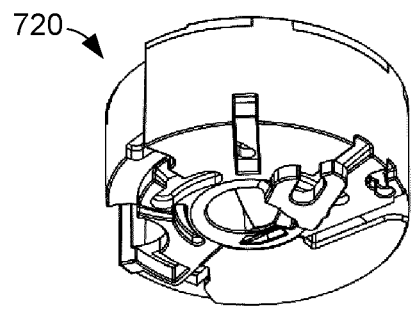
FIG. 43B is a bottom perspective view of the postbox of FIG. 43A.
Figure 43C:
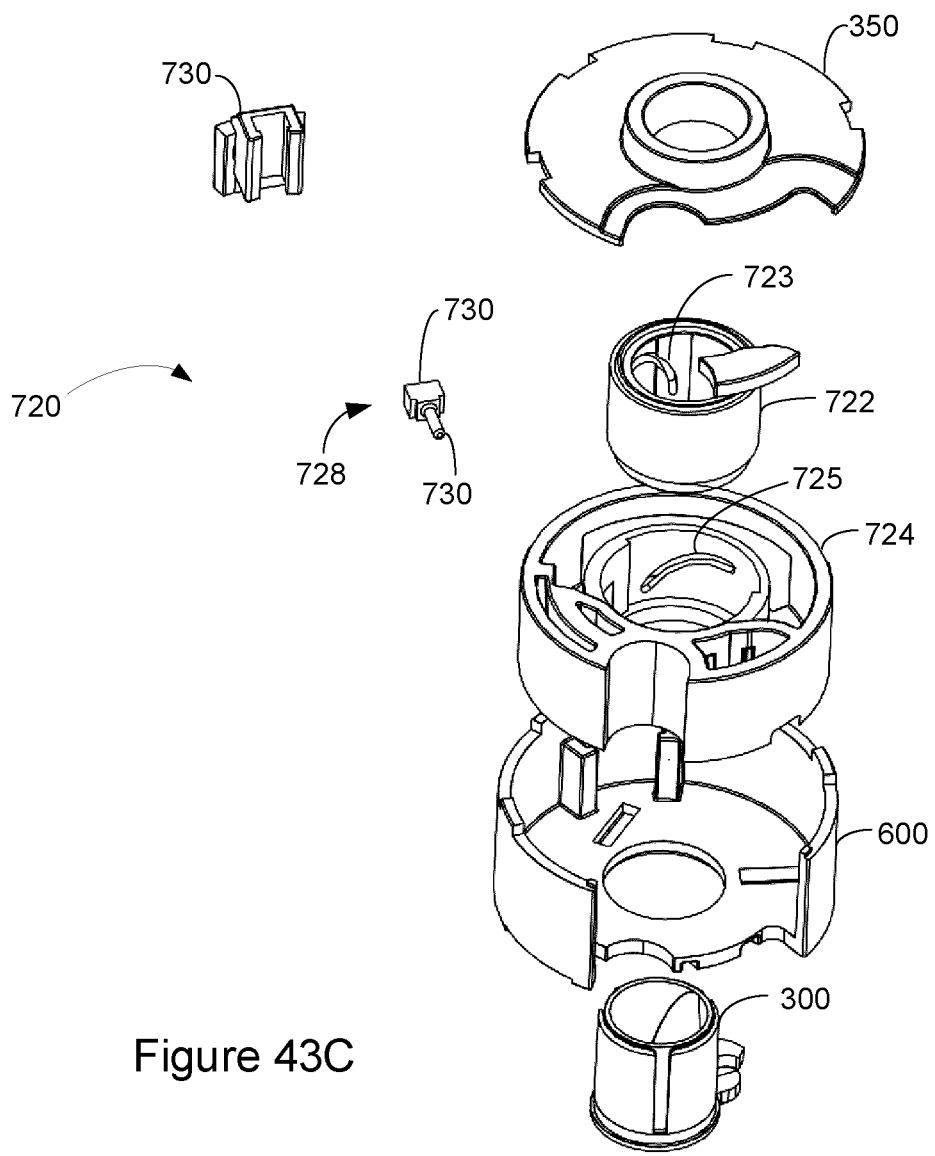
FIG. 43C is an exploded view of the postbox of FIG. 43A.

Postboxes 720 are shown in FIGS. 43A and 43B, and in more detail (e.g. exploded) in FIG. 43C. The postbox 720 comprises a lever 722, cog 724, the chassis end 600 described herein, the lever 300 described herein, a mandrel pin 728 and a mandrel box 730. The postbox 720 also further comprises the cover 350 described herein. In embodiments, there are two postboxes 720, instead of two gearboxes 44, 48 described herein. In embodiments, the postbox 720 may have a "tongue and groove" type sliding mechanism, which may encourage the levers 300, 360 described herein to move, for example, up and/or down, and engage and/or disengage in a 1:1 ratio. The postbox 720 may function the same as the gearbox 44, 48 described herein, however, it operates with different parts, such as, for example, without gears as described herein. The use of the postbox 720, in the absence of gears described herein, may help reduce the amount of residue and debris building in the gearboxes 44, 48 described herein.

As shown in FIG. 43C, lever 722 comprises a first slot 723 and cog 724 comprises a second slot 725. In embodiments, the slots 723, 725 allow the mandrel pin 728 to move the lever 300, 360 described herein in opposite directions.

In embodiments, the slot 721 on the side of the lever 722 permits the mandrel pin 728 to travel in it which can encourage lever 722 to rotate cog 724. In embodiments, levers 300, 360 described herein may be pressfit into lever 722 such that the levers 300, 360 described herein and the lever 722 become a single operating piece of the device 10. In further embodiments, the slot 725 on the inside wall on cog 724, may permit the mandrel pin 728 to travel inside slot 725 and to rotate it based on user interaction of the device 10. In this embodiment, cog 724 is similar to first main gear 302 described herein, however, the gears described herein have been removed.

In typical embodiments, the mandrel box 730, is a stationary part that permits the mandrel pin 728 to travel up and/or down as the device 10 is rotated to engage and/or disengage the rollers 410, 420 described herein. In embodiments, the mandrel box 730 can permanently reside inside its own 'housing', such as for example, chassis end 600 described herein. In these embodiments, residing in the chassis end 600 may utilize a "tongue and groove" type mechanism between the chassis end 600 and the mandrel box 730.

In typical embodiments, the mandrel pin 728 comprises a pin part 727 and a box part 729. In typical embodiments, the box part 729 of the mandrel pin 728 fits inside the mandrel box 730 and moves up and/or down depending on user input. In further typical embodiments, the pin part 727 of the mandrel pin 728 engages with (e.g. goes inside) both lever 722 and cog 724. The upward/downward sliding of the mandrel pin 728 may permit lever 722 to move up and/or down because the pin part 727 of the mandrel pin 728 is inserted into the slot 721 on lever 722 and also into cog 724.

When the mandrel pin 728 moves up and/or down inside the mandrel box 730, the slot 721 is positioned in such a way that it rotates both lever 722 and cog 724 in opposite directions. In typical embodiments, when the mandrel pin 728 moves up and/or down, the slots 721, 725 on lever 722 and cog 724, respectively, are engaged in such a way that the mandrel pin 728 permits lever 722 and cog 724 to move in opposite directions.

Accordingly, in embodiments as described herein, the mandrel box 730, mandrel pin 728, lever 722 and cog 724 may work together to keep the levers 300, 360 described herein working in a 1:1 ratio and move up and/or down.

Now turning to FIG. 44A, a piston assembly 750 is shown. This assembly 750 may use a pneumatic piston, a spring, or hydraulics to help seal the top of the cigarette by, for example, twisting it and then pushing it out the other end to expunge the finished product. The assembly 750 may have a variety of shapes, and a variety of differing size bores, and/or piston strokes, as would be understood in the art. Furthermore, the assembly 750 can be controlled electronically or used manually.

In typical embodiments, the assembly 750 can interact with the core 40 described herein, as shown in FIG. 44B. The assembly 750 comprises a plunger 752, a spring 754, a retainer 756, a funnel grip 758 and a funnel 760. As shown in FIG. 44B, the cover 350, first bevel gear 306 and lever 300 herein described of the gearboxes 44, 48 herein described, forming part of the core 40 herein described, may be connected to the assembly 750 such that the completed product (e.g. cigarette) can be ejected from the assembly 750. In this embodiment, the core 40 may further comprising a tip folder 761 having a half moon cut-out on a flap thereof for interactions/engagement with the plunger 752.

The funnel 760, is similar to funnel 220 described herein. In embodiments, the funnel 760 is capable of accommodating a piston (not shown) in which the piston end (not shown) is able of laying flush with the funnel 760. The funnel 760 can connect to the funnel grip 758 in a type of "tongue and groove mechanism" described herein. In typical embodiments, the funnel 760 may be fixed or removeable from the funnel grip 758 depending on the requirements of the device 10 or the desire of the user. In typical embodiments, the funnel 760 rotates with the funnel grip 758 and can also rotate the rotating gear 238 described herein.

The funnel grip 758, in this embodiment, may have gear teeth added to the outside of the funnel grip 758 such that they are used for the purpose of automation. In typical embodiments, if the funnel grip 758 is squeezed from two opposing sides it can release the funnel 760, which may result in easier removal of the funnel 760 therefrom. The funnel grip 758 typically permits the funnel 760 to rotate the rotating gear 238 described herein.

In typical embodiments, the plunger 752 has an end having a protrusion 751 which can move out slightly, for example, after the cigarette has been wrapped, so it can "hug" the tip of the open end of the cigarette and apply slight overlap causing the tip to be folded into itself. In some embodiments, a jig may move slightly past the flap on the tip folder 761 to help fold the paper. The protrusion 751 is also capable of aligning with the tip folder 761 such that the protrusion 751 can fill the half-moon shape of the tip folder 761. The plunger may twist the end of the cigarette thereby sealing one end of the cigarette. The plunger may also be used to push the finished cigarette out of the assembly 750.

The retainer 756 acts as a housing for the spring 754 and the plunger 752. There is no limitation on the shape or size of the retainer 756, so long as it functions to house the spring 754 and the plunger 752 as described herein. In other embodiments, the retainer 756 may be an air pneumatic, hydraulic or spring-loaded. The retainer 756, in typical embodiments, is pressed against the funnel 760.

The spring 754 is responsible for bringing the plunger 752 back to resting position after use thereof.

Turning now to FIGS. 45A and 45B, an alternative embodiment of the device 10 is shown. In this embodiment, the device 800 is stationary as shown. This device 800 can be, for example, attachable to a surface (e.g. desktop, wall, table etc.) and the device 800 is capable of rolling pre-roll paper cones or tubes around a shaping mandrel (similar to that shown in FIG. 63) or making a finished wrapped cigarette with ground material inside. The parts of an alternative embodiment of the chamber 801 of device 800 are shown in more detail in FIG. 46. The chamber 801 comprises a first body 786 and a second body 802, which are attachable to each other to house the core 40 described herein.

The first body 786 acts as a retainer and comprises a footing 788 which functions to secure the first body 786 to a platform 890. In this way, the device 10 of the device 800 can be bolted down and remain stationary. In other embodiments, the device 10 may be connected to the surface by other mechanisms understood in the art such that it is not limited to being bolted (e.g. glued, nailed etc.). In some embodiments, the device 800 comprises a sponge retainer 778 such that the sponges described herein may be retained for use in moistening the rolled cigarette as described herein. The sponge retainer 778, which may be secured to the first body 786, can house springs (not shown) and a sponge container which is used to 'stamp' the glue before the paper is wrapped. In typical embodiments, the first body 786 has ends that are connectable to a funnel grip 870 and a locksleeve 840 described further below, respectively.

The sponge retainer 778 comprises apertures 779 which align with apertures 790 of the first body 786, and may be connected thereto through the use of bolts 792. Other mechanisms of attaching these elements together, as understood by those skilled in the art, may be employed.

The second body 802 comprises a footing 804 which functions to secure the second body 802 to the platform 890. As shown in FIG. 47, the second body 802 further comprises apertures 805, which in embodiments, have a rectangular shape, which are for connection of an embodiment of the core 7000, shown in FIGS. 50A-50C, and a plunger 810. The apertures 805 and the footings 804 also allow for the plunger 810 to push the first chassis lever 7050 and the second chassis lever 7060 into the chassis 7002, (shown in FIG. 50C). The second body 802 also comprises apertures 806, in the illustrated embodiment there are two holes at the bottom of the second body 802 (see FIG. 47), for securing the second body 802 to the platform 890. The second body 802 also comprises apertures 807, in the illustrated embodiment there are two holes at the top, to assist with the connection of accessories which may or may not be shown or described in the application. When additional accessories are to be attached using the apertures 807, a paperfeed bolt 880 may be used as an axis (e.g. these parts use the paperfeed bolt 880 as a center axis and travel around it permitting the parts to move and/or rotate up and/or down. In this way, the various components (not shown) may be permitted to swing open and/or closed. In some embodiments, the paperfeed bolt 880 may be used to connect a spacer 814 or lockroller 850 described below. In typical embodiments, the paperfeed bolt 880 is affixed to holes in the second body 802.

The platform 890 comprises apertures 892 through which the footing 788 of the first body 786 and the footing 804 of the second body 802 may be attached. In typical embodiments, the platform 890 further comprises an aperture 891 such that any excess ground material may fall therethrough and into, for example, a collection bin (not shown) underneath the surface. In this way, the device 800 may aid individuals that may have problems with, for example, dexterity or suffer from pain associated with holding objects in their hands for periods of time. Alternatively, the footing 788 of device 800 may be connected to any surface such as a tabletop, desktop, or other flat horizontal surface, via brackets, such as L-brackets, which would be attached to the surface and the footing 788.

The plunger 810 functions to push the first and second chassis levers 7050, 7060 into the chassis 7002, described below, so that the levers 300, 360 described herein may close through-holes on the chassis end 7004 described below.

The spacer 814 allows for connection to the paperfeed bolt 880 and may also be used to help move the plunger 810.

The chamber end 820 is similar to chamber end 284 described herein. As shown in FIG. 48, the chamber end 820 comprises indentations 819, such that the indentations may facilitate connection with the first body 786 and the second body 802. In this way, the chamber end 820 may be affixed to the first body 786 and the second body 802. The chamber end 820 can also connect to and help retain the locksleeve 840 and permits the locksleeve 840 to rotate.

A feedgear 834 is capable of taking motion from the locksleeve 840 when it rotates and transferring the motion to a second rotating gear 832 by using a band 830. In typical embodiments, the plunger 810 is lowered when the transferred motion from the funnel grip 870 to the second rotating gear 832 described herein. The second rotating gear 832 acts as a second rotating gear to the rotating gear 238. The rotating gear 238 described herein is the main 'constant' motion provider for roller 410 described herein, since, for example, the rubber is round, and is in constant contact with roller 410 described herein. The second rotating gear 832 can provide the second 'intermittent' motion provider for roller 420 described herein, since for example, the rubber is oval. The second rotating gear 832 can 'pulse' onto roller 420 described herein because the rubber over moulding used to grip roller 420 described herein is oval in shape. In this way, the ovular shape is used to help 'push' roller 420 described herein in case it gets stuck, such that rollers 410 and 420 described herein can continue in motion. While rollers 410 and 420 have been shown to be straight rod-shaped to form straight tube cigarettes, it is understood that the rollers 410 and 420 described herein may have any shape for example, rollers having a tapered rod shape (similar to that shown in FIG. 67) to form a cone shaped tube. In typical embodiments, the second rotating gear 832 and the feedgear 834 may be connected with a band or a belt 830, and in more typical embodiments, the band or the belt 830 may have teeth for, for example, assisting with the aforementioned connection.

The locksleeve 840 is typically connected to the chamber end 820, the first body 786 and the second body 802. In embodiments, the locksleeve 840 may be 'sandwiched' between the first body 786 and the chamber end 820. The locksleeve 840 connects to an embodiment of the base lock 7042, shown in FIGS. 52A and 52B and described below, and is keyed into position, that is, the indentations 841 on the inside wall of locksleeve 840 fit the ribs 7044 on the outside wall of base lock 7042 when assembled. This allows base lock 7042, and the locksleeve 840 to move as one. When the locksleeve 840 is rotated, the locksleeve 840 turns the base lock 7042, described below. In some embodiments, the locksleeve 840 has gear teeth on the outside so that it can connect to a belt-tooth pulley and to a motor.

In typical embodiments, there is at least one lockroller and in more typical embodiments, there are two lockrollers. The lockroller 850 can allow for the device 10 to have the second rotating gear 832 part which can press onto roller 420 described herein. The lockroller 850 is capable of housing the second rotating gear 832 and permitting the second rotating gear 832 to roll the roller 420 described herein, similar to how rotating gear 238 rolls roller 410 described herein. In this way, the lockroller 850 may allow for the rotating gear 238 described herein and the second rotating gear 832 to be used with the device 800 (e.g. allows for the incorporation of a rotating gear in addition to the rotating gear 238).

The funnel 860, shown in greater detail in FIGS. 49A and 49B, connects the first body 786 to the second body 802 together when a funnel grip 870 clamps onto it. The funnel 860 rotates around the end of the first body 786 and the second body 802 with the funnel grip 870. In typical embodiments, the funnel 860 has a spur-gear 861 on the inside top ceiling of the funnel 860 so that it connects with the rotating gear 238 described herein. When the funnel 860 rotates, the rotating gear 238 described herein also rotates because the rotating gear 238 has a mating spur-gear 861 on its end which connects to the spur-gear 861 of the funnel 860.

The funnel grip 870 holds the funnel 860 in place when it clicks onto the first body 786 and the second body 802. In typical embodiments, the funnel 860 is fixed or removeable and can be removed by squeezing the sides of the funnel grip 870 to remove the funnel 860 from the first body 786 and the second body 802. The funnel grip 870 can rotate (with the funnel 860) around the end of the first body 786 and the second body 802 so that the funnel grip 870 turns the funnel 860, because, as described herein, the funnel 860 has a spur-gear which connects to the spur-gear on the rotating gear 238 described herein.

Turning to FIGS. 50A to 50C, an alternative embodiment of the core 7000 for device 800 is shown. An embodiment of the chassis 7002 is shown in greater detail in FIGS. 51A to 51C. Chassis 7002 operates in a similar manner to chassis 42 of device 10. Chassis 7002 has a first chassis end 7004 and a second chassis end 7006 and a middle chassis body 7008. The chassis 7002 has reinforcement walls 7009 at the middle chassis body 7008 to prevent twisting of the chassis 7002 when in operation. First chassis end 7004 has a notch 7010 and second chassis end 7006 has a notch 7011 to accommodate a first chassis lever 7050 and a second chassis lever 7060 respectively.

Turning back to FIG. 50C, alternative embodiments of the gearboxes for device 800 will now be described. An embodiment of the first gearbox 7020 has a similar operation to first gearbox 44 of device 10 and comprises a first lever 7014, a first main gear 302, a first pinion 304, a first bevel gear 306, all of which rest within first chassis end 7004 and covered by cover 7022. First main gear 302 may have a cover 301 to prevent debris from filling a void in first main gear 302. Cover 7020 is similar to cover 350 with slight modifications to its shape and connections. First lever 7014, shown in more detail in FIG. 53, is similar to first lever 300 of device 10. However, first lever 7014 of device 800 is shaped to rotate a first chassis lever 7050, shown in greater detail in FIG. 57.

An embodiment of the second gearbox 7040 comprises a second lever 7016, a second main gear 362, a second pinion 364, a second bevel gear 366, all of which rest within second chassis end 7006. Second gearbox 7040 works in the same manner as second gearbox 48 of device 10. Second lever 7016, shown in more detail in FIG. 58, is similar to second lever 360 of device 10. However, second lever 7016 of device 800 is shaped to rotate second lever 7042, shown in more detail in FIG. 58.

FIGS. 51A and 51B show an alternative embodiment of the base lock 7042. In this embodiment of the base lock 7042, the outer wall has ribs 7044 which fit within the indentations 841 of base lock sleeve 840 when assembled. As with device 10, base lock houses a second gearbox 7040 and when base lock sleeve 840 is rotated to a certain degree, rolling chamber is opened and closed. In this embodiment of the device 800, base lock 7042 does not have a base knob 492 or base valve 494. Rather, central protrusion 7046 having central aperture 7048 is open to allow a cigarette to move through it.

First chassis lever 7050 and second chassis lever 7060 are retained respectively by a pair chassis lever brackets 7070, which can be seen in more detail in FIG. 56. Chassis lever bracket 7070 has a hook 7072 which engages a handle 7056 and 7066 on first chassis lever 7050 and second chassis lever 7060 respectively. This allows the first chassis lever 7050 and second chassis lever 7060 to rotate the axis created by the handles 7056 and 7066 respectively. Chassis lever brackets 7070 are shaped to sit within the middle chassis body 7008 and attaches to the chassis 7002 by screws 7074 in FIG. 60C, however, any attachment means are possible. Springs 7076 are retained between each chassis lever bracket 7070 and first chassis lever 7050 and second chassis lever 7060. One end of each spring 7076 is retained in a hole 7078 in each chassis lever bracket 7070 and the other end of spring 7076 is retained on a post 7058, 7068 on each of first and second chassis lever 7050, 7060 respectively. Springs 7076 return first chassis lever 7050 and second chassis lever 7060 to their outward position to open the central aperture of the chassis 7002 at each of the chassis ends 7004, 7006.

In FIG. 57, it is shown that first chassis lever 7050 has a flat arm 7052 which closes the central aperture of the first chassis end 7004 when the first chassis lever 7050 is activated. The flat arm 7052 has a notch 7054. The notch 7054 allows a piston (not shown) to protrude into first chassis end 7004 to fold papers. When first chassis lever 7050 is in an open state, a piston may protrude through the central aperture to push a cigarette out if the second chassis lever 7060 is open. In FIGS. 50C and 58, it is shown that second chassis lever 7060 has a flat rounded arm 7062. This rounded flat arm 7062 closes the central aperture of the second chassis end 7006 when the second chassis lever 7060 is activated, holding the cigarette in place. When second first chassis lever 7050 is in an open state, the cigarette may be released.

FIG. 55 shows a wire cover 7080. Wire cover 7080 is attached to the middle chassis body 7008, typically by a screw 7082, but other attachment means is possible. Wire cover 7080 retains the lockroller handle 482 and lockroller wire 480 and encourages their smooth movement. Wire cover 7080 is shaped to fit around the middle chassis body 7008.

Turning back to FIG. 50C, gear handle 7042 acts in the same manner as gear handle 400 of device 10. Gear handle 7042 may be shaped to accommodate the paper feed 7080. Paperfeed frame 7090 operates similarly to paperfeed frame 442, however, in this example, the frame is shaped to accommodate the second rotating gear 832. Paperfeed frame 7090 is also shaped to accommodate the paperfeed and ensure smooth feeding of papers.

Lockroller 454, lockroller handle 482, lockroller wire 480, rollers 410, 420, and skirt 430, operate in the same manner as their counterparts in device 10. In some embodiments, if a cone-shaped cigarette is desired, rollers 410, 420 may be substituted for tapered rollers 990, 992 as shown in FIG. 67. In this case, the skirt 430 may also be substituted for a tapered skirt (not shown) to aid in creating cone-shaped cigarettes.

Turning now to FIGS. 59A and 59B, embodiments for wetting paper to seal the cigarettes described herein are described. Described herein is a method to wet the glue on the paper. In embodiments, a steamer (not shown) can also be used, such that when latent air is slightly cooled it may create a more wet spray which may also wet the paper glue. In typical embodiments, the method may be used with the stationary device 800 for the device 10, which is, for example, bolted to the desktop, as described herein.

A wetting assembly 770 is shown in detail in FIG. 59B. The wetting assembly comprises the first body 786 described herein, the sponge retainer 778 described herein, a sponge compartment 774 and a cylinder 772. The wetting assembly further comprises the sponge 708 as described herein. Prior to operation, the sponge would be moistened with liquid such as water. The first body 786 and the second body 802 described herein are attached to each other, through for example, bolts (not shown), which may be used to secure the device 10 to a surface (e.g. desktop, table, wall etc.). The wetting assembly further comprises a lever-motion-transfer 784 so that when the cylinder 772 hits the transfer 784 it rotates on an axis and motion travels upward to push sponge 708 up to 'stamp' the glue. The cylinder 772 may be activated by a timing mechanism or sensor (not shown). In the case of a timing mechanism, the timing mechanism may calculate the length of paper and how long it would take for the paper to finish rolling and activate the cylinder 772 at the appropriate time. In the case of a sensor, the sensor may sense when the paper is finished rolling and activate the cylinder 722. Alternatively, the cylinder may be activated manually by the user.

The sponge compartment 774 described herein retains or holds the sponge 708 in a slot 775. The sponge 708 may be adjusted so as to not over press the paper glue area. The sponge compartment 774 comprises apertures (not shown) at the bottom such that the sponge compartment 774 may connect to a water reservoir (not shown). In this way, the sponge 708 is able to collect water. The sponge compartment 774 also comprises legs 776 which are able to rest inside the sponge retainer 778 where springs 780 reside, so that the legs 776 can be used to bring the sponge compartment 774 back down into its resting position.

The sponge retainer 778 connects to the first body 786 described herein at the bottom with bolts as described herein. In this way, the sponge retainer 778 and the first body 786 are held down (e.g. stationary). In typical embodiments, the first body 786 and the sponge retainer 778 may then be braced to the surface described herein to hold the device 10 in place. The sponge retainer 778 is capable of housing springs 780 on either end. In typical embodiments, the springs 780 are used to retract the sponge 708. In the illustrated embodiment there are two springs, however, any number of springs necessary for the function of the device 10 is contemplated within the scope of the invention.

FIGS. 60A-60O show an alternative embodiment of the invention. In this embodiment, the device 900 shown has a rolling assembly that is substantially similar to the rolling assembly 52 of the cylindrical device 10 of FIG. 1A, having a skirt 430 and rollers 410 and 420 and the rolling assembly works in substantially the same manner as the device 10 of FIG. 1A. Device 900 is stationary and may be attached to a surface 902 such as a platform, tabletop, counter or other flat surface. In an embodiment of the device, straight rollers 410 and 420 may be replaced with tapered or conical rollers 990 and 992 shown in FIG. 67 (while FIG. 67 shows only one roller 990, the other roller 992 is the same shape). Tapered rods 990 and 992 allow for cone-shaped cigarettes to be formed. In this case, the skirt 430 may also be replaced with a tapered skirt (not shown) to aid in shaping cone shaped-cigarettes.

In this example, device 900 is attached to a surface 902 by a first end bracket 904 and a second end bracket 906, which act as retainer for various components of the device 900. First end bracket 904, shown in greater detail in FIGS. 61A and 61B, has a first side wall 908, a second side wall 910, and a bottom wall 912 and is substantially J-shaped. First end bracket 904 has a through-hole 914 in the first side wall 908 and a second through-hole 915 in second side wall 910. Through-holes 914 and 915 substantially align with one another. Second end bracket 906, shown in greater detail in FIG. 62, has a first side wall 916 and a bottom wall 918 and is substantially L-shaped. Second end bracket 906 has a through-hole 920 in the first side wall 916 that substantially aligns with through-holes 914 and 915 in first end bracket 904. In this example, first end bracket 904 and second end bracket 906 are secured to the surface 902 by bolts or screws 921 through bottom walls 912 and 918, however, any securing means may be utilized. Rollers 410, 420 (or tapered rollers 990, 992) have protrusions 422, 424 on each end, which rest in arched slots 917, allowing rollers to move up and down the arched slots 917 to form the cigarette tube. In this embodiment, the rollers are moved manually. As in device 10, the skirt 430 fits over the rollers 410 and 420 and may receive the ground material to create filled cigarettes. If tapered rollers 990, 992, as shown in FIG. 67, are used in the device 900, then a tapered skirt (not shown) would be used to form cone-shaped cigarette tubes.

To create pre-rolled paper tubes, a shaping mandrel 922, shown in FIG. 63, fits into through-holes 914 and 920 such that shaping mandrel 922 slides into through-hole 920 and across to through-hole 914. In this case, the skirt 430 would receive the paper and wrap the paper around the shaping mandrel 922 rather than the ground material. Shaping mandrel 922 is rod-shaped having a flared mid-section 924 that tapers to a tapered end 926 that rests in through-hole 914. The tapered shape of shaping mandrel 922 allows for cone-shaped tubes to be made. However, shaping mandrel 922 may also be straight to form straight tubes. Shaping mandrel 922 has a mandrel grip 928 at its other end. Mandrel grip 928 sits outside second end bracket 906 such that it may be turned or pushed further into the through-hole 920, thus pushing tapered end 926 further into through-hole 914.

Shaping mandrel 922 abuts a piston 930 in through-hole 920. Piston 930 is shown in FIG. 64. Piston 930 is rod-shaped and may be spring-loaded, pneumatic or hydraulic. Piston 930 has a thin section 932 and a thick section 934. Piston 930 sits within first end bracket 904 such that the end of thick section 934 rests within through-hole 920 and abuts shaping mandrel 922 at its tapered end 926. Thin section 932 passes through through-hole 915. The end of thin section 932 is supported within a piston support 936 which abuts the second side wall 910 of first end bracket 904. Piston support 936 is substantially U-shaped, having a first side wall 938 and a second side wall 940 and a bottom wall 942. First side wall 938 has a through-hole 944 which substantially aligns with through-hole 915 in first end bracket 904. Second side wall 940 has a through-hole 946 that substantially aligns with through-hole 944. In this example, piston support 940 may have an L-shaped bracket 941 abutting second side wall to help retain the piston in place. L-shaped bracket 941 has through-hole 943 aligning with through-hole 946 and attaches to second side wall 940 by bolts and nuts or other attaching means. In this example, piston support 940 and L-shaped bracket 941 are attached to the surface 902 by bolts or screws 921 through the bottom wall 946, but any securing means may be utilized.

When mandrel grip 928 is pushed towards through-hole 920, tapered end 926 subsequently pushes thick section 934 into through-holes 915 and 944 thereby compressing thin section 932. In the case of a spring-loaded piston, a spring 946 may inserted over the thin section 932 which would compress as thick section 934 is pushed through. When mandrel grip 928 is released, spring 946 push thick section 934 back into place, thereby pushing shaping mandrel 922 back into its original position. As mentioned previously, piston 930 may use hydraulics or pneumatics for the piston action described above. By pushing mandrel grip 928, tapered end 926 is pushed through through-hole 914, exposing the tapered end 926 between side walls 908 and 910. This allows a user to wind a paper filter around the tapered end 926 before the cigarette is formed. In this example, the shaping mandrel 922 is tapered which allows for cone-shaped cigarettes to be formed. However, the shaping mandrel 922 may also be straight, allowing straight cigarettes to be formed. Other shapes of mandrel may be possible to form other shapes of cigarettes. Once the cigarette is formed, tapered end 926 of shaping mandrel 922 is removable from through-hole 914 to remove the cigarette tube.

A paperfeed assembly 950 feeds rolling paper individually from a paper stack into the rolling assembly 52 by friction. In this example, paperfeed assembly 950 has a back plate 952, a friction plate 954, a front plate 956, and a pull plate 958. The first end bracket 904 and second end bracket 906 have grooves 905 in their respective first side walls 908, 916. Grooves 905 are shaped to retain the edges of back plate 952, such that back plate 952 is connected to and sits between first end bracket 904 and second end bracket 906, making back plate 952 stationary. The friction plate 954 is affixed to the back plate 952 by any affixing means such as glue. Friction plate 954 prevents more than one sheet of rolling paper (not shown) to be fed and may be made of rubber, silicone, or other material to create such friction.

Pull plate 958 is shown in greater detail in FIG. 65. Pull plate 958 has a central protrusion 960 which aligns with a central hole 962 in back plate 952. Two side protrusions 964 on each side of central protrusion align with side holes 966 in back plate 952. Each side protrusion 964 may retain a spring 968. When assembled, pull plate 958 sits on top of friction plate 954, which is attached to back plate 952 and the protrusions 960, 962 protrude from the holes 964, 966 in back plate 952. In another embodiment, pull plate may have a single protrusion retaining a spring or two protrusions each retaining a spring.

The first end bracket 904 and second end bracket 906 have grooves or indentations 907 in their respective first side walls 908, 916. Grooves 907 are shaped to retain the edges of front plate 956, such that front plate 956 is connected to and sits between first end bracket 904 and second end bracket 906, making front plate 956 stationary. When assembled, pull plate 958 moves between front plate 956 and back plate 952.

In operation, a user may pull central protrusion 960 through central hole 962 to pull the pull plate 958 back towards the back plate 952, thereby allowing space for a stack of cigarette rolling papers (not shown) to be loaded between the pull plate 958 and the front plate 956. When central protrusion 960 is released, springs 968 push the pull plate 958 to abut against the stack of cigarette rolling papers and pushing the stack of cigarette rolling papers against the front plate 956. Front plate 956 may have at least one aperture 970 to allow for a user to grip a single sheet of rolling paper and feed the sheet into the rolling assembly. In this example, front plate 956 has two apertures 970 that are substantially semi-circular, allowing a user to grip a sheet of rolling paper with their thumbs. However, any shape of aperture 970 that would allow for a user to grip the paper is possible.

In an alternative embodiment, back plate 952, front plate 956, first end bracket 904, and second end bracket 906 may be formed to be a complete unit since they are stationary parts. This may be accomplished by injection molding or 3-D printing or other forms of fabrication.

In an embodiment of the invention, the device 900 may have a wetting assembly 972. Wetting assembly 972 may comprise at least a sponge holder 974, a sponge 975, a swivel rod 980, and a pivot rod 982. The sponge 975 is retained within a slot 976 in sponge holder 974, typically by an adhesive or other attachment means. Before operation, the sponge 975 would be moistened with liquid such as water.

The pivot rod 982 is retained and secured to the first end bracket 904 at one end and to the second end bracket 906 at its other end. First end bracket 904 and second end bracket 906 may each have an upper through-hole 909 and 911 in their respective first side walls 908 and 916, to retain and secure the pivot rod 982. The pivot rod 982 may be secured to the second end bracket by a nut if the ends of pivot rod 982 are threaded, or by caps, or other securing means.

A pivot bracket 978 pivotally abuts the first end bracket 904 and is substantially S-shaped, having an upper portion and a lower portion. The pivot rod 982 traverses the upper through-hole 909 in the first end bracket 904 and subsequently traverses a through-hole 988 in the lower portion of the pivot bracket 978. The through-hole 988 in pivot bracket 978 substantially aligns with the upper through-hole 909 of the first end bracket, allowing the pivot bracket 978 to pivotally abut the first end bracket 904. The pivot rod 982 is pivotally retained to the pivot bracket 978 by a nut or cap or other retention means.

Sponge holder 974 is shown in more detail in FIG. 66. The swivel rod 980 traverses a through-hole 986 in the sponge holder 974. One end of the swivel rod 980 is retained and secured in the sponge holder 974 by a nut or other securing means. The other end of the swivel rod 980 traverses a through-hole 989 in the upper portion of the pivot bracket 978. FIGS. 60A-C show this end of the swivel rod 980 having a knob 981 to allow a user to move the swivel rod 980, however other types of grips may be possible.

The sponge holder 974 is pivotally retained by protrusions 984 which fit into curved slots 913 in the respective first side walls 908 and 916 of first end bracket 904 and second end bracket 906.

In operation, a user moves the swivel rod 980 by moving the knob 981, which pivots the sponge holder 974 around the pivot rod 982. The pivot rod 982 acts as an axis of rotation because the protrusions 984 slide within curved slots 913. This turns the sponge holder 974 allowing the sponge 975 to move over the cigarette rolling paper within the rolling assembly and wet or lick the appropriate spot on the cigarette rolling paper for sealing the rolled cigarette tube or cone.

In an alternative embodiment, the device 900 may have a steaming assembly (not shown) rather than a sponge to wet the paper for sealing the cigarette tube.

While first end bracket 904 and second end bracket 906 and piston support 930 have been described as having particular shapes, it is understood that these brackets may have any shape to allow for the device 900 to be attached to a surface and to hold shaping mandrel 922 and piston 930. First end bracket 904 and second end bracket 906 are spaced on the surface 902 to optimally fit the rolling assembly, paperfeed assembly 950, and shaping mandrel 922 therebetween.

In the embodiments described, the various parts of the device may be manufactured from any material known to persons skilled in the art that would suitably perform the function for which they are intended, including, but not limited to, metal, plastic, silicone, wood, cork etc. or any combination thereof. One skilled in the art will appreciate that the various parts in a single device may be manufactured from a variety of different materials known to persons skilled in the art that would suitably perform the function for which they are intended. Furthermore, the various parts of the device may be opaque, clear, or partially opaque or clear.

While it is contemplated that the device is for use in grinding tobacco or cannabis, any other organic leafy material known to persons skilled in the art to be smoked may also be used.

While the use of adhesive has been described in various embodiments herein, any connecting techniques, methods and/or materials known to persons of ordinary skill in the art that would suitably perform the function for which they are intended, may be used such as, but not limited to, moulding, over-molding, screwing, nailing, friction fit, etc.

It is understood that the terminology used herein is for the purpose of describing particular embodiments/aspects only, and is not intended to be limiting. Many patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. "Connected," "coupled," or any variant thereof means any connection or coupling, either direct or indirect, between two or more elements; the coupling or connection between the elements can be physical, logical, or a combination thereof. "Herein," "above," "below," and words of similar import, when used to describe this specification shall refer to this specification as a whole and not to any particular portions of this specification.

It will be understood that any component defined herein as being included may be explicitly excluded from the claimed invention by way of proviso or negative limitation.

Although certain embodiments have been described with reference to the figures, those of skill in the art will appreciate that variations and modifications may be made without departing from the scope thereof as defined by the appended claims.

What is claimed is:

1. A device for rolling papers into a cigarette, the device comprising:
    an openable chamber configured to receive a ground smokeable material, the chamber having a first end and a second end;
    a rolling assembly disposed within the chamber, the rolling assembly for receiving paper and forming a paper tube around the ground smokeable material, the rolling assembly having a first end and a second end, the rolling assembly comprising a skirt for receiving and retaining the ground smokeable material; and
    a first gear assembly at the first chamber end and communicatively connected to the first end of the rolling assembly, and a second gear assembly at the second chamber end and communicatively connected to the second end of the rolling assembly, the first and second gear assemblies activating the rolling assembly when rotated to roll the paper around, and encase, the ground smokeable material on the skirt, forming the cigarette.

2. The device of claim 1, wherein the rolling assembly further comprises:
    a first and second roller, the first and second roller communicatively connected to the first and second gear assemblies, the first and second rollers engaging the skirt, opening and closing with the rotation of the first and second gear assemblies thereby opening and closing the skirt; and
    a paperfeed assembly for inserting the paper therein, the paperfeed assembly communicatively connected to the first and second gear assemblies to roll the paper around, and encase, the ground smokeable material on the skirt when the first and second gear assemblies are rotated.

3. The device of claim 1, wherein the cigarette is removable from the second chamber end.

4. The device of claim 1, wherein the chamber is openable for paper to be inserted into the rolling assembly.

5. The device of claim 2, wherein the paperfeed assembly is openable for a user to access the ground smokeable material on the skirt.

6. The device of claim 1, further comprising a grinder to grind a smokeable material for depositing into the chamber.

7. The device of claim 1, further comprising a blender to blend the ground smokeable material for depositing into the chamber.

8. The device of claim 1, further comprising a funnel for sifting the ground smokeable material for depositing into the chamber.

9. The device of claim 1, further comprising a wetting assembly for wetting an end of the paper to seal the cigarette.

10. The device of claim 9, wherein the wetting assembly comprises a sponge on an openable flap of the chamber.

11. The device of claim 1, wherein the material is an organic material.

12. The device of claim 1, wherein the material is plant material.

13. The device of claim 12, wherein the plant material is selected from the group consisting of roots, stems, bark, leaves, buds, flowers, seeds and combinations thereof.

14. The device of claim 1, wherein the material is selected from the group consisting of tobacco, cannabis, an herb and combinations thereof.

15. The device of claim 14, wherein the cannabis is cannabis containing relatively higher concentrations of tetrahydrocannabinol (THC).

16. The device of claim 14, wherein the cannabis is marijuana or weed.

17. The device of claim 14, wherein the cannabis is cannabis containing relatively lower concentrations of THC.

18. The device of claim 14, wherein the cannabis is hemp.

19. The device of claim 14, wherein the cannabis is selected from the group consisting of *Cannabis sativa*, *Cannabis indica*, *Cannabis ruderalis* and combinations thereof.

* * * * *